(12) United States Patent
Abe et al.

(10) Patent No.: US 11,051,590 B2
(45) Date of Patent: Jul. 6, 2021

(54) MOLDED SURFACE FASTENER

(71) Applicant: YKK Corporation, Tokyo (JP)

(72) Inventors: Hiromasa Abe, Toyama (JP); Ayumi Fujisaki, Toyama (JP); Kenta Okada, Toyama (JP)

(73) Assignee: YKK Corporation, Tokyo (JP)

( * ) Notice: Subject to any disclaimer, the term of this patent is extended or adjusted under 35 U.S.C. 154(b) by 354 days.

(21) Appl. No.: 16/074,250

(22) PCT Filed: Feb. 19, 2016

(86) PCT No.: PCT/JP2016/054927
§ 371 (c)(1),
(2) Date: Jul. 31, 2018

(87) PCT Pub. No.: WO2017/141436
PCT Pub. Date: Aug. 24, 2017

(65) Prior Publication Data
US 2020/0323313 A1    Oct. 15, 2020

(51) Int. Cl.
*A44B 18/00* (2006.01)
*B29C 43/46* (2006.01)
*B29L 31/00* (2006.01)

(52) U.S. Cl.
CPC ...... *A44B 18/0049* (2013.01); *A44B 18/0076* (2013.01); *A44B 18/0061* (2013.01);
(Continued)

(58) Field of Classification Search
CPC ............ A44B 18/0049; A44B 18/0076; A44B 18/0073; A44B 18/0061; A44B 18/008;
(Continued)

(56) References Cited

U.S. PATENT DOCUMENTS 4,798,694 A    1/1989  Sugata et al.
6,896,759 B2 *  5/2005  Fujisawa ................. B29C 48/35
                                              156/244.18
(Continued)

FOREIGN PATENT DOCUMENTS

JP    62-070036 A    3/1987
JP    08-283425 A    10/1996
(Continued)

OTHER PUBLICATIONS

Office Action, Korean Patent Application No. 10-2018-7022572, dated Apr. 19, 2019.
(Continued)

*Primary Examiner* — Robert Sandy
*Assistant Examiner* — Louis A Mercado
(74) *Attorney, Agent, or Firm* — Kilpatrick Townsend & Stockton LLP

(57) ABSTRACT

The molded surface fastener has a base portion, right and left resin-intrusion-preventing wall portions standing on the base portion, and a plurality of engaging elements disposed between the right and left resin-intrusion-preventing wall portions. The resin-intrusion-preventing wall portions contain magnetic particles, and at least a part of a region formed of the resin-intrusion-preventing wall portions and the base portion has a concentration gradient portion in which a concentration of the contained magnetic particles is decreased toward at least one direction. This makes it possible to enhance the adhesion property between the part containing the magnetic particles and the part substantially containing no magnetic particles, and to suppress occurrence of cracks or the like between the containing part and the non-containing part of the magnetic particles at the time of manufacturing the molded surface fastener and at other times.

11 Claims, 16 Drawing Sheets

(52) U.S. Cl.
CPC ..... *A44B 18/0073* (2013.01); *B29C 2043/461* (2013.01); *B29L 2031/729* (2013.01)

(58) Field of Classification Search
CPC ......... B29C 2043/461; B29L 2031/729; A44D 2203/00
See application file for complete search history.

(56) References Cited

U.S. PATENT DOCUMENTS

| | | | | |
|---|---|---|---|---|
| 7,108,814 | B2* | 9/2006 | Herrero | A44B 18/0049 24/442 |
| 8,512,845 | B2* | 8/2013 | Terada | A44B 18/0049 428/100 |
| 8,756,770 | B2* | 6/2014 | Cina | A44B 18/0065 24/452 |
| 9,210,970 | B2* | 12/2015 | Collins | A44B 18/0049 |
| 9,271,546 | B2* | 3/2016 | Terada | B29C 48/08 |
| 9,271,547 | B2* | 3/2016 | Terada | A44B 18/0069 |
| 9,357,815 | B2* | 6/2016 | Minato | F16B 1/00 |
| 9,433,262 | B2* | 9/2016 | Okuda | A44B 18/0019 |
| 9,826,801 | B2* | 11/2017 | Mascarenhas | A44B 18/0061 |
| 9,888,746 | B2* | 2/2018 | Murasaki | A44B 18/0049 |
| 10,426,231 | B2* | 10/2019 | Murasaki | B60N 2/7017 |
| 2009/0013506 | A1* | 1/2009 | Mizuhara | A44B 18/0069 24/442 |
| 2017/0042296 | A1* | 2/2017 | Murasaki | B60N 2/5891 |

FOREIGN PATENT DOCUMENTS

| | | |
|---|---|---|
| WO | 2003/030672 A1 | 4/2003 |
| WO | 2012/025980 A1 | 3/2012 |
| WO | 2015/136674 A1 | 9/2015 |
| WO | 2016/002044 A1 | 1/2016 |

OTHER PUBLICATIONS

Office Action, Chinese Patent Application No. 201680081729.3 dated Jun. 2, 2020, 18 pages.
Office Action, Japanese Patent Application No. 2017-567924, dated Jun. 4, 2019, 9 pages.
International Search Report, PCT Patent Application No. PCT/JP2016/054927, dated Apr. 5, 2016.

* cited by examiner

MOLDED SURFACE FASTENER

TECHNICAL FIELD

The invention relates to a molded surface fastener in which a plurality of hook shaped engaging elements stand on a flat plate-shaped base portion.

BACKGROUND ART

Passenger seats of automobiles or trains, various kinds of sofas, office chairs and the like are often formed by attaching a skin material such as fiber fabric or natural or synthetic leather to a surface of a cushion body (foam body) molded in a predetermined shape by using a foam resin material. The cushion body used in these various seats sometimes has a curved surface having convex-concave shapes satisfying human engineering factors in order to maintain a seating posture which provides no fatigue despite a long hour seating.

Moreover, when the skin material is attached to the surface of the cushion body, after molding the cushion body in a desired shape, a method of covering and fixing the skin material to the surface of the obtained cushion body is often adopted. Particularly in this case, a molded surface fastener having a plurality of hook shaped engaging elements is generally used as a means for fixing the top surface of the cushion body and a back surface of the skin material.

A molded surface fastener is formed of a plurality of hook shaped male engaging elements disposed on one top surface of a base portion made of thermoplastic resin. Such a molded surface fastener is integrated to the surface of the cushion body such that the engaging elements are exposed by conducting a foam molding of the cushion body using a molding die in a state of being attached to a cavity surface of the molding die. On the other hand, a plurality of loop shaped female engaging elements capable of fastening with the engaging elements of the molded surface fastener are provided on a back surface of the skin material covering the cushion body.

After the cushion body to which the molded surface fastener is integrated is covered with the skin material, the loop shaped engaging elements disposed on the back surface of the skin material are pressed against the molded surface fastener disposed on the top surface of the cushion body. Thereby, the skin material is fastened to the molded surface fastener by engaging the loop shaped engaging elements of the skin material with the hook shaped engaging elements of the molded surface fastener. In this manner, the skin material is easily fixed to the top surface of the cushion body along the convex-concave shapes of the top surface, and the skin material is prevented from floating from the cushion body.

As a means of attaching the molded surface fastener to the cavity surface of the molding die when foam molding of the cushion body is conducted, it is conventionally conducted that, while a magnet is buried under a fastener attaching surface in the molding die, a magnetic material which is magnetically attracted by the magnet of the molding die is attached to the molded surface fastener or a magnetic material is partially contained in the molded surface fastener.

As methods of attaching the magnetic material to the molded surface fastener, for example, it is known that a monofilament containing the magnetic material is fixed to the base portion of the molded surface fastener, a film containing the magnetic material is laminated on the base portion of the molded surface fastener, and the magnetic material is applied to a flat plate-shaped base portion of the molded surface fastener. In WO 2012/025980 A1 (Patent Document 1), for example, a molded surface fastener in which a monofilament containing the magnetic material is fixed to the base portion is disclosed.

The molded surface fastener described in the Patent Document 1 has a flat plate-shaped substrate which is long in a front and rear direction, right and left barriers disposed on right and left side edge portions of the substrate and standing on the substrate along a length direction in order to prevent an intrusion of foam resin material of a cushion body, a plurality of hook shaped engaging elements disposed between the right and left barriers, magnetic body holding portion protruded from the substrate on an inside of the barriers, lateral wall portions disposed along a width direction, and fin piece portions extending in the width direction from right and left side edges of the substrate toward an outside. Further, linear magnetic bodies formed of a monofilament containing magnetic particles are held with the magnetic body holding portion and fixed integrally to the substrate along a length direction.

On the other hand, in a case of partially containing magnetic materials in the molded surface fastener, a method of manufacturing the molded surface fastener by conducting a two color molding using a synthetic resin material containing the magnetic materials (magnetic particles) and a synthetic resin material containing no magnetic materials, for example, is generally used. The molded surface fastener manufactured by such a two color molding is disclosed in WO 2003/030672 A1 (Patent Document 2).

In Patent Document 2, for example, a molded surface fastener 110 as shown in FIG. 29 is described. The molded surface fastener 110 of the Patent Document 2 includes a flat plate-shaped base portion 111, which is long in a front and rear direction, and a plurality of hook shaped male engaging elements 112 standing on an upper surface of the base portion 111. Right and left side edge portions of the base portion 111 is provided with a plurality of magnetic protruded portions 113 so as to be placed in a row along a length direction.

Each of the magnetic protruded portions 113 is protruded on the upper surface of the base portion 111 in a rectangular parallelepiped shape. A valley portion 114 is provided between the adjacent magnetic protruded portions 113 in the length direction. Further in Patent Document 2, magnetic particles are mixed at a predetermined rate within only each magnetic protruded portion 113 or within each magnetic protruded portion 113 and a support part disposed under each magnetic protruded portion 113 in the base portion 111. In this case, a part containing magnetic particles and a part formed of synthetic resin only containing no magnetic particles are divided at a boundary (boundary surface).

In such a molded surface fastener 110 of Patent Document 2, magnetic particles attracted by a magnet are contained at a certain concentration within each magnetic protruded portion 113. Therefore, in a case that a magnet is buried under a fastener attaching surface in a molding die, the molded surface fastener 110 can be magnetically attracted and fixed to the fastener attaching surface by making the molded surface fastener 110 closer to the fastener attaching surface of the molding die. A foam molding of the cushion body in the molding die is conducted in a state that the molded surface fastener 110 is fixed to the fastener attaching surface, thereby the cushion body in which the molded surface fastener 110 is integrated on the surface can be stably manufactured.

PRIOR ART DOCUMENTS

Patent Documents

Patent Document 1: International Publication No. WO 2012/025980 A1
Patent Document 2: International Publication No. WO 2003/030672 A1

SUMMARY OF INVENTION

Problem to be Solved by the Invention

When manufacturing the molded surface fastener 110 of Patent Document 2 shown in FIG. 29, for example, a molten synthetic resin material and a molten synthetic resin material containing magnetic particles are continuously extruded from an extrusion machine such as an extrusion nozzle on a peripheral surface of a cylindrical die wheel continuously rotating in one direction to mold the molded surface fastener 110 on the peripheral surface of the die wheel.

In this case, on a peripheral surface part of the die wheel, a plurality of cavities for molding (cavity spaces) which are concaved in corresponding shapes to the engaging elements 112 and the magnetic protruded portions 113 are provided from an outer peripheral surface toward an inside. Therefore, molten resin extruded from the extrusion machine is poured between the extrusion machine and the die wheel to mold the base portion 111 of the molded surface fastener 110. At the same time, the molten resin extruded from the extrusion machine is poured in each cavity for molding provided on the peripheral surface part of the die wheel, thereby a plurality of engaging elements 112 and a plurality of magnetic protruded portions 113 are integrally molded to the base portion 111.

The molded surface fastener 110 in which the plurality of engaging elements 112 and the magnetic protruded portions 113 are integrally provided on the base portion 111 is cooled and molded while being held on the peripheral surface of the rotating die wheel. Afterwards, the cooled molded surface fastener 110 is continuously peeled off from the die wheel by using a means such as pickup rollers, and collected.

In such a manufacturing method of the molded surface fastener, since the molded surface fastener 110 of Patent Document 2 shown in FIG. 29 is forcibly extracted from the cavities for molding provided on the peripheral surface of the die wheel, a large tensile force is applied to the molded surface fastener 110, especially to the base portion 111, and the engaging elements 112 or the magnetic protruded portions 113 of the molded surface fastener 110.

However, in the molded surface fastener 110 of Patent Document 2 shown in FIG. 29, a part containing magnetic particles and a part formed of synthetic resin only containing no magnetic particles are divided clearly at a boundary (boundary surface) parallel to an upper surface of the base portion of the molded surface fastener 110.

Therefore, when the molded surface fastener 110 is peeled off from the die wheel, cracks on the molded surface fastener 110 tend to occur or the molded surface fastener 110 tends to be partially ripped easily due to the tensile force the molded surface fastener 110 receives. Particularly, the cracks and the rips of the molded surface fastener 110 as above tend to occur at the boundary between the part containing magnetic particles and the part containing no magnetic particles.

The present invention was made in view of the above conventional problems. The specific object is to provide a molded surface fastener which is molded by a two color molding, and partially contains magnetic particles in resin-intrusion-preventing wall portions and the like, in which cracks or rips hardly occur even when a large tensile force is applied in a molding step or when used as a product.

Means for Solving the Problem

To achieve the above object, a molded surface fastener provided by the present invention is, as a basic structure, a synthetic resin molded surface fastener to be integrated to a surface of a cushion body at the time of foam molding of the cushion body, in which the molded surface fastener has a flat plate-shaped base portion provided with an upper surface and a lower surface, right and left resin-intrusion-preventing wall portions standing on the upper surface of the base portion along a length direction, and a plurality of hook shaped engaging elements disposed between the right and left resin-intrusion-preventing wall portions, and magnetic particles are contained in the right and left resin-intrusion-preventing wall portions, in which at least a part of a region formed of the resin-intrusion-preventing wall portions and the base portion has a concentration gradient portion in which a concentration of the contained magnetic particles decreases as it extends toward at least one direction.

In such a molded surface fastener of the present invention, it is preferable that the concentration gradient portion has a downward gradient portion in which a concentration of the contained magnetic particles decreases as it extends downward. In this case, it is preferable that the downward gradient portion is disposed across a region of $\frac{1}{10}$ or more of a height dimension of the resin-intrusion-preventing wall portion from the base portion.

In the molded surface fastener according to the present invention, it is preferable that the concentration gradient portion has a high concentration portion in which a concentration of the contained magnetic particles is the highest on an upper end part including an upper surface of the right and left resin-intrusion-preventing wall portions.

In the molded surface fastener according to the present invention, it is preferable that the concentration gradient portion has an inward gradient portion in which a concentration of the contained magnetic particles decreases as it extends from an outside which is apart from the engaging elements toward an inside which is close to the engaging elements along a right and left direction.

Further, in the present invention, the concentration gradient portion may have an outward gradient portion in which a concentration of the contained magnetic particles decreases as it extends from an inside which is close to the engaging elements toward an outside which is apart from the engaging elements along the right and left direction.

In the molded surface fastener of the present invention, it is preferable that the right and left resin-intrusion-preventing wall portions have at least one vertical wall row formed along a length direction respectively, and that the vertical wall row has a plurality of divided vertical wall portions disposed along the length direction at a predetermined pitch intermittently and provided with a certain height dimension.

In this case, it is further preferable that the concentration gradient portion of the divided vertical wall portion has a length direction gradient portion in which a concentration of the contained magnetic particles decreases along a front and rear direction.

Further, it is preferable that the resin-intrusion-preventing wall portion has a plurality of the vertical wall rows formed of the divided vertical wall portions, in which the divided vertical wall portions are arranged in a staggered manner in a plurality of the vertical wall rows, the divided vertical wall portion in each vertical wall row is connected to the adjacent two divided vertical wall portions in another vertical wall row via a connecting wall portion, and the divided vertical wall portion and the connecting wall portion are continuously disposed in a series with a certain height dimension.

Particularly in this case, it is further preferable that the vertical wall rows of the resin-intrusion-preventing wall portion has a first vertical wall row disposed on an inner side in a right and left direction and a second vertical wall row disposed on an outer side in the right and left direction, the divided vertical wall portion in the first vertical wall row and the divided vertical wall portion in the second vertical wall row are disposed partially overlapped with each other in a side view from the right and left direction, and the connecting wall portion is disposed along a width direction.

Further, it is preferable that a connecting length of the connecting wall portion for connecting between the divided vertical wall portions is set to be larger than a dimension of the divided vertical wall portion in the right and left direction.

Effects of the Invention

In the molded surface fastener according to the present invention, the right and left resin-intrusion-preventing wall portions and a plurality of the hook shaped engaging elements disposed between the right and left resin-intrusion-preventing wall portions stand on the upper surface of the flat plate-shaped base portion. Further, magnetic particles are contained in the right and left resin-intrusion-preventing wall portions, respectively. Particularly in the present invention, at least a part of a region formed of the resin-intrusion-preventing wall portions and the base portion (particularly a preventing wall supporting portion disposed under the resin-intrusion-preventing wall portion in the base portion) includes a concentration gradient portion in which a concentration of the contained magnetic particles decreases as it extends toward at least one direction among a height direction, a width direction, and a length direction in the molded surface fastener.

Since the concentration gradient portion is provided on at least a part of the region formed of the resin-intrusion-preventing wall portions and the base portion, and preferably only on the resin-intrusion-preventing wall portion, a boundary between a part containing the magnetic particles and a part made of only synthetic resin substantially containing no magnetic particles is hardly formed clearly, as in the molded surface fastener of Patent Document 2, for example. As a result, it is possible to decrease an amount of the contained magnetic particles (preferably, decrease an amount of the contained magnetic particles gradually) from a part containing the largest amount of magnetic particles (for example, an upper end part of the resin-intrusion-preventing wall portion) to the part made of only synthetic resin substantially containing no magnetic particles.

This makes it possible to substantially improve an adhesion property between the part containing the magnetic particles and the part substantially containing no magnetic particles in the molded surface fastener as compared to the conventional molded surface fasteners. As a result, cracks and rips can hardly occur even when the molded surface fastener receives a large tensile force as above in peeling off from a die wheel, in a molding step of the molded surface fastener, for example. Therefore, it is possible to improve production efficiency, yield and others of the molded surface fastener.

It should be noted that "substantially containing no magnetic particles" also includes a case when the part is formed of synthetic resin containing magnetic particles at 10 wt % or less, preferably 5 wt % or less, as well as a case when the part is formed of synthetic resin containing no magnetic particles at all. This is because there is a case when the molded surface fastener of the present invention is manufactured from recycled products in order to reduce an environmental load.

For example, a molded surface fastener is sometimes molded by first finely cutting a completed product of a molded surface fastener partially including magnetic materials (magnetic particles) and recycling it as a pellet for extrusion resin which does not positively contain the magnetic materials. In this case, since a little amount of magnetic materials results in being contained in the synthetic resin, which is to be a main material of the molded surface fastener, the present invention includes the molded surface fastener manufactured by such recycling materials.

Further in the present invention, since the concentration gradient portion as mentioned above is provided, when the magnetic particles are contained in a predetermined region of the resin-intrusion-preventing wall portion, for example, (a region from an upper end position to a predetermined height position of the resin-intrusion-preventing wall portion, for example), it is possible to decrease a used amount of the magnetic particles and to attain a reduction of manufacturing cost, as compared to a case when magnetic particles are uniformly contained in the predetermined region at a certain concentration.

In general, although flexibility of the molded surface fastener tends to lower when a larger amount of magnetic particles are contained in synthetic resin, it is possible to suppress lowering the flexibility by decreasing the used amount of the magnetic particles as described above, thereby, a proper flexibility of the molded surface fastener can be stably secured.

Since the molded surface fastener has the flexibility properly in this manner, it is prevented that a space in which a foam resin material of the cushion body can enter is formed between a fastener attaching surface and the molded surface fastener when the molded surface fastener is attached to the fastener attaching surface of the molding die. As a result, the right and left resin-intrusion-preventing wall portions of the molded surface fastener can be stably adhered to the fastener attaching surface of the molding die. Thereby, it is possible to effectively prevent the foam resin materials from intruding into an engaging region in which the engaging elements are formed over the resin-intrusion-preventing wall portions at the time of foam molding of the cushion body, and to stably ensure a desired engaging strength of the molded surface fastener with respect to loop shaped engaging elements.

In such a molded surface fastener of the present invention, the concentration gradient portion provided on at least a part of the region formed of the resin-intrusion-preventing wall portions and the base portion includes a downward gradient portion in which a concentration of the contained magnetic particles decreases downward.

That is, in the present invention, the magnetic particles are contained in the resin-intrusion-preventing wall portion, in addition to that, the concentration of the contained magnetic particles at the upper end part of the resin-intrusion-preventing wall portion is higher than that of a lower end part of the resin-intrusion-preventing wall portion. Thereby, more magnetic particles are contained at the upper end part of the resin-intrusion-preventing wall portion. For this reason, in a case that a molding die in which a magnet is buried under the fastener attaching surface is used at the time of foam molding of the cushion body, for example, a stronger magnetic force between the magnet of the molding die and the magnetic particles contained in the molded surface fastener can be obtained when the molded surface fastener is attached to the fastener attaching surface of the molding die in a direction that the engaging elements face the fastener attaching surface. Therefore, the molded surface fastener can be attracted to the fastener attaching surface of the molding die with a stronger attracting force, and can be fixed firmly.

Further in this case, due to the strong magnetic force generated between the magnet of the molding die and the magnetic particles of the molded surface fastener, it is possible to stably obtain a self-alignment effect capable of adjusting a position or direction of the molded surface fastener to be attached accurately and automatically corresponding to the position and direction of the magnet disposed on a fastener holding portion of the molding die.

It should be noted that the downward gradient portion of the concentration gradient portion here means at least one of the parts, which is a part in which a concentration range of the magnetic particles in a cross section of the resin-intrusion-preventing wall portion when the resin-intrusion-preventing wall portion is cut perpendicular to the upper surface of the base portion, shows a decrease from an upper side toward a lower side, or a part in which an average concentration (or an area of the contained magnetic particles) decreases from the upper side toward the lower side when viewing the concentration average of the magnetic particles (or the contained area of the magnetic particles) in each cross section regarding a plurality of cross sections obtained by cutting the resin-intrusion-preventing wall portion at a plurality of height positions for each predetermined height so as to be parallel to the upper surface of the base portion.

In this case, it is preferable that the above mentioned downward gradient portion is disposed across a region having a height dimension equal to 1/10 or more of the resin-intrusion-preventing wall portion from the base portion, preferably a region for 1/5 or more, and particularly preferably a region for 3/10 or more. Since the downward gradient portion is provided in a range having a certain height region in this manner, it is possible to more gradually decrease the amount of the contained magnetic particles downward. Thereby, it is possible to improve the adhesion property between the part containing the magnetic particles and the part substantially containing no magnetic particles of the molded surface fastener more effectively.

The concentration gradient portion of the present invention includes a high concentration portion having the highest concentration of the contained magnetic particles at the upper end part including the upper surface of the respective right and left resin-intrusion-preventing wall portions. Thereby, it is possible to stably generate a strong magnetic force between the magnet of the molding die and the molded surface fastener when the molded surface fastener of the present invention is attached to the fastener attaching surface of the molding die at the time of foam molding of the cushion body, for example. Therefore, the molded surface fastener can be attracted and fixed to the fastener attaching surface of the molding die more firmly.

In such a molded surface fastener of the present invention, the concentration gradient portion includes an inward gradient portion in which the concentration of the contained magnetic particles decreases along a right and left direction from an outside apart from the engaging elements toward an inside closer to the engaging elements. Due to such an inward gradient portion of the concentration gradient portion, it is possible to further improve the adhesion property between the part containing the magnetic particles and the part substantially containing no magnetic particles of the molded surface fastener.

It should be noted that the inward gradient portion of the concentration gradient portion here means at least one of parts, which is a part in which a concentration range of the magnetic particles in a cross section of the resin-intrusion-preventing wall portion when the resin-intrusion-preventing wall portion is cut perpendicular to the upper surface of the base portion and parallel to a width direction decreases inward from the outside, or a part in which an average concentration decreases inward from the outside when viewing the concentration average of the magnetic particles in each cross section regarding a plurality of cross sections obtained by cutting the resin-intrusion-preventing wall portion at a plurality of positions at each interval in a predetermined width dimension so as to be perpendicular to the upper surface of the base portion and parallel to a length direction.

In addition, since the inward gradient portion is formed on the resin-intrusion-preventing wall portion and more magnetic particles are mixed in an end edge part on an outer side (outer wall surface side) of the resin-intrusion-preventing wall portion, the end edge part on the outer side of the resin-intrusion-preventing wall portion is attracted more strongly than an end edge part on an inner side of the resin-intrusion-preventing wall portion by the magnet of the molding die when the molded surface fastener is attached and adhered to the fastener attaching surface of the molding die at the time of foam molding of the cushion body, for example. Thereby, the resin-intrusion-preventing wall portion of the molded surface fastener can be adhered to the fastener attaching surface of the molding die more stably, therefore, a sealing property between the molded surface fastener and the fastener attaching surface of the molding die can be enhanced. As a result, it can be effectively prevented that the foam resin material intrudes into the engaging region over the resin-intrusion-preventing wall portion at the time of foam molding of the cushion body.

On the other hand, when a molded surface fastener is cooled in a molding step of the fastener, a thermal contraction occurs in the molded surface fastener. At this time, the part of the molded surface fastener containing the magnetic particles has a smaller thermal contraction amount than the part made of synthetic resin substantially containing no magnetic particles due to an effect of the magnetic particles. As the amount of contained magnetic particles increases, the thermal contraction amount decreases.

Therefore, since the inward gradient portion of the concentration gradient portion is formed on the resin-intrusion-preventing wall portion as mentioned above, and more magnetic particles are mixed in an outer side end edge part of the resin-intrusion-preventing wall portion, the molded surface fastener obtained by being cooled in a molding step has sometimes a shape in which a back surface (lower surface) of the base portion is curved slightly in a convex with respect to a width direction (right and left direction) due to the thermal contraction at the time of cooling.

On the other hand, in a case that the fastener attaching surface of the molding die is processed manually, the fastener attaching surface may be formed as a curved surface which curves slightly in a convex shape along a direction to be a width direction of the molded surface fastener. In a case that the fastener attaching surface of the molding die has a convexly curved surface, and the molded surface fastener has a curved shape slightly in a width direction as described above, it is possible to enhance workability when attaching the molded surface fastener to the fastener attaching surface of the molding die. Further, it can be expected to further enhance the adhesion property of the molded surface fastener with respect to the fastener attaching surface of the molding die.

In the present invention, the concentration gradient portion may include an outward gradient portion in which a concentration of the contained magnetic particles decreases along a right and left direction from an inside closer to the engaging elements toward an outside apart from the engaging elements. Also due to the outward gradient portion of such a concentration gradient portion, it is possible to further improve the adhesion property between the part containing magnetic particles and the part substantially containing no magnetic particles in the molded surface fastener.

It should be noted that the outward gradient portion of the concentration gradient portion here means at least one of parts, which is a part in which a concentration range of the magnetic particles in a cross section of the resin-intrusion-preventing wall portion when the resin-intrusion-preventing wall portion is cut perpendicular to the upper surface of the base portion and parallel in a width direction decreases outward from the inside, or a part in which an average concentration decreases outward from the inside when viewing the average concentration of the magnetic particles in each cross section regarding a plurality of cross sections obtained by cutting the resin-intrusion-preventing wall portion at a plurality of positions at each interval in a predetermined width dimension so as to be perpendicular to the upper surface of the base portion and parallel to a length direction.

In addition, since the outward gradient portion is formed on the resin-intrusion-preventing wall portion and more magnetic particles are mixed in an end edge part of an inner side (inner wall surface side) of the resin-intrusion-preventing wall portion, it is possible to automatically adjust a position and direction of the molded surface fastener accurately and smoothly corresponding to a position and direction of the magnet of the molding die.

In the molded surface fastener of the present invention, the right and left resin-intrusion-preventing wall portions have at least one vertical wall row formed along a length direction, respectively. Each vertical wall row is formed to have a plurality of divided vertical wall portions and disposed intermittently at a predetermined pitch along a length direction having a certain height dimension. Thereby, as compared to a case that each vertical wall row of the resin-intrusion-preventing wall portion is formed as a continuous vertical wall portion disposed continuously with a certain height dimension along a length direction, for example, it is possible to significantly enhance flexibility of the molded surface fastener to curve in an upper and lower direction.

In this case, since the concentration gradient portion of each divided vertical wall portion has a length direction gradient portion in which a concentration of contained magnetic particles decreases along a front and rear direction, it is possible to further improve the adhesion property between a part containing magnetic particles and a part substantially containing no magnetic particles of the molded surface fastener.

It should be noted that the length direction gradient portion of the concentration gradient portion here means at least one of parts, which is a part in which a gradient distribution of the magnetic particles in a cross section of the resin-intrusion-preventing wall portion when the resin-intrusion-preventing wall portion is cut parallel to the upper surface of the base portion decreases along a length direction, or a part in which an average concentration decreases along a length direction when viewing the average concentration of the magnetic particles in each cross section regarding a plurality of cross sections obtained by cutting the resin-intrusion-preventing wall portion at a plurality of positions at each interval in a predetermined length dimension so as to be perpendicular to the upper surface of the base portion and parallel to a width direction.

Moreover, when the molded surface fastener obtained in a molding step is cooled and thermally contracted, and in a case that the magnetic particles are largely contained in the upper end part of the resin-intrusion-preventing wall portion in the molded surface fastener, and the magnetic particles are not contained in the base portion, for example, the molded surface fastener tends to curve in an upper and lower direction such that the base portion side shrinks with respect to a length direction due to a difference of the thermal contraction amount between the part containing magnetic particles and the part substantially containing no magnetic particles.

On the contrary, since each divided vertical wall portion disposed on the resin-intrusion-preventing wall portion of the molded surface fastener has the aforementioned length direction gradient portion of the concentration gradient portion, it is expected that even when the thermal contraction occurs in the molded surface fastener during a molding step, the curve in the upper and lower direction due to the above-described difference of the thermal contraction amount hardly occurs. Therefore, it is possible to manufacture the molded surface fastener extending straightly in the length direction.

In the molded surface fastener of the present invention, the resin-intrusion-preventing wall portion has a plurality of the vertical wall rows formed of the divided vertical wall portions and the divided vertical wall portions are arranged between the plural vertical wall rows in a staggered manner. Further, the divided vertical wall portion in each vertical wall row is connected to adjacent two divided vertical wall portions in the other vertical wall row via the connecting wall portion, and the divided vertical wall portion and the connecting wall portion are continuously disposed in a series manner with a certain height dimension.

According to the molded surface fastener having such a resin-intrusion-preventing wall portion, when the molded surface fastener is attached to the fastener attaching surface of the molding die and conduct a foam molding of the cushion body, the right and left resin-intrusion-preventing wall portions of the molded surface fastener can be stably adhered to the fastener attaching surface of the molding die. In addition, since an outside of the resin-intrusion-preventing wall portion and an engaging element region formed between the right and left resin-intrusion-preventing wall portions can be separated, it is possible to prevent foam resin material of the cushion body from intruding into the engaging region over the right and left resin-intrusion-preventing wall portions.

Moreover, since the vertical wall portions are arranged in a staggered manner in a plurality of vertical wall rows, it is possible to decrease or eliminate a region in which vertical wall portions overlap with each other between the adjacent vertical wall rows in a side view from a right and left direction. This makes it possible to enhance flexibility of the molded surface fastener in an upper and lower direction, therefore, the molded surface fastener of the present invention can be curved more easily toward the upper and lower direction.

In this case, the vertical wall row of the resin-intrusion-preventing wall portion includes a first vertical wall row disposed on an inner side in a right and left direction and a second vertical wall row disposed on an outer side of the right and left direction. Further, the divided vertical wall portion in the first vertical wall row and the divided vertical wall portion in the second vertical wall row are disposed partially overlapped with each other in a side view from a right and left direction. The connecting wall portion is disposed along a width direction.

Accordingly, the right and left resin-intrusion-preventing wall portions of the molded surface fastener are formed with a relatively simple shape. In addition, owing to the resin-intrusion-preventing wall portion, it is possible to prevent the foam resin material from intruding at the time of foam molding of the cushion body. Further, since the connecting wall portion is disposed along a width direction, the molded surface fastener can be easily bent upward as well as downward. Moreover, at the time of foam molding of the cushion body, it is possible to let the foam resin material intrude intentionally between the vertical wall portions in the second vertical wall row disposed on the outer side of the resin-intrusion-preventing wall portion, and to let the foam resin material contact with the vertical wall portions in the first vertical wall row on the inner side. Thereby, it is possible to make a contact area between the molded surface fastener and the cushion body larger and to increase a fixing strength of the molded surface fastener with respect to the cushion body.

Further in this case, a connecting length of the connecting wall portion in the resin-intrusion-preventing wall portion for connecting between the divided vertical wall portions is set to be larger than a dimension of the divided vertical wall portion in a right and left direction, it is possible to ensure a large width dimension of the resin-intrusion-preventing wall portion in a right and left direction, and to form the resin-intrusion-preventing wall portion to be thick in the right and left direction. Therefore, even when the foam resin material is strongly sprayed to a boundary part between the molded surface fastener and the fastener attaching surface of the molding die at the time of foam molding of the cushion body, for example, it is possible to stably prevent the foam resin material from intruding owing to the thick resin-intrusion-preventing wall portion of the molded surface fastener. Moreover, since the connecting length of the connecting wall portion elastically deforming when the molded surface fastener is curved in an upper and lower direction is largely set as described above, it is possible to further improve the flexibility of the molded surface fastener in the upper and lower direction.

DESCRIPTION OF EMBODIMENT

Hereinafter, preferred embodiments of the present invention are described in detail with Embodiments referring to drawings. It should be noted that the present invention is not limited thereto, and various changes can be made as long as they have a substantially same structure and same functional effects. For example, in the present invention, a length dimension and a width dimension of the molded surface fastener and the number, an arrangement position and a forming density or the like of hook shaped engaging elements disposed on the base portion of the molded surface fastener is not limited in particular, and can be changed arbitrarily.

Embodiment 1

Figure 1:
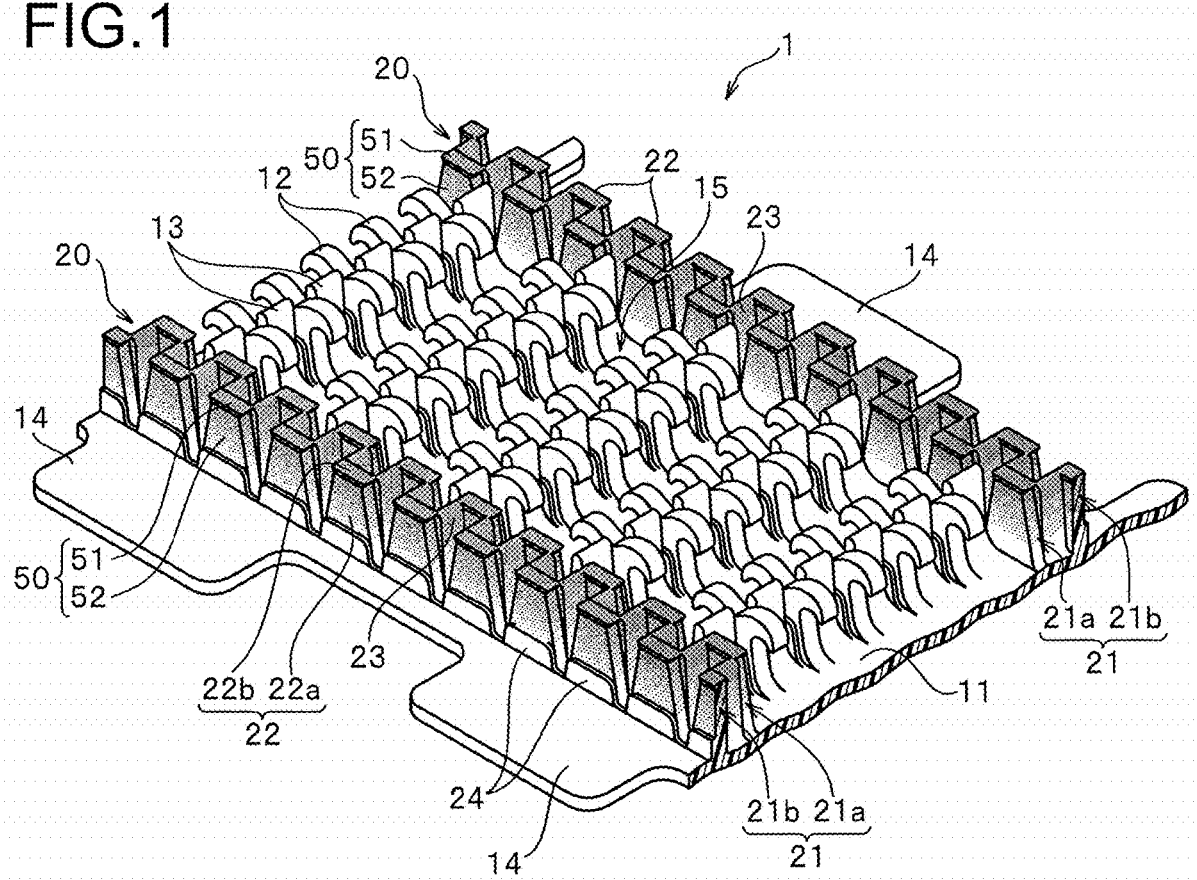
FIG. 1 is a perspective view illustrating a molded surface fastener according to Embodiment 1 of the present invention.
Figure 2:
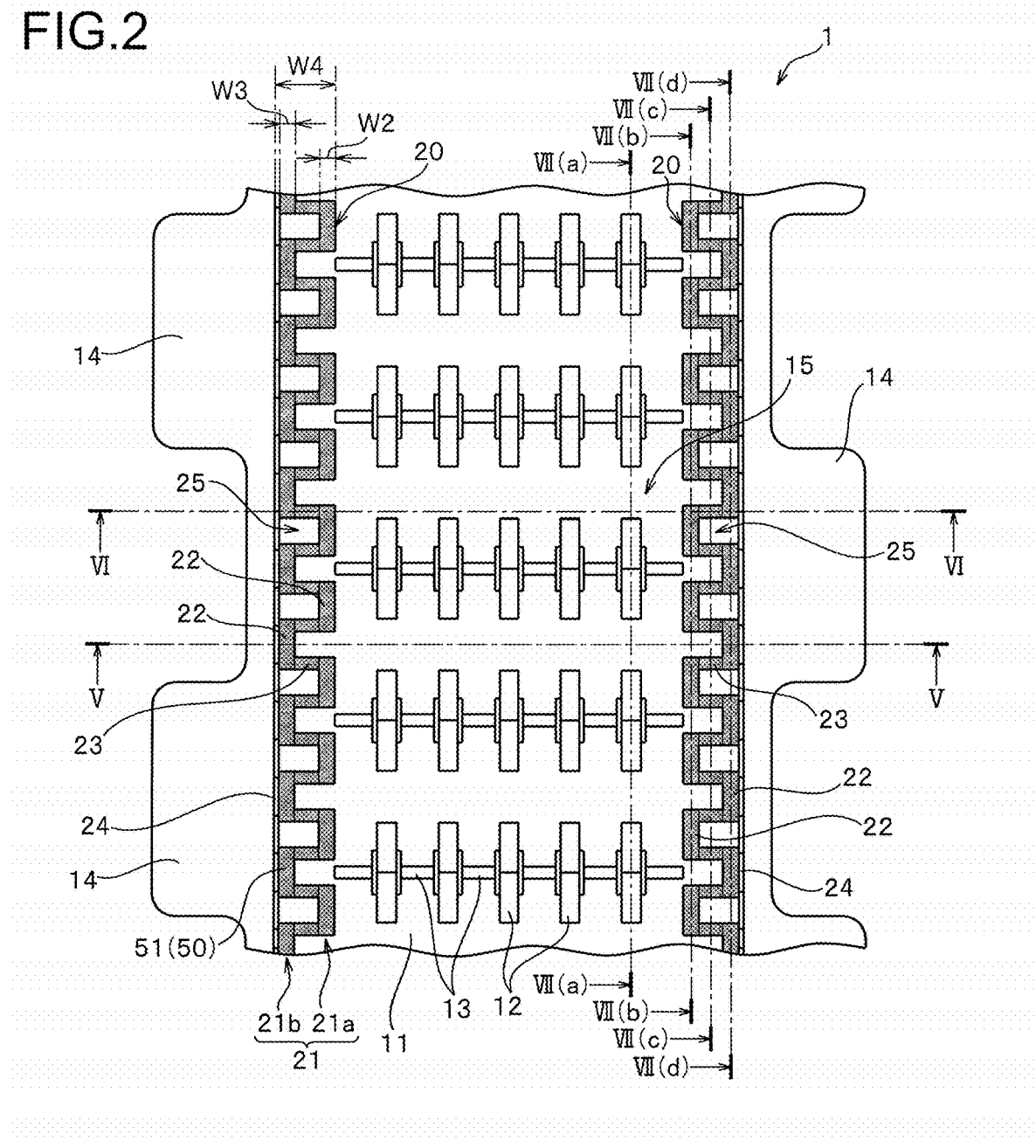
FIG. 2 is a plan view of the molded surface fastener.
Figure 3:
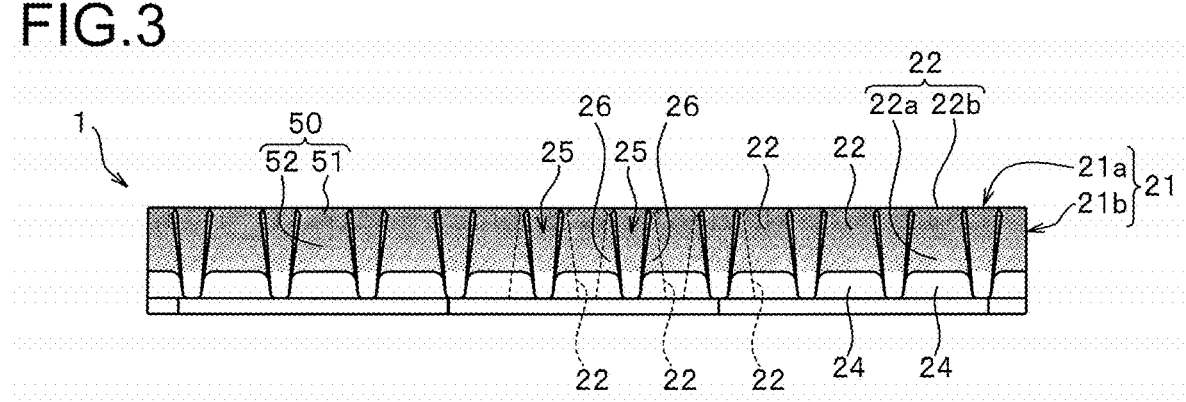
FIG. 3 is a side view of the molded surface fastener.
Figure 4:
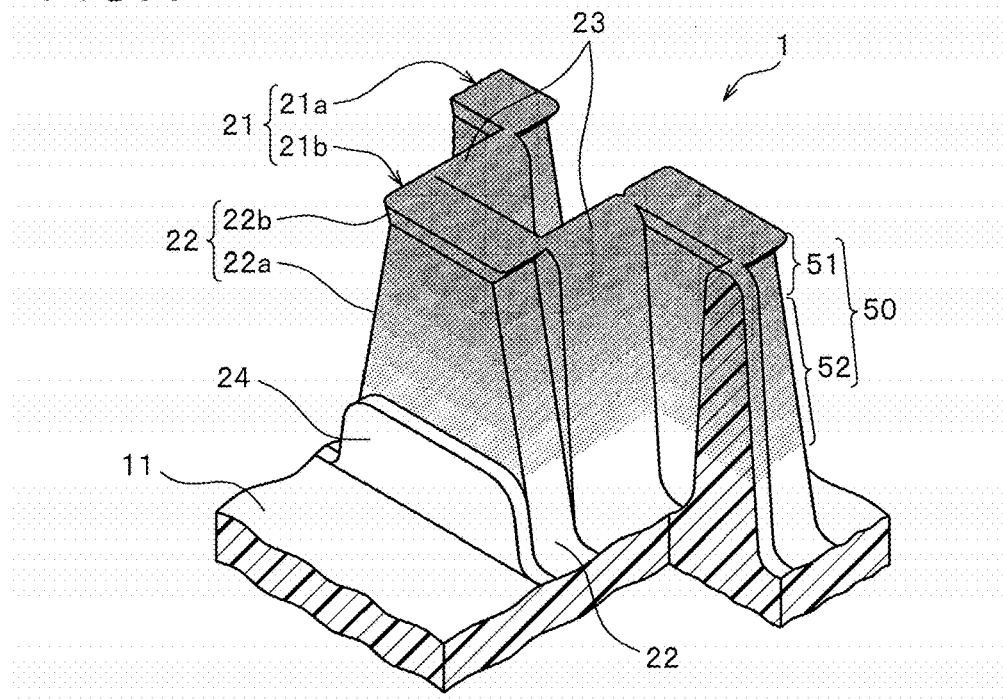
FIG. 4 is a main part enlarged perspective view illustrating a main part of the molded surface fastener enlarged.
Figure 5:
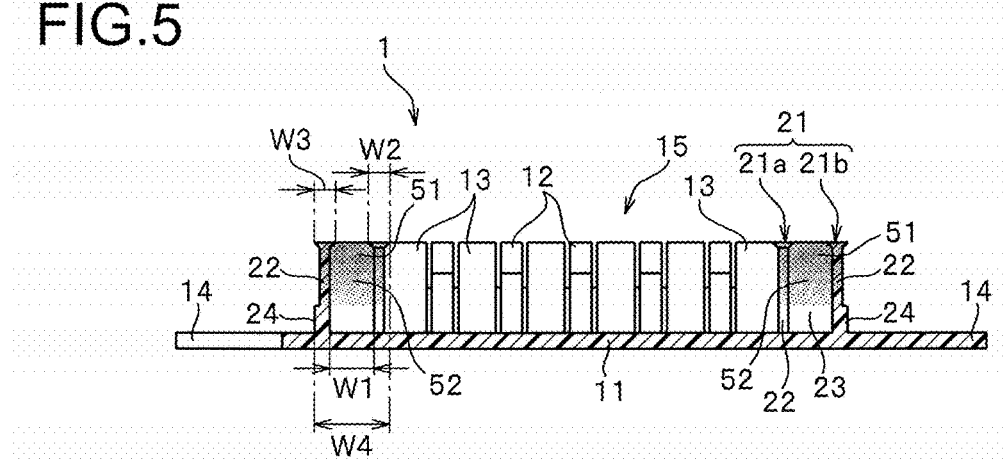
FIG. 5 is a cross sectional view in V-V line illustrated in FIG. 2.
Figure 6:
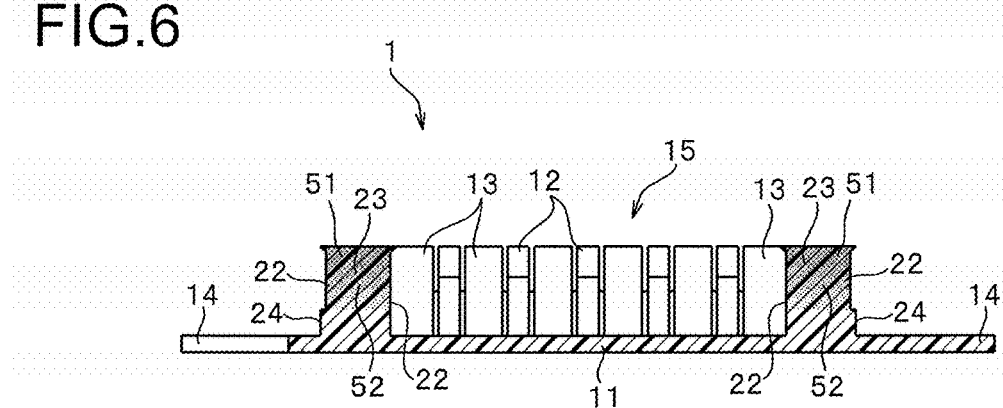
FIG. 6 is a cross sectional view in VI-VI line illustrated in FIG. 2.
Figure 7A:
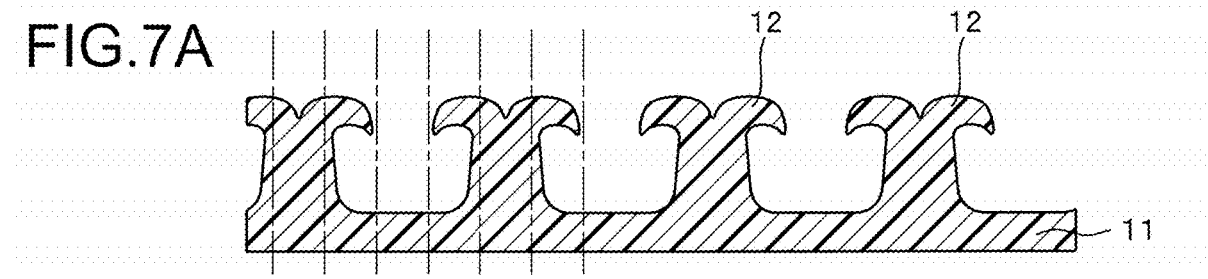
FIGS. 7A, 7B, 7C, and 7D, collectively referred to herein as FIG. 7, are cross sectional views in VII(a)-VII(a) to VII(d)-VII(d) lines illustrated in FIG. 2.
Figure 7B:
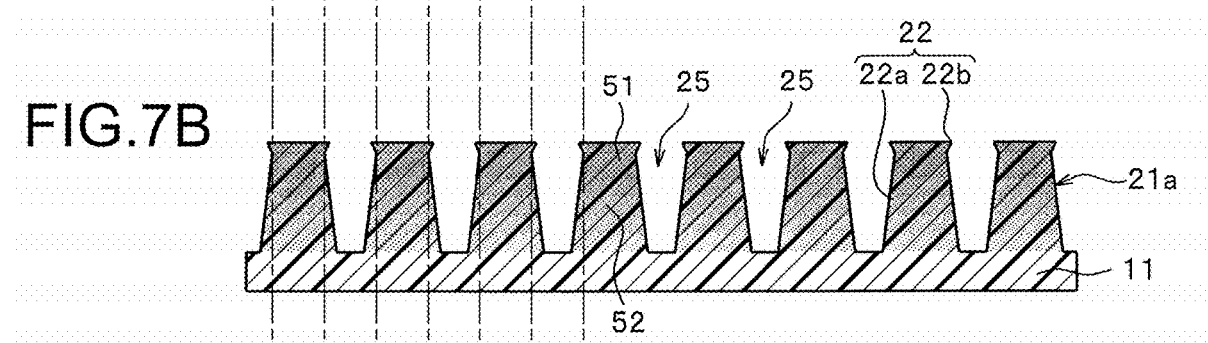
Figure 7C:
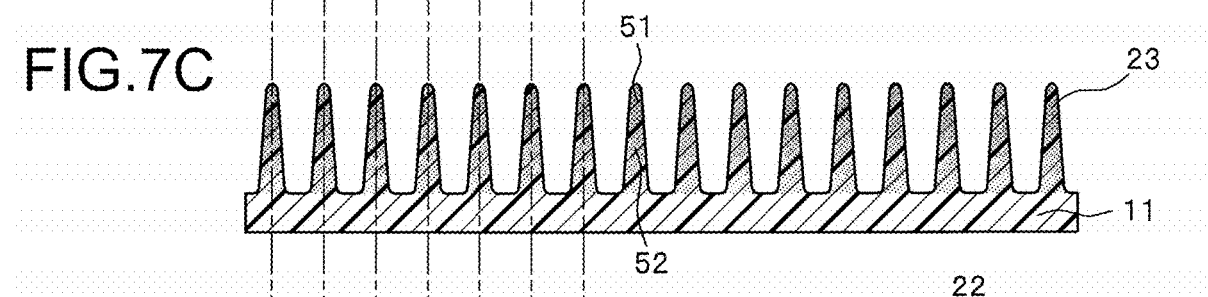
Figure 7D:
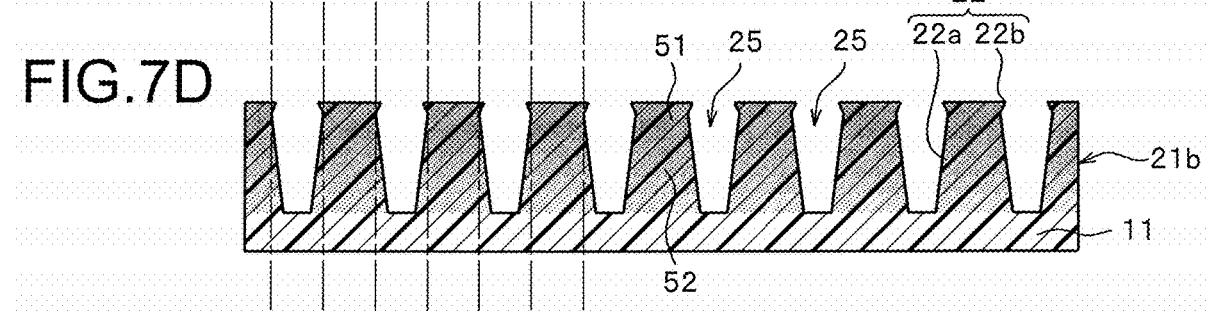

FIG. 1 is a perspective view illustrating a molded surface fastener according to Embodiment 1 of the present invention. FIG. 2 and FIG. 3 are a plan view and a side view of the molded surface fastener. FIG. 4 is a main part enlarged perspective view illustrating a main part (resin-intrusion-preventing wall portion) of the molded surface fastener enlarged. FIG. 5 to FIG. 7 are each cross sectional view of the molded surface fastener.

In the following explanation, a front and rear direction regarding a molded surface fastener and a primary molded body means a length direction (especially a length direction of a base portion) of the molded surface fastener and the primary molded body which are molded to be long as described later. A right and left direction means a width direction which is orthogonal to the length direction and which is along an upper surface (or a lower surface) of the base portion of the molded surface fastener. An upper and lower direction means a height direction (thickness direction) which is orthogonal to the length direction and which is orthogonal to the upper surface (or a lower surface) of the base portion of the molded surface fastener. Specifically, a direction on a side that engaging elements are formed with respect to the base portion is defined as an upper direction and a direction of an opposite side thereof is defined as a lower direction.

Figure 8:
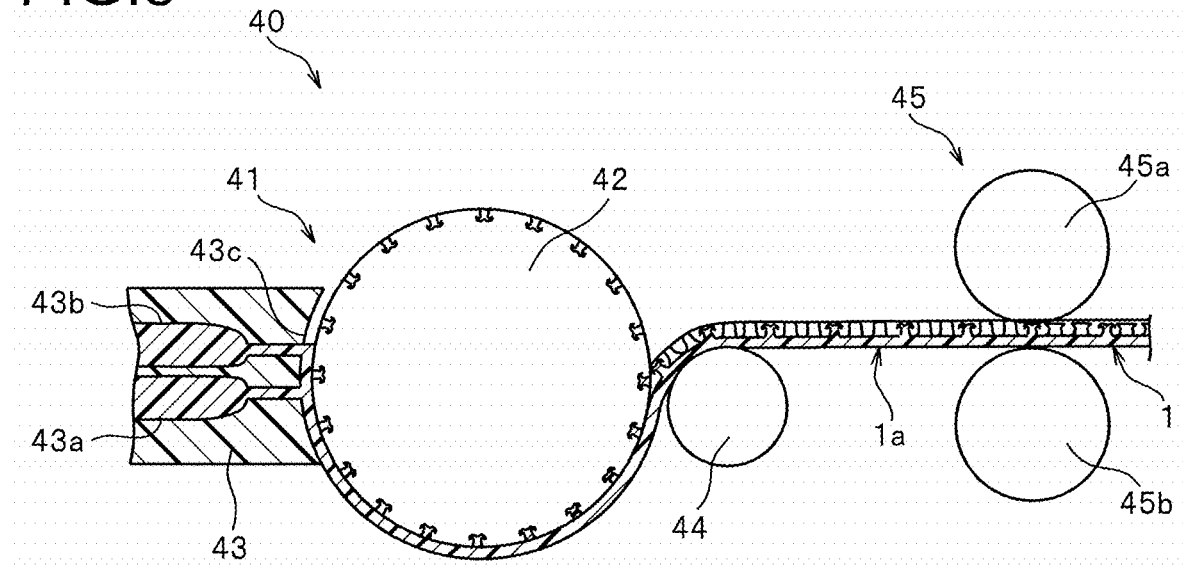
FIG. 8 is a schematic view expressing a manufacturing apparatus of the molded surface fastener.

A molded surface fastener 1 according to Embodiment 1 of the present invention includes a flat plate-shaped base portion 11 (also referred to as a substrate portion) which is long in the front and rear direction, resin-intrusion-preventing wall portions 20 standing on right and left side edge parts of the base portion 11, a plurality of hook shaped male engaging elements 12 disposed between the right and left resin-intrusion-preventing wall portions 20, lateral wall portions 13 disposed along the right and left direction, and fin piece portions 14 extending in a width direction from right and left side edges of the base portion 11 toward an outside. The molded surface fastener 1 is manufactured using a manufacturing apparatus 40 provided with a molding apparatus 41 and a heat press apparatus 45 described later as shown in FIG. 8, and is formed to be long in a machine direction (MD) along a conveyance pass of the manufacturing apparatus 40.

In the present invention, a material of the molded surface fastener 1 is not particularly limited, and for example, thermoplastic resin such as polyamide resin, polyester resin, polypropylene resin, PVC resin, ABS resin, polyethylene resin, or a copolymer thereof can be adopted.

Further in the Embodiment 1, in the resin-intrusion-preventing wall portion 20, described later, of the molded surface fastener 1, magnetic particles (ferromagnetic body) composed of an alloy of iron, cobalt, nickel and the like are contained (mixed) in the synthetic resin forming the molded surface fastener 1.

In the present invention, the material of the magnetic particles is not particularly limited as long as the material is magnetically attracted to a magnet.

In each drawing, a part containing the magnetic particles in the molded surface fastener 1 is expressed in a gray color. In the actually manufactured molded surface fastener 1, the molded surface fastener 1 can be colored in a desired color (for example, green) by containing pigment or the like in the synthetic resin. Further, in the part of the molded surface fastener 1 containing the magnetic particles, black or gray color appeared by the magnetic particles is exposed contrary to the color of the molded surface fastener 1 (for example, green) to be colored.

The base portion 11 in the molded surface fastener 1 of the Embodiment 1 is formed to be a flat plate shape in which a thickness dimension in the upper and lower direction is small, and an upper surface and a lower surface of the base portion 11 are formed to be a flat surface respectively. In the present invention, when a molded surface fastener 1 is integrated to a cushion body by conducting a foam molding of the cushion body, it is also possible to provide a plurality of concave groove portions or projected portions parallel to a length direction on the lower surface of the base portion 11, in order to secure a large bonded area of the molded surface fastener 1 with the cushion body to increase a fixing strength, as described in the Patent Document 1, for example.

The right and left resin-intrusion-preventing wall portions 20 in the Embodiment 1 are provided along a front and rear direction at positions closer to side edges which are slightly inside of the right and left side end edges of the base portion 11. In the present invention, the positions of the right and left resin-intrusion-preventing wall portions 20 can be arbitrary changed as long as it is within a region of a side edge part formed within a predetermined range from a left side end edge or a right side end edge of the base portion 11 toward an inside of the base portion 11 (for example, a range of 20% or less of a width dimension of the base portion 11 from the left side end edge or the right side end edge toward the inside of the base portion 11).

Each of the right and left resin-intrusion-preventing wall portions 20 includes two vertical wall rows 21 formed parallel to a length direction, connecting wall portions 23 connecting between divided vertical wall portions 22 in the vertical wall rows 21, described later, and reinforcing portions 24 provided on a side of an outer wall surface of the divided vertical wall portions 22 in the vertical wall row 21 (a second vertical wall row 21b, described later) disposed on outer sides of a right and left direction. In the Embodiment 1, the resin-intrusion-preventing wall portion 20 may be formed without providing any reinforcing portion 24.

The resin-intrusion-preventing wall portion 20 of the Embodiment 1 has two vertical wall rows 21 as vertical wall rows 21, which are a first vertical wall row 21a disposed on an inner side closer to the engaging elements 12 in the right and left direction of the resin-intrusion-preventing wall portion 20 and a second vertical wall row 21b disposed on an outer side apart from the engaging elements 12.

The first vertical wall row 21a and the second vertical wall row 21b are disposed in rows along the length direction, and have a plurality of divided vertical wall portions 22 disposed intermittently at predetermined attaching pitches, respectively. A predetermined gap 25 is provided between the two divided vertical wall portions 22 disposed adjacently in the length direction of each vertical wall row 21. In this case, an attaching pitch of the divided vertical wall portions 22 disposed in each vertical wall row 21 is set to be a size of a half of the attaching pitch of the engaging elements 12 in the length direction, described later.

Further in the Embodiment 1, the divided vertical wall portions 22 in the first vertical wall row 21a and the divided vertical wall portions 22 in the second vertical wall row 21b are disposed alternately such that the arrangement positions are shifted by a half size of the attaching pitch of the divided vertical wall portions 22 in the length direction. The divided vertical wall portions 22 in the first vertical wall row 21a and the second vertical wall row 21b are arranged in a staggered manner as a whole.

In a case of the Embodiment 1, the divided vertical wall portion 22 in the first vertical wall row 21a and the second vertical wall row 21b are set to have overlapped parts 26 in which parts of the divided vertical wall portions 22 overlap with each other between the first vertical wall row 21a and the second vertical wall row 21b in a side view from the right and left direction (FIG. 3). That is, in FIG. 3, each divided vertical wall row portion 22 disposed in the second vertical wall row 21b on the outer side overlaps with the divided vertical wall portion 22 in the first vertical wall row 21a on the inner side at both front and rear end parts thereof. Each divided vertical wall portion 22 disposed in the first vertical wall row 21a on the inner side overlaps with the divided vertical wall portion 22 in the second vertical wall row 21b on the outer side at both front and rear end parts thereof in FIG. 3.

Each divided vertical wall portion 22 of the Embodiment 1 includes a pillar portion 22a standing on the base portion 11 and a top end portion 22b provided on the pillar portion 22a bulging in the length direction and the width direction. In this case, overlapped parts are provided on the pillar portion 22a and the top end portion 22b of each divided vertical wall portion 22 to overlap with the divided vertical wall portions 22 in the adjacent vertical wall row 21 in a side view. A height dimension of each divided vertical wall portion 22 in the upper and lower direction from the upper surface of the base portion 11 to an upper surface of the top end portion 22b is set to be as large as the maximum value of a height dimension of the engaging elements 12 from the upper surface of the base portion 11.

The pillar portion 22a of each divided vertical wall portion 22 is formed to be a truncated square pyramid shape which is thin and long in the length direction. An inner wall surface and an outer wall surface (right and left side wall surfaces) of the pillar portion 22a are formed to be in parallel to each other. A front wall surface and a rear wall surface of the pillar portion 22a are formed to be sloped with respect to the upper and lower direction such that a length dimension of the pillar portion 22a in the front and rear direction gradually decreases as it extends upward. The pillar portion 22a has a substantially trapezoidal shape when viewed from right and left sides.

The top end portion 22b of each divided vertical wall portion 22 is formed to extend from an upper end outer periphery of the pillar portion 22a so as to bulge in the length direction and the width direction. The upper surface of the top end portion 22b is formed to be flat. Since each divided vertical wall portion 22 includes the top end portion 22b having such a shape, it is possible to increase an adhesion area between the vertical wall rows 21 of the molded surface fastener 1 and a cavity surface (fastener attaching surface) 47 of the fastener holding portion 46a in the molding die 46 when the molded surface fastener 1 is adhered to the fastener holding portion 46a of the molding die 46, described later (See FIG. 12).

Moreover, since the top end portion 22b disposed on the upper end part of the divided vertical wall portion 22 is formed to bulge in the length direction and the width direction as mentioned above, it is possible to mix a larger amount of magnetic particles in the upper end part of the divided vertical wall portion 22. As a result, the molded surface fastener 1 can be attracted more strongly and fixed firmly by a magnet 48 set in the molding die 46, described later.

In this case, a dimension in the length direction of a boundary between the pillar portion 22a and the top end portion 22b in each divided vertical wall portion 22 is set to be as large as a dimension in the length direction of a gap 25 between the boundaries of two divided vertical wall portions 22 adjacent in the length direction, or is set be smaller than the dimension in the length direction of the gap 25. Thereby, the area where the divided vertical wall portion 22 in the first vertical wall row 21a and the divided vertical wall portion 22 in the second vertical wall row 21b overlap with each other in a side view can be made smaller to form the resin-intrusion-preventing wall portion 20. As a result, the flexibility of the molded surface fastener 1 can be further improved.

The connecting wall portion 23 of the Embodiment 1 is provided along the right and left direction, and connects a front end part (or a rear end part) of the divided vertical wall portion 22 disposed in the first vertical wall row 21a with a rear end part (or a front end part) of the divided vertical wall portion 22 disposed in the second vertical wall row 21b mutually. In this case, the divided vertical wall portion 22 disposed in the first vertical wall row 21a or the second vertical wall row 21b are connected with the two divided vertical wall portions 22 disposed in the adjacent second vertical wall row 21b or the first vertical wall row 21a via the two connecting wall portions 23.

A height dimension of each connecting wall portion 23 from the upper surface of the base portion 11 is set to be as large as the divided vertical wall portions 22 in the first vertical wall row 21a and the second vertical wall row 21b. That is, the resin-intrusion-preventing wall portion 20 of the Embodiment 1 is formed such that the divided vertical wall portions 22 in the first vertical wall row 21a and the second vertical wall row 21b and the connecting wall portions 23 continue in a series so as to meander in a staggered shape with a certain height dimension.

For this reason, when the molded surface fastener 1 is adhered to the cavity surface (fastener attaching surface) 47 of the molding die 46, the engaging region 15 is separated by the resin-intrusion-preventing wall portion 20, thereby it is possible to prevent foam resin material of the cushion body from intruding into the engaging region 15 over the resin-intrusion-preventing wall portion from an outside region of the resin-intrusion-preventing wall portion.

The same height dimension between the connecting wall portion 23 and the divided vertical wall portion 22 mentioned here includes a case that there are some differences. For example, the case that the height dimension of the connecting wall portion 23 and the height dimension of the divided vertical wall portion 22 are approximately the same size and that the a slight gap in which the foam resin materials cannot pass through is formed between the cavity surface 47 and the connecting wall portion 23 or the divided vertical wall portion 22 when the molded surface fastener 1 is adhered to the cavity surface (fastener attaching surface) 47 of the molding die 46 is included. In other words, in the present invention, the height dimension of the connecting wall portion 23 may be set slightly smaller than the height dimension of the divided vertical wall portion 22 in the first vertical wall row 21a and the second vertical wall row 21b to an extent that the small gap in which the foam synthetic resin material cannot intrude is generated between the connecting wall portion 23 and the cavity surface 47 of the molding die 46 when the resin-intrusion-preventing wall portion 20 of the molded surface fastener 1 is adhered to the cavity surface 47 of the molding die 46.

The connecting wall portion 23 in the Embodiment 1 includes an upper end part having a curved upper surface, and is formed to have a tapered shape such that a length dimension in the front and rear direction gradually increases as getting closer to the base portion 11 from the upper end part when a cross section orthogonal to the right and left direction is viewed. Here, the upper surface of the connecting wall portion 23 means a part as a curved surface in a convex shape disposed between an upper end of a flat front end surface and an upper end of a flat rear end surface in the connecting wall portion 23. In some cases, the upper surface of the connecting wall portion 23 of the Embodiment 1 is formed not in a curved shape as described above, but in a flat shape partially.

Further, the connecting wall portion 23 is formed such that a width dimension W1 in the right and left direction (in other words, an interval W1 in the right and left direction between the first vertical wall row 21a and the second vertical wall row 21b) is larger than the maximum width dimension W2 of the first vertical wall row 21a in the right and left direction or the maximum width dimension W3 of the second vertical wall row 21b in the right and left direction. In addition, the connecting wall portion 23 is formed to be larger than a total value of the width dimension W2 of the first vertical wall row 21a in the right and left direction and the width dimension W3 of the second vertical wall row 21b in the right and left direction. In this case, the width dimension W1 of the connecting wall portion 23 in the right and left direction is set to be larger than the maximum value of a length dimension in the front and rear direction of the overlapped part 26 in which the vertical wall portion 22 in the first vertical wall row 21a and the vertical wall portion 22 in the second vertical wall row 21b overlap with each other in aside view. Here, the width dimension of each part in the right and left direction means the largest width dimension of the part when the size of the width dimension changes in accordance with a height position of the part, for example.

Further in the Embodiment 1, the width dimension W1 of the connecting wall portion 23 is set to be twice or larger of the length dimension of the upper surface of the connecting wall portion 23 in the front and rear direction, and is preferably set to be twice or larger of the length dimension of a lower end edge (a boundary between the connecting wall portion 23 and the base portion 11) of the connecting wall portion 23 in the front and rear direction. In addition, the width dimension W1 of the connecting wall portion 23 is set to be a size larger than ⅓ of a width dimension W4 of the whole resin-intrusion-preventing wall portion 20 (that is, a width dimension from a position of an upper end inner side edge in the first vertical wall row 21a on the inner side to a position of an outer wall surface of a reinforcing portion 24 which is integrated to the second vertical wall row 21b on the outer side), and is preferably a size of 40% or larger than the width dimension W4 of the whole resin-intrusion-preventing wall portion 20.

Since the connecting wall portion 23 of the Embodiment 1 is formed to have a large width dimension W1 as described above, the resin-intrusion-preventing wall portion 20 can be formed to be wide in the width direction. Further, it is possible to largely secure an elastically deformable part when the molded surface fastener 1 is curved in the upper and lower direction along the length direction, and to form the molded surface fastener 1 so as to bend in the upper and lower direction easily.

Particularly in a case that the resin-intrusion-preventing wall portion 20 contains the magnetic particles as described above, the resin-intrusion-preventing wall portion 20 tends to be formed hard due to an effect of the magnetic particles, and the molded surface fastener 1 is hardly deformed. However, in the Embodiment 1, since the connecting wall portion 23 of the resin-intrusion-preventing wall portion 20 is formed to be thin and long in the width direction as mentioned above, the connecting wall portion 23 can be easily deformed and the amount of deformation can be largely secured. As a result, the resin-intrusion-preventing wall portion 20 can be elastically deformed easily.

That is, since the connecting wall portion 23 has the width dimension capable of elastically deforming easily as above, it is possible to easily widen or narrow the gap 25 formed between the divided vertical wall portions 22 in the first vertical wall row 21a and the gap 25 formed between the divided vertical wall portions 22 in the second vertical wall row 21b due to the elastic deformation of the connecting wall portion 23. Therefore, the molded surface fastener 1 of the Embodiment 1 can be curved in the upper and lower direction with a smaller force, and also can be deformed so as to be twisted about the length direction.

Further, since the width dimension of the resin-intrusion-preventing wall portion can be largely secured, it is possible to effectively prevent an intrusion of the foam resin materials by the resin-intrusion-preventing wall portion 20 at the time of foam molding of the cushion body. In addition, since the resin-intrusion-preventing wall portion 20 is formed to have a large width, it is possible to secure a large region containing the magnetic particles in the resin-intrusion-preventing wall portion 20, and to increase the contained amount of the magnetic particles. Therefore, it is possible to increase an attracting force to which the molded surface fastener 1 is attracted by the magnet 48 set in the molding die 45.

In a case that the width dimension of the connecting wall portion 23 in the right and left direction is made large to some extent, it is assumed that an effect improving the flexibility of the molded surface fastener 1 due to an increase of the width dimension in the connecting wall portion 23 cannot be obtained any more. Further, in a case that the resin-intrusion-preventing wall portion 20 becomes too large in the right and left direction, it is assumed that handling of the molded surface fastener 1 may become difficult. Therefore, it is preferable that the width dimension of the connecting wall portion 23 in the right and left direction is set to be 5 times or smaller of the width dimension in the right and left direction of the divided vertical wall portions 22 in the first vertical wall row 21a and the second vertical wall row 21b, or is set to be a size of 70% or smaller of the width dimension of the whole resin-intrusion-preventing wall portion 20 in the right and left direction.

The magnetic particles are contained in each of the right and left resin-intrusion-preventing wall portions 20 in the Embodiment 1 as described above. In a case of the Embodiment 1, the magnetic particles are contained only in the resin-intrusion-preventing wall portion 20, and substantially no magnetic particles are contained in the base portion 11, the engaging elements 12, and the lateral wall portions 13. That is, the base portion 11 is formed of synthetic resin having flexibility, and therefore can be easily bent in the upper and lower direction.

In the present invention, it is preferable that the magnetic particles are contained in the engaging elements 12 or the lateral wall portions 13 at a lower rate than the upper end part of the resin-intrusion-preventing wall portion 20, or substantially no magnetic particles are contained. The reason is that, in a case that the magnetic particles are contained in the engaging elements 12, the engaging elements 12 become weak, which leads to a lowering engaging strength with loop shaped engaging elements. Therefore, it is particularly preferable that the engaging elements 12 are formed of the synthetic resin substantially containing no magnetic particles.

In the present invention, that "substantially no magnetic particles are contained" includes a case that the part is formed of synthetic resin containing the magnetic particles at 10 wt % or less, preferably 5 wt % or less as well as a case that the part is formed of the synthetic resin containing no magnetic particles at all. This is because the molded surface fastener of the present invention is manufactured by recycling products in order to reduce an environmental load in some cases.

For example, a molding for a molded surface fastener is conducted by finely cutting a completed product of the molded surface fastener partially including the magnetic materials (magnetic particles) and recycling it as an extruded resin pellet which does not positively contain the magnetic materials. In this case, since some magnetic materials may be contained in the synthetic resin to be the main material of the molded surface fastener, the present invention also includes the molded surface fastener manufactured from such a recycled material.

Therefore, the term "part containing magnetic material" as used in the present specification means "a part in which the rate of the magnetic materials (magnetic particles) to be contained in the synthetic resin is 40 wt % or more and 80 wt % or less" as described later, and the term "a part substantially containing no magnetic materials" means "a part in which the rate of the magnetic materials contained in the synthetic resin is 10 wt % or less".

In this case, the resin-intrusion-preventing wall portion 20 of the Embodiment 1 is provided with a concentration gradient portion 50 which contains the magnetic particles and decreases its concentration as it extends downward. The concentration gradient portion 50 of the Embodiment 1 is formed at the upper end part of the resin-intrusion-preventing wall portion 20 (that is, the upper end part of each divided vertical wall portion 22 and the upper end part of each connecting wall portion 23), and includes a high concentration portion 51 containing the magnetic particles at the highest concentration and a downward gradient portion 52 gradually decreasing the concentration of the contained magnetic particles as it extends downward from the high concentration portion 51.

In the case of the Embodiment 1, the concentration (contained rate) of the magnetic particles of the high concentration portion 51 with respect to the synthetic resin is set to be a certain rate at 50 wt %. The high concentration portion 51 is provided to extend in the upper and lower direction to a range of 10% or larger of a height dimension from the upper end of the divided vertical wall portion 22 and the upper end of the connecting wall portion 23 to the base portion 11, and preferably to a range of 15% or larger of the height dimension.

Since the high concentration portion 51 of the magnetic particles is, in the upper and lower direction, extended to a 10% range of the height dimension from the upper end of the divided vertical wall portion 22 and the connecting wall portion 23, or larger in this manner, it is possible to stably generate a large attracting force by the magnet between the magnet 48 buried in the fastener holding portion 46a of the molding die 46, described later, and the magnetic particles contained in the resin-intrusion-preventing wall portion 20 of the molded surface fastener 1. Therefore, the molded surface fastener 1 can be attracted to firmly fixed to the fastener holding portion 46a of the mold 46.

In the present invention, the high concentration portion 51 containing the magnetic particles at a constant high concentration may be provided only in a region of the resin-intrusion-preventing wall portion 20 which is extremely small to be difficult to be visually recognized, and also may extend over the entire height dimension of the resin-intrusion-preventing wall portion 20 from the base portion 11 (that is, the divided vertical wall portion 22 and the connecting wall portion 23 as a whole may contain the magnetic particles at a certain high concentration) as in a case of a modification example (see FIG. 15), described later.

In the present invention, the concentration of the contained magnetic particles in the high concentration portion 51 of the resin-intrusion-preventing wall portion 20 is not particularly limited and can be changed arbitrarily, however, it is preferable that the concentration of the contained magnetic particles in the high concentration portion 51 is set to be, for example, 40 wt % or more and 80 wt % or less, and particularly 45 wt % or more and 70 wt % or less. Since the concentration at the high concentration portion 51 is set to be 40 wt % or more, preferably 45 wt % or more, the molded surface fastener 1 can be magnetically attracted by the magnet 48 of the molding die 46, and stably fixed to the fastener holding portion 46a of the molding die 46. Further, the concentration of the contained magnetic particles in the high concentration portion 51 is set to be 80 wt % or less, and preferably 70 wt % or less, thereby a strength of the resin-intrusion-preventing wall portion 20 can be stably secured.

In the concentration gradient portion 50 of the Embodiment 1, the downward gradient portion 52 in which the concentration of the contained magnetic particles decreases from the high concentration portion 51 downward is formed as a concentration changing portion for changing the concentration of the contained magnetic particles so as to gradually decrease as it extends downward. The downward gradient portion (concentration changing portion) 52 is formed continuously from the above-mentioned high concentration portion 51 downward. The downward gradient portion 52 does not extend to a lower end of the resin-intrusion-preventing wall portion 20. Therefore, a lower end part of the resin-intrusion-preventing wall portion 20 is formed of synthetic resin substantially containing no magnetic particles.

In this case, the downward gradient portion 52 is disposed across the region having the height dimension equal to 10% or more of the resin-intrusion-preventing wall portion 20 from the base portion 11, preferably the region for 20% or more, and particularly preferably the region for 30% or more. In a case of the Embodiment 1, the downward gradient portion 52 is provided across the region having the height dimension equal to 50% or more of the resin-intrusion-preventing wall portion 20.

In the resin-intrusion-preventing wall portion 20 of the Embodiment 1 having the concentration gradient portion 50 described above, when each divided vertical wall portion 22 and each connecting wall portion 23 are divided into three in the upper and lower direction, for example, the divided vertical wall portion 22 and the connecting wall portion 23 are comparted into an upper region, a middle region, and a lower region having the same height dimension respectively. In this case, when an average concentration of the contained magnetic particles in each region of the divided vertical wall portion 22 and the connecting wall portion 23 is compared, the upper regions of the divided vertical wall portion 22 and the connecting wall portion 23 have the highest average concentration. Further, the average concentration in the middle region of the divided vertical wall portion 22 and the connecting wall portion 23 shows a lower value than that of the upper region, and the average concentration in the lower region shows a further lower value than that of the middle region since the concentration gradient portion 50 is provided.

The concentration gradient portion 50 (particularly the downward gradient portion 52) is provided on the resin-intrusion-preventing wall portion 20 of the Embodiment 1 as described above, the boundary between the part containing the magnetic particles and the part made of synthetic resin only and substantially containing no magnetic particles is not clearly formed. Therefore, it is possible that the amount of the contained magnetic particles gradually decreases from the upper end pat to the lower end part of the resin-intrusion-preventing wall portion 20. Thereby, it is possible to significantly improve the adhesion property in the molded surface fastener 1 between the part containing the magnetic particles and the part containing no magnetic particles, as compared to the conventional molded surface fasteners. In the concentration gradient portion provided in the present invention, it is not always necessary to gradually change the amount of the contained magnetic particles, and the concentration changing portion gradually changing the concentration is not necessarily provided.

Since the concentration gradient portion 50 is provided in the resin-intrusion-preventing wall portion 20 as described above, amount of the used magnetic particles can be decreased compared to the case that the magnetic particles are contained uniformly at the same certain concentration as the high concentration portion 51 in the same region in which the high concentration portion 51 and the downward gradient portion 52 of the resin-intrusion-preventing wall portion 20 are provided, for example. Thereby, it is possible to reduce the manufacturing cost, and to secure the flexibility of the molded surface fastener 1 properly by suppressing the lowering of the flexibility of the synthetic resin due to the inclusion of the magnetic particles.

A plurality of the engaging elements 12 formed in the Embodiment 1 stand in a length direction and a width direction at predetermined pitches so as to obtain a predetermined connecting force (engaging force) with a skin material to cover the cushion body. Particularly in the Embodiment 1, the engaging elements 12 are disposed in a row at predetermined pitches in the length direction, and longitudinal rows of the engaging elements 12 are disposed in five rows in the width direction. In the present invention, a region between the right and left resin-intrusion-preventing wall portions 20 in which the plurality of the engaging elements 12 as above are formed is called as an engaging region 15.

In the present invention, the arrangement pattern of the engaging elements 12 is not particularly limited. As shown in FIG. 1 and FIG. 2, for example, the engaging region 15 may be formed by aligning the engaging elements 12 in the length direction and the width direction. Further, the engaging region 15 may be formed by such as placing the engaging elements 12 between the right and left resin-intrusion-preventing wall portions 20 in a predetermined arrangement pattern such as staggered manner, and placing the engaging elements 12 randomly.

Each engaging element 12 in the Embodiment 1 is formed to have the same shape as the engaging elements described in the Patent Document 1. That is, the engaging element 12 of the Embodiment 1 includes a stand portion standing vertically from the upper surface of the base portion 11 and a hook shaped engaging head portion extending in a curved manner toward a front and rear in the length direction at an upper end of the stand portion, which is configured to be a so-called male engaging element.

In this case, a maximum value of a height dimension of each engaging element 12 from the base portion 11 is set to be the same size as a height dimension of the divided vertical wall portion 22 from the base portion 11 as described above. In the present invention, the shape and the dimension of each engaging element 12 are not particularly limited, and can be changed arbitrarily. For example, the height dimension of the engaging element 12 from the base portion 11 can be set lower than that of the divided vertical wall portion 22.

The lateral wall portion 13 of the Embodiment 1 is formed along a width direction between the resin-intrusion-preventing wall portion 20 and the engaging element 12, and between the engaging elements 12 adjacent to each other in the right and left direction. Each lateral wall portion 13 is connected with the engaging elements 12 disposed adjacently at a lower end part (end part on a side of the base portion 11). Thereby, the lateral wall portion 13 and the engaging elements 12 are reinforced with each other.

A height dimension of the lateral wall portion 13 from the base portion 11 is set to be the same size as the height dimension of the divided vertical wall portion 22 and the connecting wall portion 23 from the base portion 11. That is, in the molded surface fastener 1 of the Embodiment 1, the height dimensions of the divided vertical wall portion 22, the connecting wall portion 23, the lateral wall portion 13, and the engaging element 12 are set to be the same size, and upper surfaces or upper ends thereof are disposed on the same plane.

Therefore, since the molded surface fastener 1 is attracted and fixed to the fastener holding portion 46a of the molding die 46 when foam molding of the cushion body is conducted, as described later, the divided vertical wall portion 22, the connecting wall portion 23, the lateral wall portion 13, and the engaging element 12 of the molded surface fastener 1 can be stably adhered to the cavity surface (fastener attaching surface) 47 of the fastener holding portion 46a of the molding die 46. As a result, it is possible to prevent the foam resin material from intruding into the engaging region 15 from the width direction over the right and left resin-intrusion-preventing wall portions 20 of the molded surface fastener 1, and to prevent the foam resin material from intruding into the engaging region 15 from the length direction over the lateral wall portion 13 and the engaging element 12.

Although the lateral wall portion 13 and the engaging element 12 are connected with each other at the lower end part as described above, they are disposed apart from each other with a small interval therebetween at the upper end part. Although the lateral wall portion 13 and the engaging element 12 are apart from each other at the upper end part as described above, the interval is very small, so that the foam resin material of the cushion body does not intrude into the engaging region 15 from the gap between the lateral wall portion 13 and the engaging element 12.

The fin piece portion 14 in the Embodiment 1 is extended in a tongue piece manner from right and left side edges of the base portion 11 toward an outside. The fin piece portion 14 on a left side and the fin piece portion 14 on a right side are disposed alternately with a predetermined attaching pitches in the length direction. The right and left fin piece portions 14 are parts to be buried inside the cushion body when foam molding of the cushion body is conducted, and are provided to increase a fixing strength of the molded surface fastener 1 with respect to the cushion body.

The molded surface fastener 1 of the Embodiment 1 having the above-mentioned configuration, is manufactured using a manufacturing apparatus 40 as shown in FIG. 8, for example.

The manufacturing apparatus 40 includes a molding apparatus 41 for conducting a primary molding step and a heat press apparatus 45 for conducting a secondary molding step in which a primary molded body 10 molded in the primary molding step is heated and pressed.

The molding apparatus 41 of the Embodiment 1 includes a die wheel 42 driving rotationally in one direction (counterclockwise direction in the drawing), an extrusion nozzle 43 disposed facing to a circumferential surface of the die wheel 42 and extruding a molten synthetic resin material continuously, and a pickup roller 44 disposed at a downstream side of the extrusion nozzle 43 in a rotating direction of the die wheel 42.

On the circumferential surface of the die wheel 42 of the molding apparatus 41, molding cavities for molding primary divided vertical wall portions 32 and the connecting wall portions 23 of the primary molded body 10, described later, and molding cavities for molding the engaging elements 12 and the lateral wall portions 13 are formed. An interval between the extrusion nozzle 43 and the die wheel 42 is adjusted to a size corresponding to a thickness dimension of the base portion 11 to be molded.

Further, in order to cool the primary molded body 10 molded on the circumferential surface of the die wheel 42, the die wheel 42 circulates a cooling liquid inside the die wheel 42. A cooling liquid tank, not shown, is disposed at a lower part of the die wheel 42 so as to immerse a lower half part of the die wheel 42.

Figure 9:
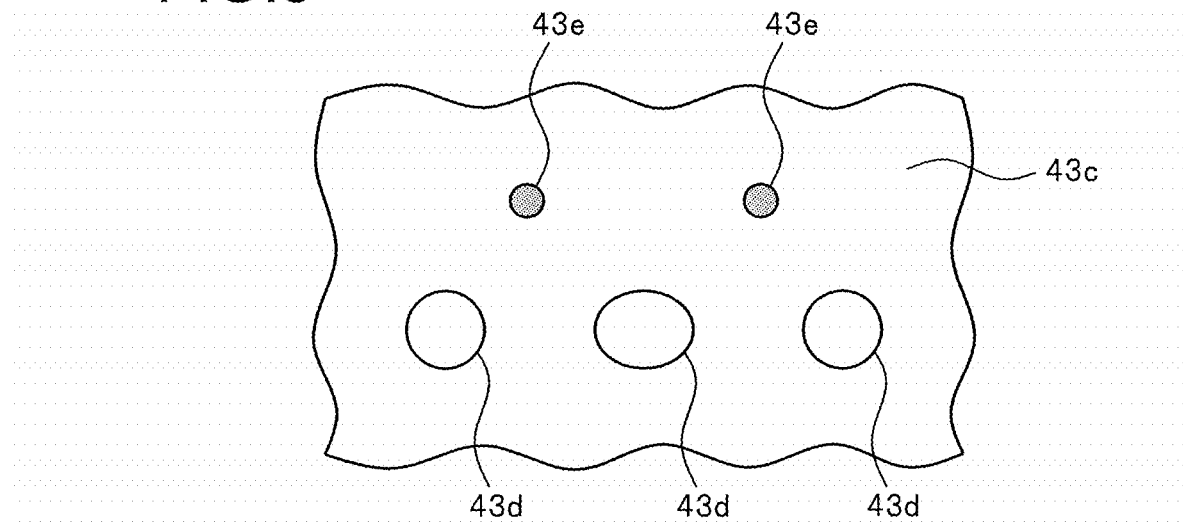
FIG. 9 is a schematic view expressing a positional relationship of extrusion ports in an extrusion nozzle of a molding apparatus disposed on the manufacturing apparatus.

A first flow path 43a for flowing only molten synthetic resin material without magnetic particles being kneaded and a second flow path 43b for flowing molten synthetic resin material with magnetic particles being kneaded are formed on the extrusion nozzle 43. As shown in FIG. 9, an extrusion surface 43c of the extrusion nozzle 43 is provided with three first extrusion ports 43d for discharging only the molten synthetic resin material and two second extrusion ports 43e for discharging the molten synthetic resin material in which the magnetic particles are kneaded.

In this case, the three first extrusion ports 43d communicate with the first flow path 43a of the extrusion nozzle 43, and the two second extrusion ports 43e communicate with the second flow path 43b of the extrusion nozzle 43. The two first extruding ports 43d disposed on the right and left sides among the three first extrusion ports 43d are formed as a circular shape, and the first extrusion port 43d disposed in the center is formed as an elliptical shape larger than the first extrusion ports 43d on the right and left.

The two second extrusion ports 43e for discharging the synthetic resin material kneaded with the magnetic particles are formed as a circular shape at positions on an upper side of the three first extrusion ports 43d and between the center first extrusion port 43d and the right and left first extrusion ports 43d, corresponding to the position where the primary resin-intrusion-preventing wall portion 30 of the primary molded body 10, to be described later, is provided. In the present invention, the positions, shapes, dimensions, and the like of the first extrusion port 43d and the second extrusion port 43e can be changed arbitrarily. For example, all the three first extruding ports 43d may be formed in the same shape and the size.

The heat press apparatus 45 of the Embodiment 1 includes an upper and lower pair of press rollers (calender rollers) 45a, 45b disposed on the downstream side of the pickup roller 44, and a heat source, not shown, is provided inside the upper side press roller 45a. The upper side press roller 45a and the lower side press roller 45b are disposed to face each other with a predetermined interval. In this case, the interval between the upper side press roller 45a and the lower side press roller 45b can be adjusted by a height adjusting means, not shown, and is adjusted corresponding to the height dimension of the divided vertical wall portion 22 of the molded surface fastener 1 to be manufactured.

In the present invention, it is also possible to use an upper side belt mechanism and/or a lower side belt mechanism, not shown, instead of the upper side press roller 45a and/or the lower side press roller 45b. In this case, the upper side belt mechanism and the lower side belt mechanism respectively have an endless belt, and a right and left pair of rotating rollers around which the endless belt is wound and rotate the endless belt in one direction.

In a case of manufacturing the molded surface fastener 1 using the manufacturing apparatus 40 having the molding apparatus 41 and the heat press apparatus 45 as described above, first, a primary molding step for molding the primary molded body 10 by the molding apparatus 41 is conducted.

In the primary molding step, the molten synthetic resin material is continuously extruded from the three first extrusion ports 43d of the extrusion nozzle 43 toward the circumferential surface of the die wheel 42. At the same time, the material in which the magnetic particles are kneaded with the molten synthetic resin material at a predetermined rate (at a rate of 50 wt %, for example) is continuously extruded from the two second extrusion ports 43e toward the circumferential surface of the die wheel 42.

Figure 10:
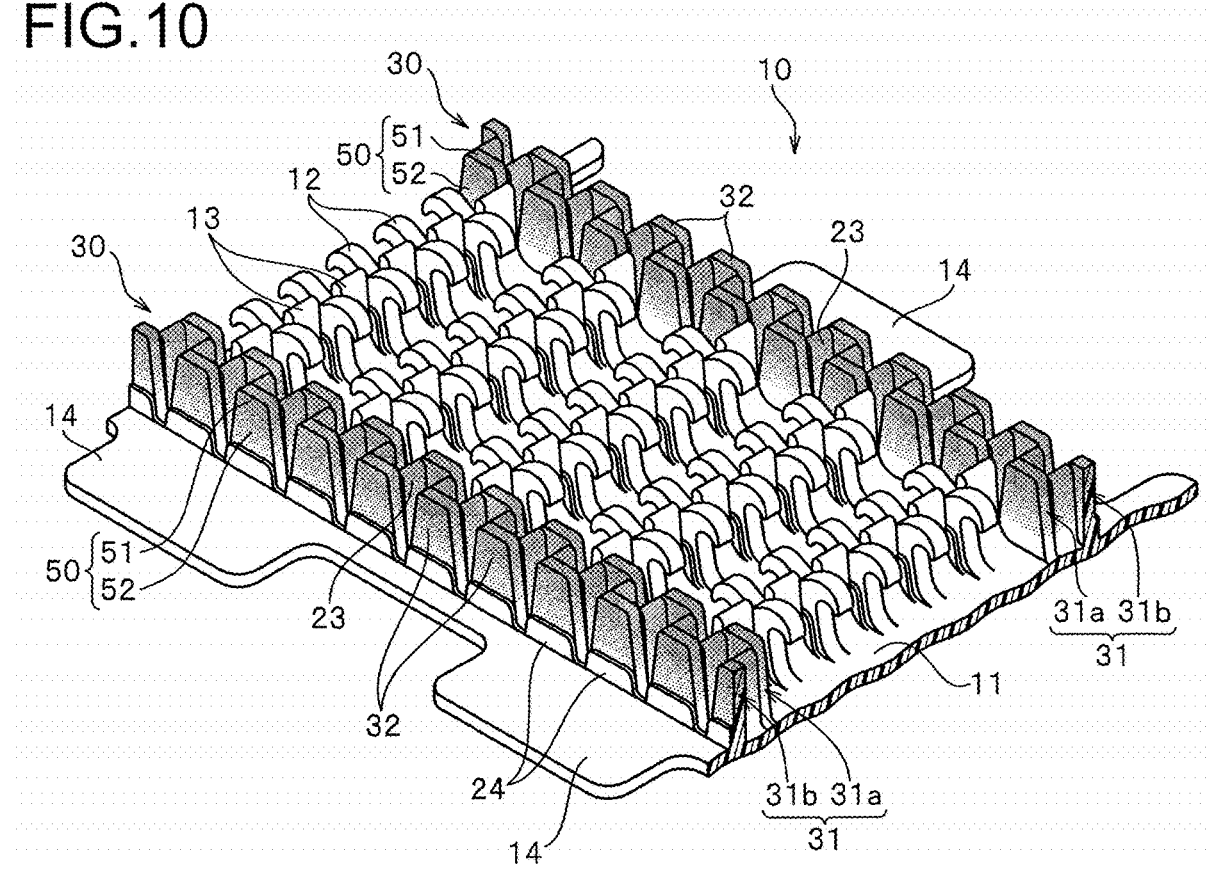
FIG. 10 is a perspective view illustrating a primary molded body molded in a primary molding step in the manufacturing apparatus.
Figure 11:
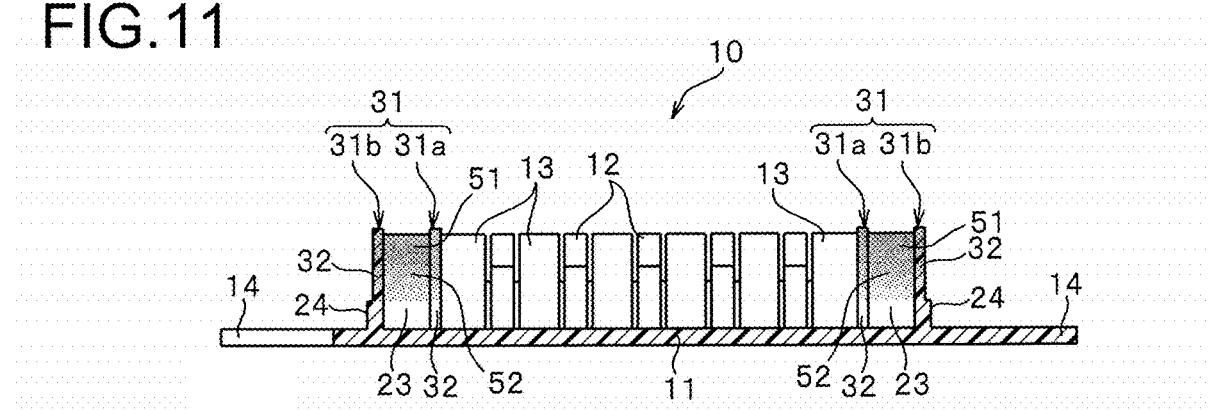
FIG. 11 is a cross sectional view of the primary molded body.

In this way, two kinds of molten materials which are the synthetic resin material and the synthetic resin material containing the magnetic particles are extruded from the extrusion nozzle 43, and the die wheel 42 is drivingly rotated in one direction, thereby the primary molded body 10 as shown in FIG. 10 and FIG. 11 is continuously formed on the circumferential surface of the die wheel 42 in accordance with the rotation of the die wheel 42.

Here, the primary molded body 10 (also referred to as an auxiliary molded body) molded by the molding apparatus 41 of the Embodiment 1 includes a thin plate-shaped base portion 11, the right and left primary resin-intrusion-preventing wall portions 30 standing on the upper surface of the right and left side edge parts of the base portion 11, a plurality of engaging elements 12 and a plurality of lateral wall portions 13 disposed between the right and left primary resin-intrusion-preventing wall portions 30. In this case, the base portion 11, the engaging element 12, and the lateral wall portion 13 of the primary molded body 10 become the base portion 11, the engaging element 12, and the lateral wall portion 13 of the molded surface fastener 1 as they are.

The right and left primary resin-intrusion-preventing wall portions 30 formed in the primary molded body 10 are press molded in the secondary molding step, described later, to be the parts formed as the right and left resin-intrusion-preventing wall portions 20 of the molded surface fastener 1. The primary resin-intrusion-preventing wall portions 30 of the Embodiment 1 respectively include two primary vertical wall rows 31 provided with a plurality of primary divided vertical wall portions 32 along a length direction (that is, the primary first vertical wall row 31*a* and the primary second vertical wall row 31*b*), a connecting wall portion 23 connecting the primary divided vertical wall portions 32 adjacent in the right and left direction, and a reinforcing portion 24 provided in the primary divided vertical wall portion 32 in the primary second vertical wall row 31*b*. In this case, the connecting wall portion 23 and the reinforcing portion 24 of the primary resin-intrusion-preventing wall portion 30 become the connecting wall portion 23 and the reinforcing portion 24 in the resin-intrusion-preventing wall portion 20 of the molded surface fastener 1 as they are.

The primary divided vertical wall portion 32 forming the primary vertical wall row 31 of the primary molded body 10 is a part which becomes the divided vertical wall portion 22 of the molded surface fastener 1 by being press molded by the heat press apparatus 45 in a subsequent step. In the primary divided vertical wall portion 32, the top end portion 22*b* which the divided vertical wall portion 22 of the molded surface fastener 1 includes is not formed. Therefore, the primary divided vertical wall portion 32 has a trapezoidal shape when viewed from the right and left direction. Further, as shown in FIG. 11, a height dimension of each primary divided vertical wall portion 32 from the base portion 11 is set to be larger than a height dimension of the connecting wall portion 23 from the base portion 11, and is set to be larger than a height dimension of the divided vertical wall portion 22 of the molded surface fastener 1 on which the secondary molding step has been conducted from the base portion 11.

In each primary divided vertical wall portion 32 and the connecting wall portion 23, a concentration gradient portion 50 containing magnetic particles and decreasing its concentration as it extends downward is provided. The concentration gradient portion 50 has a high concentration portion 51 containing the magnetic particles at the certain highest concentration and a downward gradient portion 52 for gradually decreasing the concentration of the contained magnetic particles from the high concentration portion 51 downward. In this case, the high concentration portion 51 of the concentration gradient portion 50 is formed at the upper end part of the primary divided vertical wall portion 32 and the upper end part of the connecting wall portion 23. The downward gradient portion 52 is continuously formed from the high concentration portion 51 below the high concentration portion 51 in the primary divided vertical wall portion 32 and the connecting wall portion 23.

The primary molded body 10 having the primary resin-intrusion-preventing wall portion 30 as mentioned above is continuously molded from synthetic resin material and the like being extruded from the extrusion nozzle 43 of the molding apparatus 41 on the circumferential surface of the die wheel 42. In this case, the two kinds of molten synthetic resin material extruded from the extrusion nozzle 43 is cooled and cured by being half-rotated while being held on the outer peripheral surface of the die wheel 42.

At this time, the base portion 11 of the primary molded body 10 is molded between the extrusion nozzle 43 and the die wheel 42 of the molding apparatus 41. Also the primary resin-intrusion-preventing wall portion 30, engaging element 12, and the lateral wall portion 13 of the primary molded body 10 are integrally molded on the base portion 11 with each molding cavity formed on the die wheel 42.

Subsequently, the primary molded body 10 which has been cooled on the outer peripheral surface of the die wheel 42 is continuously peeled off from the die wheel 42 by the pickup roller 44. At this time, since the connecting wall portion 23 of the primary resin-intrusion-preventing wall portion 30 is formed to be long in the width direction in the primary molded body 10 of the Embodiment 1, flexibility of the primary molded body 10 is enhanced although the magnetic particles are contained in the primary resin-intrusion-preventing wall portion 30. Therefore, the primary resin-intrusion-preventing wall portion 30 can be easily bent in the upper and lower direction. This makes it easier to peel off the primary molded body 10 from the die wheel 42 and can reduce friction (force applied to the primary molded body 10) generated at the time of peeling off the primary molded body 10.

In a case that the friction at the time of peeling off the primary molded body 10 is large, for example, cracks or rips occur on the primary molded body 10, particularly between the part made of only the synthetic resin and the part containing the magnetic particles in the primary molded body 10, or the primary molded body 10 tends to be partially broken. However, as described above, since the friction at the time of peeling can be made small, cracks or rips hardly occur on the primary molded body 10 as above. Thereby, it is possible to improve the production efficiency and the yield of the molded surface fastener 1.

Further, in a case of the Embodiment 1, the downward gradient portion 52 in which the concentration of the contained magnetic particles gradually decreases as it extends downward as above is formed on each primary divided vertical wall portion 32 and each connecting wall portion 23 of the primary resin-intrusion-preventing wall portion 30. This makes it possible to enhance an adhesion property between the part containing the magnetic particles and the part containing no magnetic particles (non-containing part of the magnetic particles). Therefore, it is possible to more effectively prevent cracks or rips as described above from occurring in the primary molded body 10 when the primary molded body 10 is peeled off from the die wheel 42.

Subsequently, the primary molded body 10 peeled off from the die wheel 24 is conveyed toward the heat press apparatus 45 for conducting the secondary molding step, and is introduced between the upper side press roller 45*a* and the lower side press roller 45*b*. In the secondary molding step, when the primary molded body 10 is passed between the upper side press roller 45*a* and the lower side press roller 45*b*, the upper end part of the primary divided vertical wall portion 32 of the primary molded body 10 is heated and softened by the upper side press roller 45a. Further, the primary divided vertical wall portion 32 of the primary molded body 10 is pressed by the upper side press roller 45a from an upper side while the base portion 11 of the primary molded body 10 is supported by the lower side press roller 45b from a lower side. As a result, the upper end part of the primary divided vertical wall portion 32 is compressed so as to extend in the length direction and the width direction.

Thereby, the upper end part of the primary divided vertical wall portion 32 is thermally deformed and bulged in front and rear, and right and left directions. At the same time as the upper surface (top end surface) of the primary divided vertical wall portion 32 is flattened, the height dimension thereof is corresponded to the height dimensions of the connecting wall portion 23, the lateral wall portion 13, and the engaging element 12. As a result, the divided vertical wall portion 22 in which the top end portion 22b is integrally molded on the pillar portion 22a shown in FIG. 1 and the like is molded.

Since the upper end part formed as the high concentration portion 51 is compressed in the primary divided vertical wall portion 32, it is possible to hold more magnetic particles at the top end portion 22b of the divided vertical wall portion 22. Particularly in this case, it is possible to hold a large amount of magnetic particles in a vicinity of the top surface (top end surface) where a large area is secured by bulging in the length direction and the width direction of the top end portion 22b.

The molded surface fastener 1 of the Embodiment 1 shown in FIG. 1 and the like is manufactured by conducting such a secondary molding step on the primary molded body 10 obtained in the primary molding step. Thereafter, the manufactured molded surface fastener 1 is conveyed to a cutting part, not shown, for example, cut to a predetermined length at the cutting part to be collected, or the molded surface fastener 1 is wound up into a roll on a collecting roller or the like in an elongated state to be collected.

In the present invention, the apparatus and the manufacturing method used for manufacturing the molded surface fastener 1 are not particularly limited, and can be changed arbitrarily. In the Embodiment 1, for example, the primary molded body 10 is molded by continuously extruding molten synthetic resin material or the like from the extrusion nozzle 43 toward the circumferential surface of one rotating die wheel 42. However, in the present invention, the primary molded body 10 can also be molded using upper and lower pair of molding rollers in which the same molding cavities as those of the above die wheel 42 are formed on at least one of the circumferential surfaces by continuously extruding the molten synthetic resin material or the like from the extrusion nozzle toward between the upper and lower pair of molding rollers.

In the molded surface fastener 1 of the Embodiment 1 manufactured as described above, magnetic particles are mixed in the resin-intrusion-preventing wall portion 20 to form the concentration gradient portion 50 including the high concentration portion 51 and the downward gradient portion 52. In this case, the base portion 11 and the like of the molded surface fastener 1 substantially containing no magnetic particles exhibits a desired color (for example, green) with a pigment mixed in the synthetic resin. On the other hand, the high concentration portion 51 containing the magnetic particles at a high concentration exhibits black color (or gray), and the downward gradient portion 52 shows gradation of color from black to a desired color (green).

Thereby, when the molded surface fastener 1 of the Embodiment 1 is viewed from above (in a plan view), for example, an appearance (show) with two black colored lines along the resin-intrusion-preventing wall portion 20 in the desired color (green) is obtained. On the other hand, when the molded surface fastener 1 on a back surface side (bottom view) is viewed from below, an appearance (show) with only the desired colored color (green) exhibited on the base portion is obtained. By thus making the color on a front surface side and the color on a back surface side of the molded surface fastener 1 different from each other, it is possible to easily distinguish the front surface and the back surface of the molded surface fastener 1.

The manufactured molded surface fastener 1 of the Embodiment 1 is suitably used for a cushion body (foam body), not shown, such as seats for automobiles. In this case, the molded surface fastener 1 is integrated such that a plurality of engaging elements 12 are exposed on a front surface of the cushion body when foam molding of the cushion body is conducted.

In a case of manufacturing the cushion body in which the molded surface fastener 1 as above is integrated, first, the long molded surface fastener 1 is cut to a required length, and the cut molded surface fastener 1 is placed on the cavity surface (fastener attaching surface) 47 of the fastener holding portion 46a provided in the molding die 46 of the cushion body.

At this time, a magnet 48 such as a neodymium magnet or the like is buried in the inside of the fastener holding portion 46a of the molding die 46 corresponding to the position where the molded surface fastener 1 is placed. When the molded surface fastener 1 is placed such that the engaging elements 12 face to the cavity surface 47 of the molding die 46, the molded surface fastener 1 is magnetically attracted and fixed on the cavity surface 47 of the fastener holding portion 46a of the molding die 46.

In particular, in the molded surface fastener 1 of the Embodiment 1, the upper end part of the resin-intrusion-preventing wall portion 20 (that is, the upper end part of the divided vertical wall portion 22 and the upper end part of the connecting wall portion 23) is placed on an upper side of the molded surface fastener 1 which is the closest to the magnet 48. At the same time, the high concentration portion 51 in which the magnetic particles are dispersed at a certain high concentration is formed at the upper end part as above. Therefore, the molded surface fastener 1 can be attracted more strongly by the magnet 48 of the molding die 46, and the molded surface fastener 1 can be firmly and stably fixed to the cavity surface 47 of the fastener holding portion 46a.

In this case, the molded fastener 1 of the Embodiment 1 is formed to be easily distinguished between the front surface and the back surface by making the color on the front surface side and the color on the back surface side different from each other as mentioned above. Further, it is also possible that a position and a direction of the molded surface fastener 1 with respect to the fastener holding portion 46a of the molding die 46 is adjusted accurately and automatically to correspond to a position and a direction of the magnet 48 by using a magnetic attractive force between the magnetic particles of the molded surface fastener 1 and the magnet 48 of the molding die 46.

Therefore, an operator who performs an operation of attaching the molded surface fastener 1 of the Embodiment 1 to the fastener holding portion 46a of the molding die 46 is able to attach the molded surface fastener 1 to the fastener holding portion 46a of the molding die 46 easily without mistaking the direction of the front and back surfaces thereof. As a result, the installation work of the molded surface fastener 1 can be accurately and efficiently conducted in a short time.

In addition, the molded surface fastener 1 of the Embodiment 1 is excellent in flexibility in the upper and lower direction, because an area of the overlapped part 26 where the divided vertical wall portion 22 in the first vertical wall row 21*a* and the divided vertical wall portion 22 in the second vertical wall portion 21*b* overlap in a side view from the right and left direction is small, and the connecting wall portion 23 connecting between the divided vertical wall portions 22 in the first vertical wall row 21*a* and the second vertical wall row 21*b* is elastically deformable. Particularly, in the Embodiment 1, since the connecting wall portion 23 is formed to be thin and long along the right and left direction as mentioned above, it is possible to easily bend the molded surface fastener 1 in the upper and lower direction even when the magnetic particles which lower the flexibility are contained in the resin-intrusion-preventing wall portion 20.

Therefore, when the cavity surface 47 in the fastener holding portion 46*a* of the molding die 46 is formed as a curved surface, the molded surface fastener 1 can be bent properly along the curved shape of the cavity surface 47 of the molding die 46 and attached to the cavity surface 47 without making a large space therebetween. Particularly in the Embodiment 1, even when the cavity surface 47 of the molding die 46 is formed as a curved surface having a somewhat larger curvature, it is possible to attach the molded surface fastener 1 of the Embodiment 1 to the curved cavity surface 47 with no space therebetween.

Accordingly, the molded surface fastener 1 of the Embodiment 1 can be stably attracted and fixed to the fastener holding portion 46*a* of the molding die 46 in a state that the upper surface of the resin-intrusion-preventing wall portion 20 and the upper surface or the upper end part of the lateral wall portion 13 and the engaging element 12 are adhered to the cavity surface 47 of the molding die 46 across the entire molded surface fastener 1 in the length direction.

Figure 13:
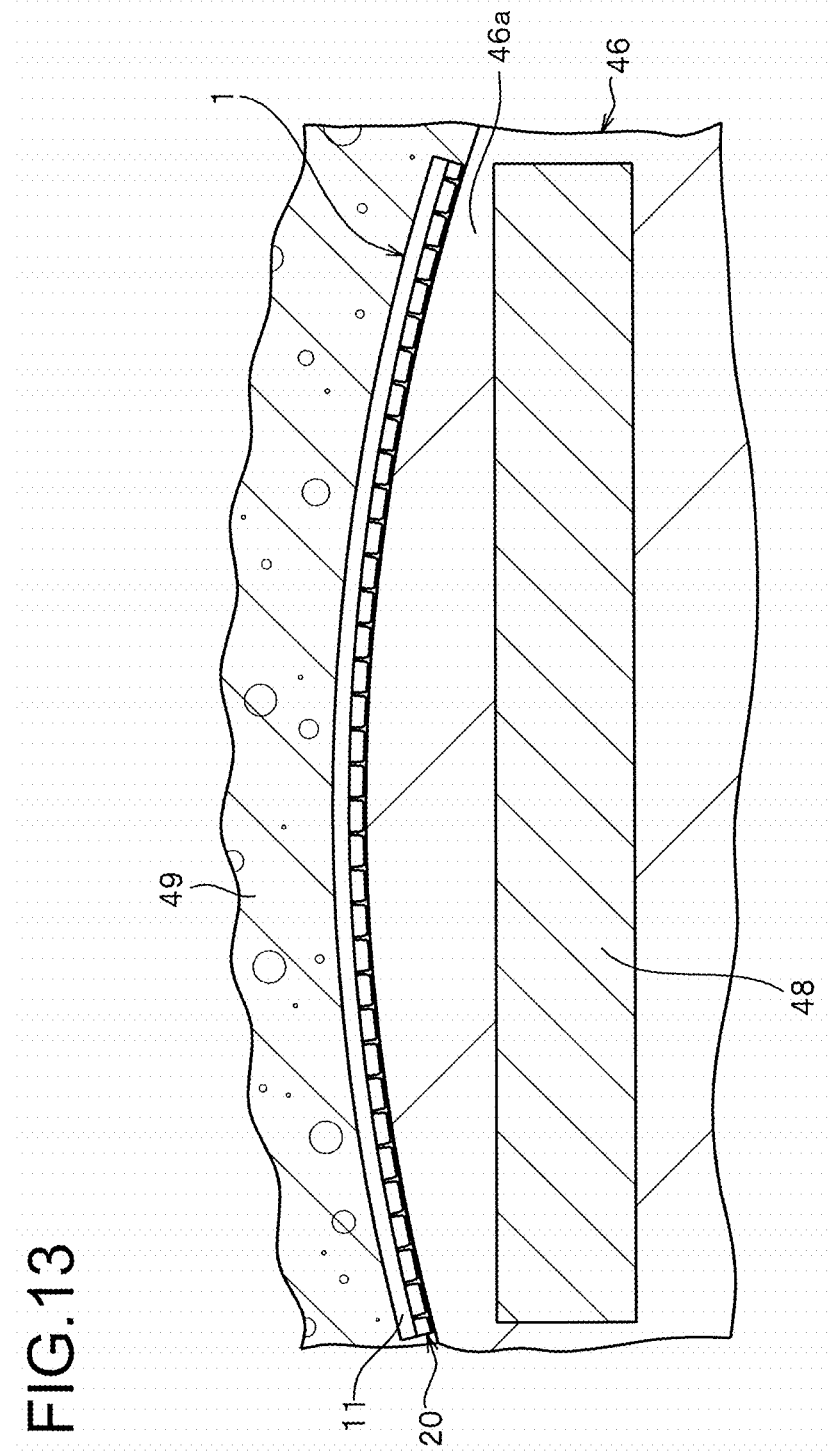
FIG. 13 is an explanatory view explaining a state that a cushion body is foam molded in a molding die.

After the molded surface fastener 1 is attracted and fixed to the fastener holding portion 46*a* of the molding die 46 as mentioned above, a foam resin material of the cushion body is injected into cavity spaces of the molding die 46. As a result, the foam resin material spreads throughout the entire cavity spaces of the molding die 46 while foaming and flowing to a lower surface (back surface) side of the base portion 11, the outer side of the right and left resin-intrusion-preventing wall portions 20 of the molded surface fastener 1, and the front and rear end edges of the molded surface fastener 1 to conduct the foam molding of the cushion body (foam body) 49, as shown in FIG. 13

At this time, since the molded surface fastener 1 is positioned and fixed at a predetermined position by the attracting effect of the magnet 48 of the molding die 46, the position of the molded surface fastener 1 is not moved by a flow and a foaming pressure of the foam resin material.

Furthermore, in the molded surface fastener 1 of the Embodiment 1, the divided vertical wall portions 22 and the connecting wall portions 23 of the resin-intrusion preventing wall portion 20 formed continuously in a series of meandering shape are adhered to the cavity surface 47 of the molding die 46. At the same time, the connecting wall portion 23 is formed to be long in the width direction to ensure a large width dimension of the resin-intrusion-preventing wall portion 20.

For this reason, although the foam resin material flowing in the cavity space of the molding die 46, with respect to the molded surface fastener 1, can enter into a position of the divided vertical wall portions 22 in the first vertical wall row 21*a* on an inner side from between the divided vertical wall portions 22 in the second vertical wall row 21*b* on an outer side, for example, it is prevented from intruding into the engaging region 15 from the width direction over the resin-intrusion-preventing wall portion 20 having a large width dimension. In this case, even when the foam resin material is strongly sprayed to a boundary part between the molded surface fastener 1 and the cavity surface 47 of the molding die, it is possible to stably prevent the intrusion of the form resin material by the thick resin-intrusion-preventing wall portion 20 of the molded surface fastener 1.

In a case that the foam resin material of the cushion body 49 flows toward the engaging region 15 along the length direction from end parts in a front and rear direction of the molded surface fastener 1, for example, the lateral wall portions 13 and the engaging elements 12 disposed along the width direction on the frontmost end side or the rearmost end side of the molded surface fastener 1 are provided across between the right and left resin-intrusion-preventing wall portions 20 in a state of being adhered to the cavity surface 47 of the molding die 46. Therefore, although the foam resin material can enter into a position where the first lateral wall portions 13 and the engaging element 12 are disposed from a front end edge and a rear end edge of the molded surface fastener 1, it is prevented that the foam resin material intrude into the engaging region 15 over the lateral wall portion 13 and the engaging element 12.

That is, in the molded surface fastener 1 of the Embodiment 1, it is possible to prevent the foam resin material of the cushion body 49 from intruding into the engaging region 15 from the width direction and the length direction of the molded surface fastener 1. Therefore, engaging elements 12 can be stably prevented from being buried in the foamed resin of the cushion body 49.

Furthermore, in the Embodiment 1, the foam resin material is cured in a state of being in surface contact with the first vertical wall row 21*a* and the second vertical wall row 21*b*, and the connecting wall portion 23, thereby, a fixing strength (adhesion strength) of the molded surface fastener 1 with respect to the cushion body 49 can be enhanced. In particular, in this case, since the connecting wall portion 23 of the Embodiment 1 is formed with a larger width dimension, the molded surface fastener 1 can be fixed to the cushion body 49 more firmly by ensuring a larger contact area between the molded surface fastener 1 and the cushion body 49.

Then, the foam resin material is foamed and cured to complete the foam molding, thereby the cushion body in which the molded surface fastener 1 is fixed at a required position is manufactured. In the cushion body thus obtained, since the foam body does not intrude into the engaging region 15 of the molded surface fastener 1, it is possible to stably ensure the engaging force which the engaging element 12 inherently possesses.

Therefore, the surface of the obtained cushion body is covered with the skin material, thereby, and loop shaped engaging elements provided on the back surface of the skin material can be easily engaged with the hook shaped engaging elements 12 of the molded surface fastener 1. This makes it possible to attach the skin material accurately by adhering the skin material along the curved surface of the cushion body without floating up from the cushion body.

Further in this case, the molded surface fastener 1 of the Embodiment 1 is excellent in flexibility in the upper and lower direction. Therefore, when the skin material is pulled away from the molded surface fastener 1 so as to be separated, for example, the molded surface fastener 1 tends to be bent together with the cushion body in a direction to be pulled in a state of engaging with the loop shaped engaging elements of the skin material, thereby, the loop shaped engaging elements of the skin material become hard to be disengaged from the hook shaped engaging elements 12 of the molded surface fastener 1. As a result, the engaging strength of the molded surface fastener 1 with respect to the loop shaped engaging elements of the skin material is increased.

In the present invention, it is possible to arbitrarily change the concentration and the range of the magnetic particles contained in the resin-intrusion-preventing wall portion 20 of the molded surface fastener 1. In the Embodiment 1, for example, the concentration at the high concentration portion 51 formed at the upper end part of the resin-intrusion-preventing wall portion 20 is set to be 50 wt %, however, in the present invention, the concentration can be set to an arbitrary rate within a range of, for example, 40 wt % or more and 80 wt % or less.

In addition, it is also possible that forming ranges of the high concentration portion 51 and the downward gradient portion 52 formed in the resin-intrusion-preventing wall portion 20 are set to be an arbitrary size. As in a case of the molded surface fastener 1a according to a modification example (first modification example) of the Embodiment 1 shown in FIG. 14 and the molded surface fastener 1b according to another modification example (second modification example) of the Embodiment 1 shown in FIG. 15, for example, it is also possible to form concentration gradient portions 50a, 50b including the high concentration portion 51 and the downward gradient portion 52 on the resin-intrusion-preventing wall portion 20 and the base portion 11.

Figure 14:
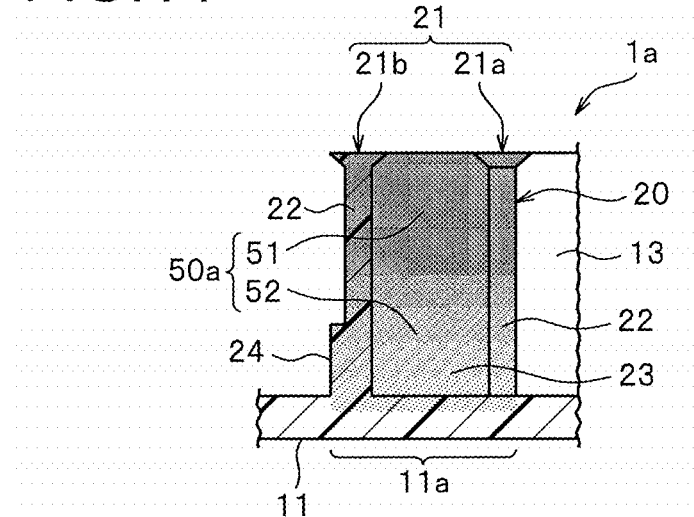
FIG. 14 is a main part cross sectional view illustrating a main part of a molded surface fastener according to a modification example of Embodiment 1.

Here, the molded surface fastener 1a according to the first modification example as shown in FIG. 14 is formed such that each part such as the base portion 11 and the resin-intrusion-preventing wall portion 20 has the same shape and dimension as those of the molded surface fastener 1 of the Embodiment 1. In this case, a concentration gradient portion 50a including the high concentration portion 51 containing the magnetic particles at the certain highest concentration and the downward gradient portion 52 gradually decreasing the concentration of the contained magnetic particles as it extends downward is provided. The high concentration portion 51 of the concentration gradient portion 50a is formed within a range from an upper end position of the divided vertical wall portion 22 and the connecting wall portion 23 in the resin-intrusion-preventing wall portion 20 to a height position which is substantially half of a height dimension of the divided vertical wall portion 22 and the connecting wall portion 23 from the base portion 11.

The downward gradient portion 52 decreasing the concentration of the contained magnetic particles downward is formed continuously from a lower end of the high concentration portion 51 (that is, a height position which is half of the height dimension of the divided vertical wall portion 22 and the connecting wall portion 23) to an inside of a preventing wall supporting portion 11a of the base portion 11 as a concentration changing part gradually changing the concentration. Here, the preventing wall supporting portion 11a of the base portion is a part of the base portion disposed under the resin-intrusion-preventing wall portion 20. The preventing wall supporting portion 11a has the same width dimension as the width dimension of the resin-intrusion-preventing wall portion 20 in the right and left direction, and is disposed continuously along the length direction.

Further, in the first modification example shown in FIG. 14, the downward gradient portion 52 does not extend to a lower surface of the base portion 11. A lower half of the preventing wall supporting portion 11a of the base portion 11 is formed of synthetic resin substantially containing no magnetic particles. Also with such a molded surface fastener 1a according to the first modification example, since the downward gradient portion 52 is provided across the resin-intrusion-preventing wall portion 20 and the preventing wall supporting portion 11a of the base portion 11, the adhesion property between the part containing magnetic particles and the non-containing part substantially containing no magnetic particles can be enhanced.

Figure 15:
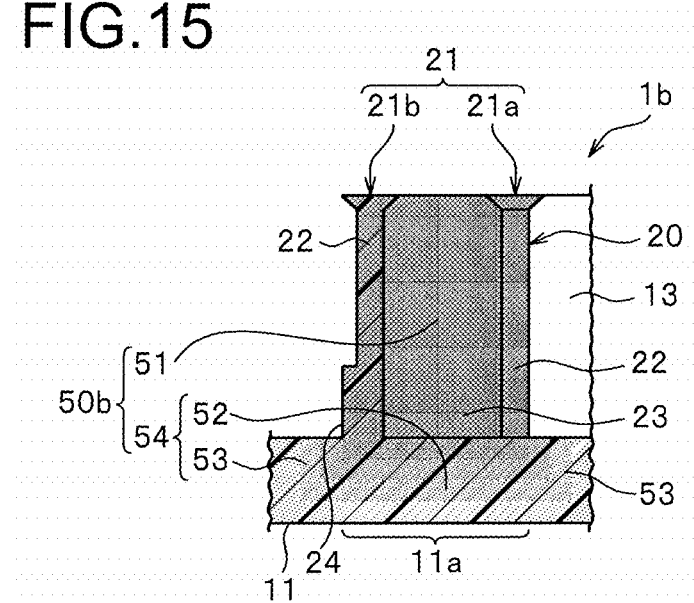
FIG. 15 is a main part cross sectional view illustrating a main part of a molded surface fastener according to another modification example of Embodiment 1.

On the other hand, in the molded surface fastener 1b according to the second modification example shown in FIG. 15, the high concentration portion 51 containing the magnetic particles at the certain highest concentration is formed on the divided vertical wall portion 22 and the connecting wall portion 23 entirely, which is from the upper end position to the lower end position of the divided vertical wall portion 22 and the connecting wall portion 23 in the resin-intrusion-preventing wall portion 20.

In the molded surface fastener 1b of the second modification example, the base portion 11 is formed to be thick with larger height dimension in the upper and lower direction compared to a case of the Embodiment 1. Further, in the resin-intrusion-preventing wall portion 20 and the base portion 11, a concentration gradient portion 50b including a high concentration portion 51 containing the magnetic particles at the certain highest concentration, a downward gradient portion 52 gradually decreasing the concentration of the contained magnetic particles as it extends downward, a width direction gradient portion 53 gradually decreasing the concentration of the contained magnetic particles in the width direction is provided.

In this case, the downward gradient portion 52 of the concentration gradient portion 50b is not formed on the resin-intrusion-preventing wall portion 20, but formed in the preventing wall supporting portion 11a of the base portion 11 from an upper surface position to a lower surface position. Therefore, in the preventing wall supporting portion 11a of the base portion 11, a part substantially containing no magnetic particles is not provided. Further in the parts on both right and left sides of the preventing wall supporting portion 11a in the base portion 11, the width direction gradient portion 53 decreasing the concentration of the contained magnetic particles along the width direction is formed. Accordingly, in the second modification example, the concentration changing portion 54, which changes the concentration of the contained magnetic particles to be gradually decreased, is formed of the downward gradient portion 52 and the width direction gradient portion 53 of the concentration gradient portion 50b.

As in the second modification example, the concentration changing portion 54 including the downward gradient portion 52 and the width direction gradient portion 53 is formed on the base portion 11 so as to continue from the high concentration portion 51, thereby, the adhesion property between the contained part and the non-containing part of the magnetic particles can be enhanced.

In the manufacturing apparatus 40 shown in FIG. 8, the molded surface fasteners 1a, 1b according to the above-described first and second modification examples can be manufactured by changing the shape, size, and forming position of the first extrusion port 43d and the second extrusion port 43e formed on the extrusion surface 43c of the extrusion nozzle 43, the extruding force from the extrusion nozzle 43, and properties of the resin material, such as viscosity.

Embodiment 2

Figure 16:
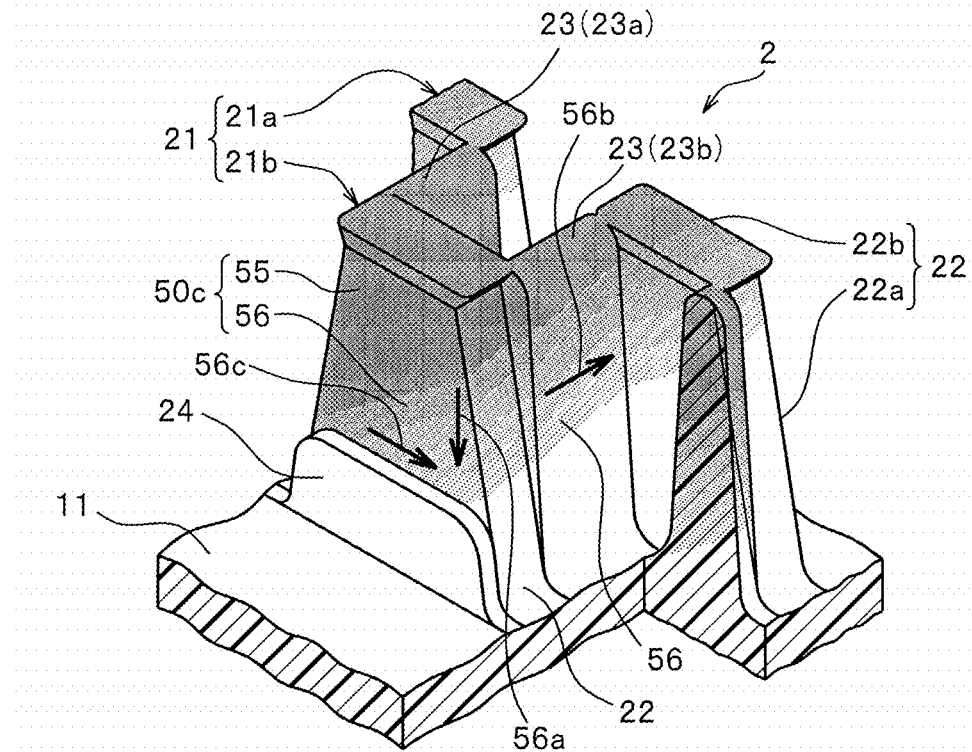
FIG. 16 is a main part enlarged perspective view illustrating a main part of a molded surface fastener enlarged according to Embodiment 2 of the present invention.
Figure 17:
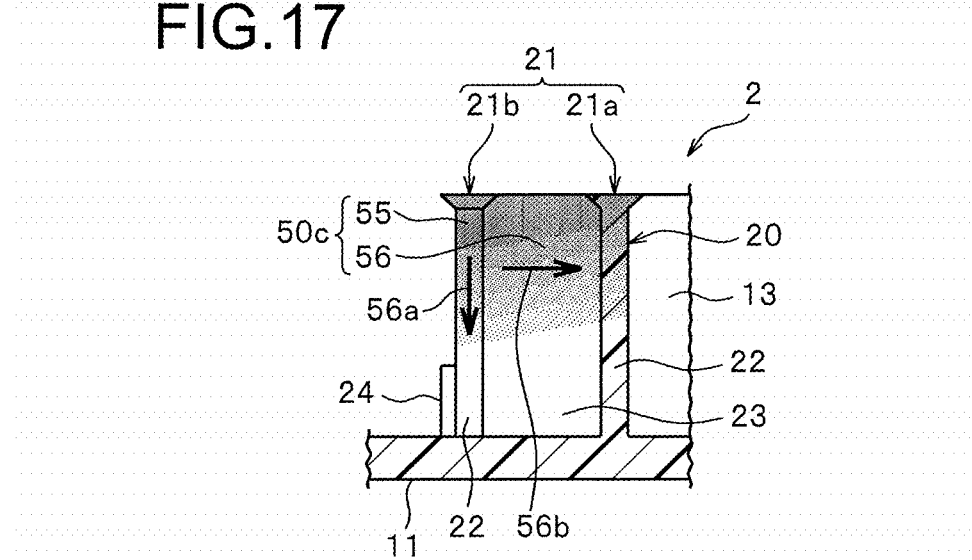
FIG. 17 is a main part lateral cross sectional view illustrating a main part of the molded surface fastener.
Figure 18A:
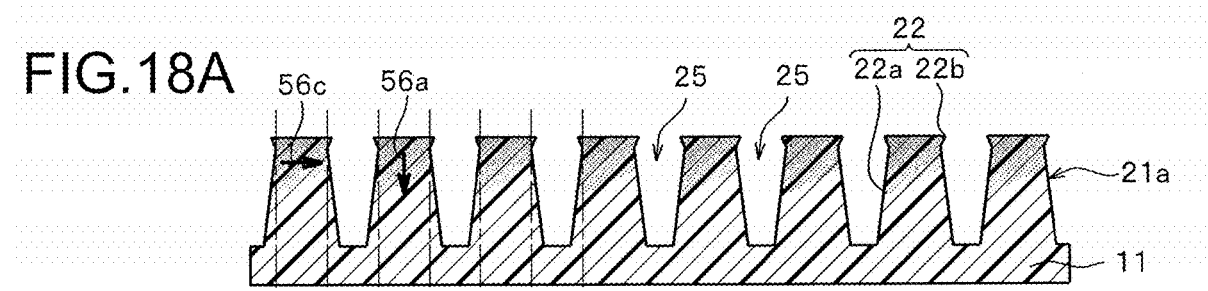
FIGS. 18A, 18B, and 18C, collectively referred to herein as FIG. 18, are cross sectional views respectively illustrating cross sections of a first vertical wall row, a connecting wall portion, and a second vertical wall row in the molded surface fastener orthogonal to a width direction.
Figure 18B:
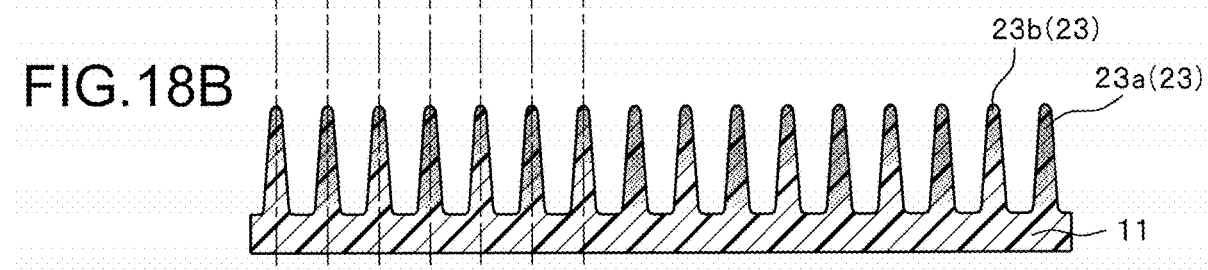
Figure 18C:
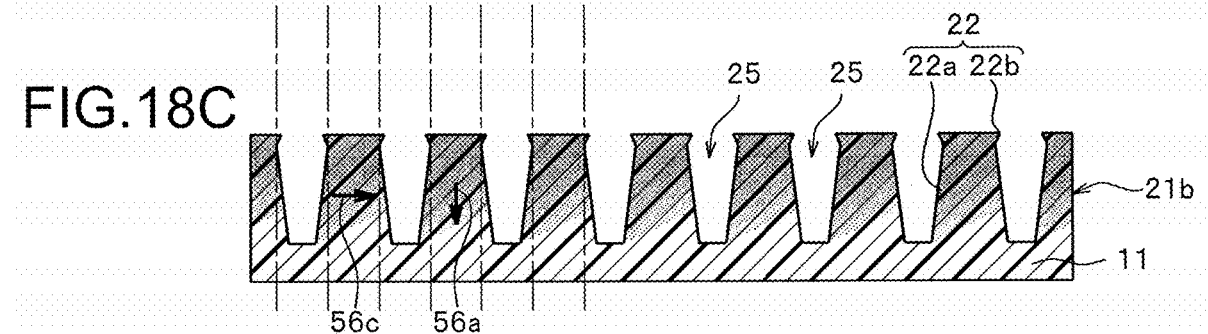

FIG. 16 is a main part enlarged perspective view illustrating a base portion and a resin-intrusion-preventing wall portion of a molded surface fastener enlarged according to Embodiment 2 of the present invention. FIG. 17 is a cross sectional view illustrating a lateral cross section orthogonal to a length direction of the base portion and the resin-intrusion-preventing wall portion of the molded surface fastener. FIGS. 18A, 18B, and 18C are cross sectional views respectively illustrating vertical cross sections orthogonal to a width direction in a first vertical wall row, a connecting wall portion, and a second vertical wall row of the molded surface fastener.

Although the contained distribution of the magnetic particles contained in the resin-intrusion-preventing wall portion 20 is made different in the molded surface fastener 2 of the Embodiment 2 and the molded surface fastener 3 of the Embodiment 3, described later, compared to the molded surface fastener 1 according to the above-mentioned Embodiment 1, the shape and the dimension of each part such as the base portion 11 and the resin-intrusion-preventing wall portion 20 are formed to be the same as the molded surface fastener 1 of the Embodiment 1. Accordingly, in the Embodiment 2 and the Embodiment 3 to be described later, the concentration range of the magnetic particles to be contained in the molded surface fasteners 2, 3 will be mainly described. Parts or members having substantially the same shapes and dimensions as those of the molded surface fastener 1 according to the Embodiment 1 described above are denoted by the same reference numerals and description thereof is omitted.

In the resin-intrusion-preventing wall portion 20 in the Embodiment 2, a concentration gradient portion 50c including a high concentration portion 55 containing magnetic particles at the certain highest concentration and a concentration changing portion 56 gradually changing the concentration of the contained magnetic particles to be decreased is provided. The high concentration portion 55 of the concentration gradient portion 50c is provided on an upper end part of the resin-intrusion-preventing wall portion 20. The concentration (contained ratio) of the magnetic particles in the synthetic resin at the high concentration portion 55 of the Embodiment 2 is set to be 50 wt % as in the case of the above-mentioned Embodiment 1.

In the concentration gradient portion 50c of the Embodiment 2, the concentration changing portion 56 having an inward gradient portion and a length direction gradient portion to be described later is provided in the resin-intrusion-preventing wall portion 20. Therefore, in the concentration gradient portion 50c, a range of the high concentration portion 55 formed on the divided vertical wall portion 22 in the first vertical wall row 21a on an inner side, the connecting wall portion 23, and the divided vertical wall portion 22 in the second vertical wall row 21b on an outer side is different from each other. That is, in the Embodiment 2, the high concentration portion 55 of the divided vertical wall portion 22 in the second vertical wall row 21b on the outer side is formed to be larger than the high concentration portion 55 of the divided vertical wall portion 22 in the first vertical wall row 21a on the inner side.

In this case, the high concentration portion 55 of the divided vertical wall portion 22 in the second vertical wall row 21b on the outer side is formed on an entire upper surface of the divided vertical wall portion 22, and is formed obliquely to extend downward to a larger extent to one end part of the divided vertical wall portion 22 in the front and rear direction (specifically, an end part on a downstream side in a machine direction of the molded surface fastener 2, a rear end part in the Embodiment 2) and to an end part on an outer wall surface side in the right and left direction.

In the connecting wall portion 23, the high concentration portion 55 is formed on an entire upper surface of the connecting wall portion 23 and is formed obliquely to extend downward to a larger extent to an outer side end part connecting to the divided vertical wall portion 22 in the second vertical wall row 21b on an outer side in a right and left direction. Also in the connecting wall portion 23, regarding the front and rear direction, the high concentration portion 55 is formed obliquely to extend downward to a larger extent to one end part (rear end part) in the front and rear direction which is an end part on a downstream side of a machine direction as in the case of the divided vertical wall portion 22 in the second vertical wall row 21b on the outer side. However, since a length dimension of the connecting wall portion 23 itself in the front and rear direction is small, the oblique in one direction of the front or rear direction as described above may not be clearly shown.

Further, as shown in FIG. 18B, in the connecting wall portion 23 of the Embodiment 2, a high concentration connecting wall portion 23a in which the comparatively large high concentration portion 55 is formed and a low concentration connecting wall portion 23b in which the high concentration portion 55 smaller than the high concentration connecting wall portion 23a is formed are disposed alternately in the front and rear direction.

The high concentration portion 55 of the divided vertical wall portion 22 in the first vertical wall row 21a on the inner side is not formed on an entire upper surface of the divided vertical wall portion 22 as in the case of the second vertical wall row 21b, but formed on a rear end part in the front and rear direction. On a front end part in the front and rear direction, the concentration changing portion 56 is formed.

In the present invention, as long as the high concentration portion 55 is provided in at least a part of the upper end part (particularly, the upper surface) of the resin-intrusion-preventing wall portion 20, its forming range can be changed arbitrarily. For example, in the Embodiment 2, it is also possible to provide the high concentration portion 55 on the entire upper surface of the divided vertical wall portion 22 of the first vertical wall row 21a on the inner side. Conversely, it is also possible that the high concentration portion 55 is not provided on the divided vertical wall portion 22 in the first vertical wall row 21a on the inner side, but is provided only in the divided vertical wall portion 22 in the second vertical wall row 21b on the outer side and the connecting wall portion 23.

The resin-intrusion-preventing wall portion 20 of the Embodiment 2 includes the concentration changing portion 56 gradually changing the concentration of the contained magnetic particles. The concentration changing portion 56 includes a downward gradient portion gradually decreasing the concentration of the contained magnetic particles as it extends downward (arrow 56a), an inward gradient portion gradually decreasing the concentration of the contained magnetic particles from an outside toward an inside (arrow 56b) along the right and left direction, and a length direction gradient portion gradually decreasing the concentration of the contained magnetic particles toward one end part (arrow 56c) in the front and rear direction (specifically, an end part on a upstream side of a machine direction in the molded surface fastener 2) along the front and rear direction.

In other words, the concentration changing portion 56 of the Embodiment 2 changes the concentration of the contained magnetic particles so as to gradually decrease from the high concentration portion 55 provided in the resin-intrusion-preventing wall portion 20 toward three directions, which are downward (arrow 56a) in the upper and lower direction, inward direction (arrow 56b) in the right and left direction, and frontward (arrow 56c) which is the upstream side direction of the machine direction in the front and rear direction.

In this case, the concentration changing portion 56 is formed continuously from the high concentration portion 55. Although the concentration changing portion 56 is formed inside a part of the base portion 11 beyond the upper surface of the base portion 11, it does not extend to the lower surface of the base portion 11. The lower end part of the base portion 11 is formed of synthetic resin substantially containing no magnetic particles.

Further, in this case, as in the case of the downward gradient portion 52 of the Embodiment 1 as mentioned above, regarding the upper and lower direction, the concentration changing portion 56 is disposed in a region having a height dimension equal to 10% or more of the resin-intrusion-preventing wall portion 20 from the base portion 11, preferably in the region for 20% or more, and particularly preferably in the region for 30% or more.

The concentration changing portion 56 of the Embodiment 2, as described in the above mentioned first modification example (see FIG. 14), for example, may be formed across the base portion 11 as well as on the resin-intrusion-preventing wall portion 20. As described in the aforementioned second modification example (FIG. 15), for example, in a case that the high concentration portion 55 is provided on the entire resin-intrusion-preventing wall portion 20, the concentration changing portion 56 of the Embodiment 2 can be provided only in the base portion 11.

The molded surface fastener 2 of the Embodiment 2 having the resin-intrusion-preventing wall portion 20 provided with the aforementioned concentration gradient portion 50c can be manufactured with the manufacturing apparatus 40 shown in FIG. 8 by changing the shape, the size, and the forming position of each extrusion port as mentioned above, and changing the extrusion force for extruding the molten synthetic resin material or the like.

In the molded surface fastener 2 of the Embodiment 2, the concentration changing portion 56 gradually decreasing the concentration of the contained magnetic particles toward three directions, which are the upper and lower direction (height direction: arrow 56a), the right and left direction (width direction: arrow 56b), and the front and rear direction (length direction: arrow 56c), is provided in the resin-intrusion-preventing wall portion 20. As a result, it is possible to further increase the adhesion property of the molded surface fastener 2 between the part containing the magnetic particles and the non-containing part substantially containing no magnetic particles, as compared to the case of the molded surface fastener 1 of the above mentioned Embodiment 1, for example. Therefore, cracks, breakage and the like between the part made of only synthetic resin and the part containing magnetic particles less likely occur at the time of manufacturing the molded surface fastener 2 or the like, thereby, the production efficiency and the yield of the molded surface fastener 2 can be further improved.

Since the resin-intrusion-preventing wall portion 20 is provided with the concentration gradient portion 50c of the Embodiment 2 having the high concentration portion 55 and the concentration changing portion 56, the magnetic particles usage can be decreased, as compared with the case that the magnetic particles are contained at the same certain concentration as the high concentration portion 55 in the forming region of the concentration changing portion 56. Thereby, it is possible to reduce the manufacturing cost, and to secure flexibility of the molded surface fastener 2 properly by suppressing a lowering of flexibility of the synthetic resin due to the inclusion of magnetic particles.

Furthermore, in the concentration changing portion 56 of the Embodiment 2, since the inward gradient portion indicated by the arrow 56b is provided, the contained amount of the magnetic particles in the second vertical wall row 21b on the outer side is larger than the contained amount of the magnetic particles in the first vertical wall row 21a on the inner side. As a result, when the molded surface fastener 2 is attached to and adhered to the cavity surface (fastener attaching surface) 47 of the fastener holding portion 46a of the molding die 46 at the time of foam molding of the cushion body (see FIG. 12), the second vertical wall row 21b of the resin-intrusion-preventing wall portion 20 on the outer side can be attracted more strongly than the first vertical wall row 21a on the inner side by the magnet 48 provided in the molding die 46.

Therefore, even in the case that the cavity surface 47 of the fastener holding portion 46a of the molding die 46 is largely curved in the upper and lower direction, or is formed as a complicated curved surface so as to be twisted about the length direction, the resin-intrusion-preventing wall portion 20 of the molded surface fastener 2 is adhered to the cavity surface 47 of the molding die 46 more stably. As a result, it is possible to more effectively prevent the foam resin material from intruding into the engaging region 15 over the resin-intrusion-preventing wall portion 20 at the time of foam molding of the cushion body.

Particularly, in a case that the fastener holding portion 46a of the molding die 46 is manually processed and that the cavity surface (fastener attaching surface) 47 of the fastener holding portion 46a is formed as a curved surface curving slightly in a convex shape along a cross direction which is to be the width direction of the molded surface fastener 2, for example, the inward gradient portion of the concentration gradient portion 50c is provided in the resin-invasion-preventing wall portion 20 of the Embodiment 2, thereby, it is possible to further enhance the adhesion property of the molded surface fastener 2 with respect to the curved cavity surface 47 of the molding die 46.

More specifically, since the aforementioned inward gradient portion of the concentration gradient portion 50c is provided on the resin-intrusion-preventing wall portion 20 of the Embodiment 2, when the molded surface fastener 2 is cooled in a step of manufacturing the fastener, the thermal contraction amount decreases as the concentration of the contained magnetic particles increases. For this reason, the molded surface fastener 2 after being cooled sometimes has a slightly curved shape as a whole such that a central part in the width direction of the base portion 11 bulges downward with respect to the right and left direction due to the thermal contraction at the time of cooling.

Therefore, it can be expected that the molded surface fastener 2 of the Embodiment 2 which is slightly curved due to the difference of the thermal contraction amount at the time of cooling in this manner is attracted and fixed more easily with respect to the cavity surface 47 curved in the convex shape as described above with higher adhesion property.

Further, in the concentration changing portion 56 of the Embodiment 2, the length direction gradient portion gradually decreasing along the front and rear direction as shown by the arrow 56c is provided on each divided vertical wall portion 22 (See FIG. 16 and FIG. 18). As a result, it is possible to increase a ratio of the synthetic resin in the divided vertical wall portion 22, as compared with the case that the length direction gradient portion is not provided on each divided vertical wall portion 22, for example. Therefore, it is expected that each divided vertical wall portion 22 is more thermally contracted in the length direction at the time of thermal contraction of the molded surface fastener 2 in the manufacturing step of the fastener.

Thereby, it is possible to reduce the difference in thermal contraction between the base portion 11 and the resin-intrusion-preventing wall portion 20 during the above-mentioned thermal contraction. Therefore, the molded surface fastener 2 after being cooled is less likely to be deformed to curve so as to roll upward because the base portion 11 shrinks in the front and rear direction to a larger extent, as compared to the resin-intrusion-preventing wall portion 20, for example, thereby, it is easy to obtain the molded surface fastener 2 extending straight in the front and rear direction.

In the resin-intrusion-preventing wall portion 20 of the Embodiment 2, the concentration changing portion 56 of the concentration gradient portion 50c gradually decreases the concentration of the contained magnetic particles toward three directions, which are downward in the upper and lower direction shown as the arrow 56a, the inward direction in the right and left direction shown as the arrow 56b, and the frontward which is to be the downstream side direction of the machine direction in the front and rear direction shown as the arrow 56c as mentioned above.

Figure 19:
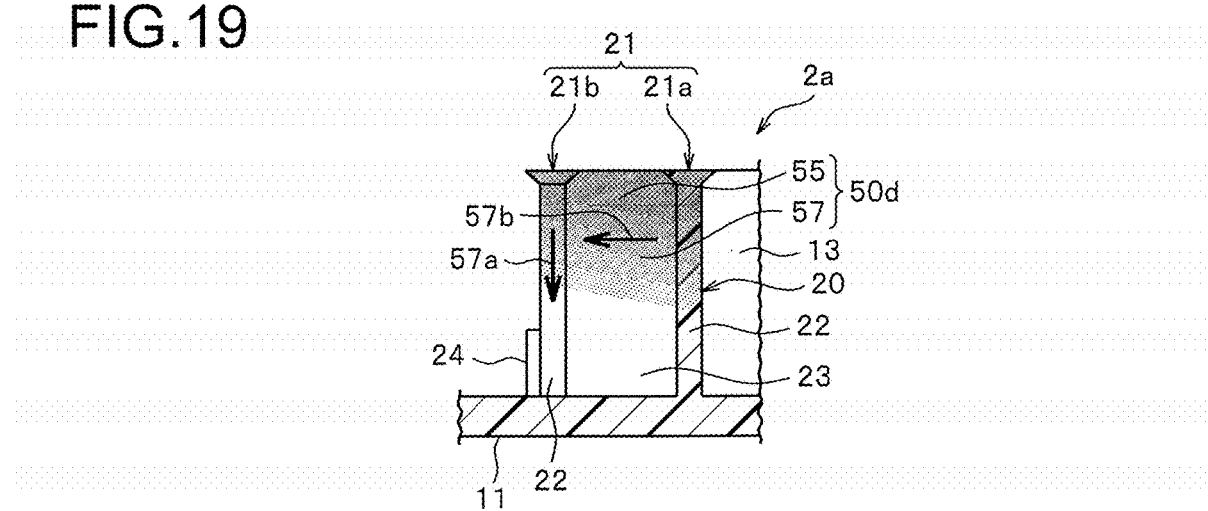
FIG. 19 is a main part cross sectional view illustrating a main part of a molded surface fastener according to a modification example of Embodiment 2.

However, in the present invention, as shown in FIG. 19, for example, the concentration gradient (concentration change) formed as the concentration changing portion of the resin-intrusion-preventing wall portion 20 can be directed to three directions, which are the downward in the upper and lower direction, the outward direction in the right and left direction opposite to the above-described Embodiment 2, and the frontward to be the downstream side direction of the machine direction in the front and rear direction. Also, the concentration gradient of the concentration changing portion can be directed to two directions, which are the downward in the upper and lower direction and the inward or outward direction in the right and left direction, or to two directions, which are the downward in the upper and lower direction and the frontward to be the downstream side direction of the machine direction in the front and rear direction. In addition, it is also possible to direct only one direction, which is the inward or outward direction in the right and left direction, or the frontward to be the downstream side direction of the machine direction in the front and rear direction.

In a molded surface fastener 2a according to a third modification example shown in FIG. 19, for example, a concentration gradient portion 50d formed on the resin-intrusion-preventing wall portion 20 includes a high concentration portion 55 containing magnetic particles at the highest certain concentration, and a concentration changing portion 57 changing the concentration of the contained magnetic particles so as to gradually decrease. The concentration changing portion 57 of the third modification example includes a downward gradient portion which gradually decreases the concentration of the contained magnetic particles downward as shown by an arrow 57a and a length direction gradient portion which gradually decreases the concentration along the front and rear direction, as well as an outward gradient portion which gradually decreases the concentration of the contained magnetic particles toward an outside of the right and left direction as shown by an arrow 57b such that the first vertical wall row 21a on the inner side contains more magnetic particles than the second vertical wall row 21b on the outer side.

As in the above-mentioned Embodiment 2, the concentration changing portion 57 of the third modification example may be formed across the base portion 11 as well as only on the resin-intrusion-preventing wall portion 20, for example. In a case that the high concentration portion 55 is provided on the entire resin-intrusion-preventing wall portion 20, for example, it is also possible to provide the concentration changing portion 57 of the third modification example only on the base portion 11.

In the third modification example, the concentration gradient portion 50d having the outward gradient portion is provided on the resin-intrusion-preventing wall portion 20 as described above. As a result, when the molded surface fastener 2a is attached to the cavity surface (fastener attaching surface) 47 of the fastener holding portion 46a of the molding die 46 at the time of foam molding of the cushion body (see FIG. 12), for example, it is possible to more strongly attract the right and left first vertical wall rows 21a with narrow intervals of the molded surface fastener 2a by the magnet 48 of the molding die 46.

As a result, the molded surface fastener 2a according to the third modification example can more accurately and smoothly adjust the position and direction of the molded surface fastener 2a automatically with respect to the fastener holding portion 46a of the molding die 46 by the magnetic attraction force between the magnetic particles of the molded surface fastener 2a and the magnet 48 of the molding die 46.

Even when a width dimension of the fastener holding portion 46a of the molding die 46 is small, for example, the molded surface fastener 2a according to the third modification example can manage without any problem as long as the width dimension of the fastener holding portion 46a is set to be larger than the interval between the right and left vertical wall rows 21a of the molded surface fastener 2a.

Embodiment 3

Figure 20:
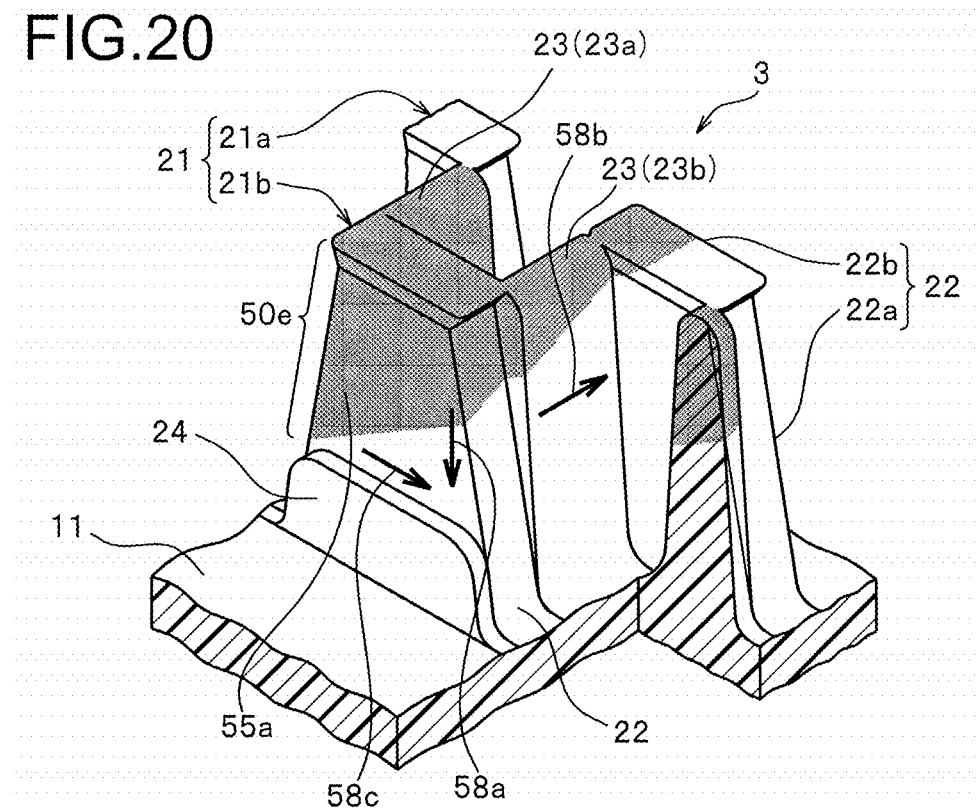
FIG. 20 is a main part enlarged perspective view illustrating a main part of a molded surface fastener enlarged according to Embodiment 3 of the present invention.
Figure 21:
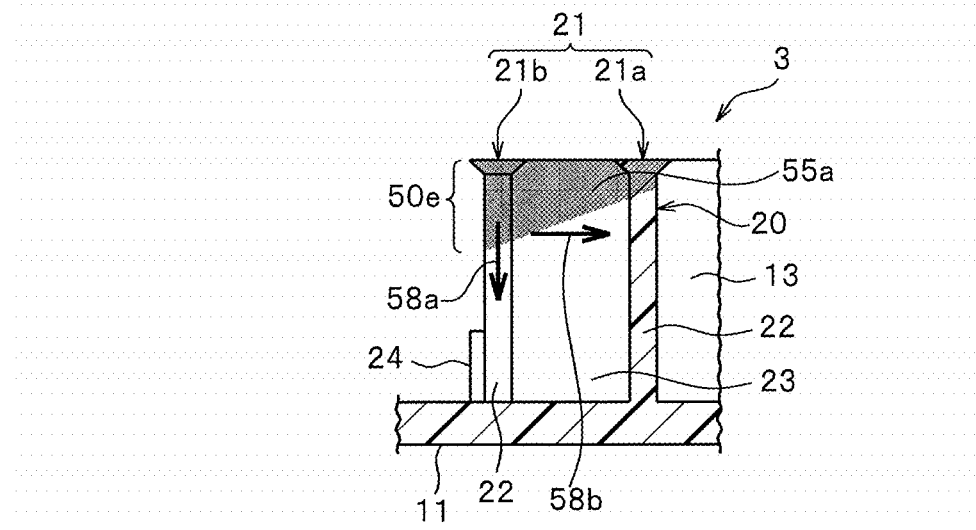
FIG. 21 is a main part lateral cross sectional view illustrating a main part of the molded surface fastener.
Figure 22A:
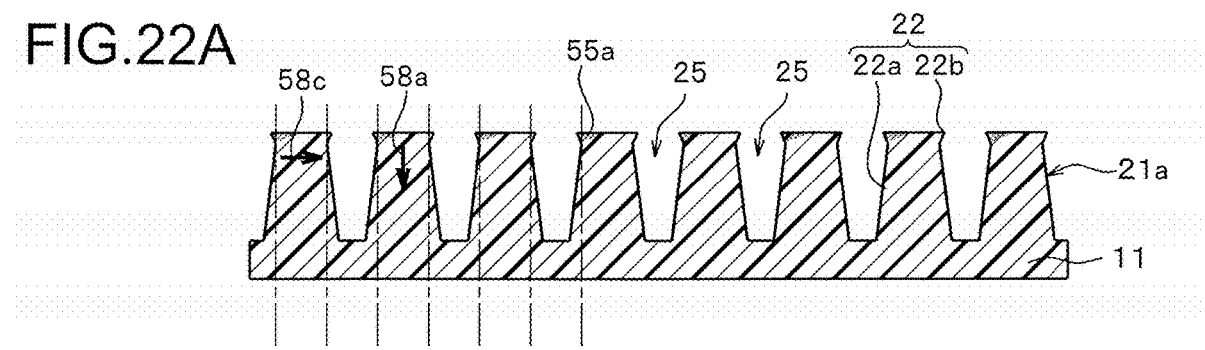
FIGS. 22A, 22B, and 22C, collectively referred to herein as FIG. 2, are cross sectional views respectively illustrating cross sections of a first vertical wall row, a connecting wall portion, and a second vertical wall row in the molded surface fastener orthogonal to a width direction.
Figure 22B:
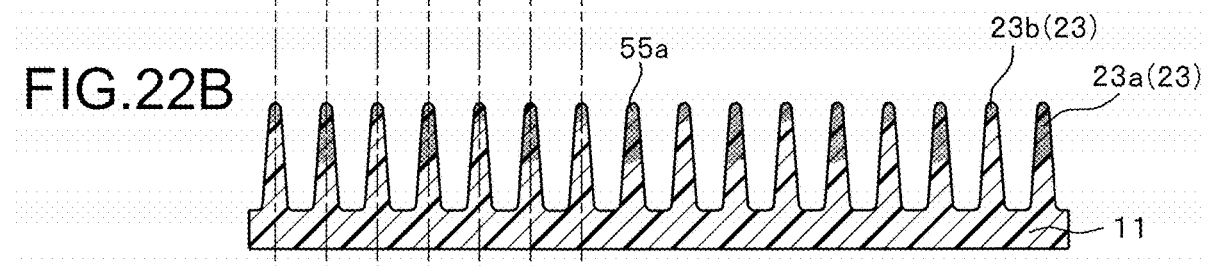
Figure 22C:
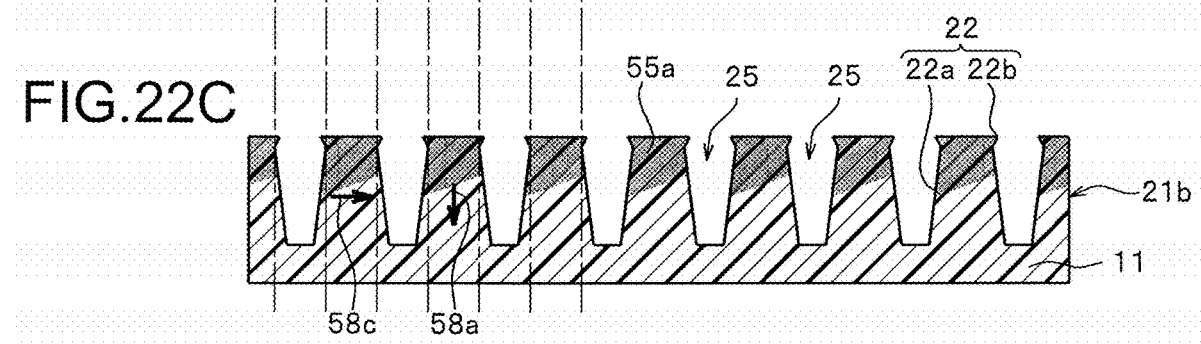

FIG. 20 is a main part enlarged perspective view illustrating a base portion and a resin-intrusion-preventing wall portion of a molded surface fastener enlarged according to Embodiment 3 of the present invention. FIG. 21 is a cross sectional view illustrating a lateral cross section orthogonal to a length direction of the base portion and the resin-intrusion-preventing wall portion of the molded surface fastener. FIGS. 22A, 22B, and 22C are cross sectional views respectively illustrating vertical cross sections orthogonal to a width direction in a first vertical wall row, a connecting wall portion, and a second vertical wall row of the molded surface fastener.

In the resin-intrusion-preventing wall portion 20 of the molded surface fastener 3 in the Embodiment 3, a forming range of a high concentration portion 55a containing magnetic particles at a certain concentration decreases as it extends downward to provide a concentration gradient portion 50e. That is, in the concentration gradient portion 50e of the Embodiment 3, the forming range of the high concentration portion 55a is decreased downward, thereby, an average concentration of the contained magnetic particles in an entire cross section is relatively decreased downward when each cutting surface of the resin-intrusion-preventing wall portion 20 is viewed in a case of cutting the resin-intrusion-preventing wall portion 20 at a plurality of height positions parallel to an upper surface of a base portion 11.

Therefore, the concentration gradient portion 50e of the Embodiment 3 does not have a concentration changing portion which actually decreases the concentration as in the case of the concentration gradient portions 50, 50c of the aforementioned Embodiments 1 and 2, and is formed such that as a height dimension of the resin-intrusion-preventing wall portion from the upper surface of the base portion 11 becomes smaller, the average concentration of the contained magnetic particles is decreased so as to narrow the forming range of the high concentration portion 55a.

More specifically, in the Embodiment 3, the concentration (contained ratio) of the magnetic particles with respect to synthetic resin in the high concentration portion 55a is set to be 50 wt %, as in the case of the high concentration portion 55 in the Embodiments 1 and 2 as mentioned above. In the present invention, the concentration of the high concentration portion 55a can be set arbitrary in a range of 40 wt % or more and 80 wt % or less, for example.

The high concentration portion 55a of the Embodiment 3 has different forming ranges of the high concentration portion 55a formed respectively on a divided vertical wall portion 22 in a first vertical wall row 21a on an inner side, a connecting wall portion 23, and a divided vertical wall portion 22 in a second vertical wall row 21b on an outer side, respectively.

That is, in the concentration gradient portion 50e of the Embodiment 3, regarding a width direction, the high concentration portion 55a of the divided vertical wall portion 22 in the second vertical wall row 21b on the outer side is formed to be larger than the high concentration portion 55a of the divided vertical wall portion 22 in the first vertical wall row 21a on the inner side such that the forming range in the upper and lower direction extends downward. In this case, the forming range of the high concentration portion 55a in the upper and lower direction gradually increases from the first vertical wall row 21a on the inner side toward the second vertical wall row 21b on the outer side so as to gradually extend downward.

In addition, in the concentration gradient portion 50e of the Embodiment 3, regarding a length direction, the high concentration portion 55a formed on a rear end part of each divided vertical wall portion 22 in the second vertical wall row 21b on the outer side is provided to have a larger forming range in the upper and lower direction than that on a front end part of the divided vertical wall portion 22 so as to extend downward. Further, in the second vertical wall row 21b, the forming range of the high concentration portion 55a in the upper and lower direction gradually increases from the front end part toward the rear end part of the divided vertical wall portion 22 so as to gradually extend downward.

On the other hand, in the divided vertical wall portion 22 in the first vertical wall row 21a on the inner side, the high concentration portion 55a is formed near the rear end part of the divided vertical wall portion 22. The front end part of the divided vertical wall portion 22 does not contain magnetic materials substantially.

In the connecting wall portion 23 of the Embodiment 3, as shown in FIG. 22(b), a high concentration connecting wall portion 23a in which comparatively larger high concentration portion 55a is formed and a low concentration connecting wall portion 23b in which the high concentration portion 55a is formed in a smaller range than the high concentration connecting wall portion 23a are disposed alternately in the front and rear direction.

In the concentration gradient portion 50e of the Embodiment 3, the forming range of the high concentration portion 55a in the upper and lower direction changes regarding the width direction and the length direction as described above. As a result, when the resin-intrusion-preventing wall portion 20 is cut at a plurality of height positions parallel to the upper surface of the base portion 11, and the high concentration portion 55a in each cutting surface is compared, the forming range (area) of the high concentration portion 55a decreases as the resin-intrusion-preventing wall portion 20 extends downward.

Therefore, when an average value of the contained concentration (that is, an average concentration) in which the contained amount of the magnetic particles calculated from the area of the part containing the magnetic particles is divided by the area of the entire cutting surface is viewed in each cutting surface, the downward gradient portion in which the average concentration of the contained magnetic particles decreases from an upper side toward a lower side is formed on the concentration gradient portion 50e of the Embodiment 3, as shown by the arrow 58a.

The concentration gradient portion 50e of the Embodiment 3 is provided with the downward gradient portion which decreases the forming range of the high concentration portion 55a downward as shown by the arrow 58a, as described above. Further, the concentration gradient portion 50e of the Embodiment 3 is provided with an inward gradient portion which decreases the forming range of the high concentration portion 55a (that is, the average concentration in the cutting surface) toward an inner side as shown by the arrow 58b regarding the width direction, and a length direction gradient portion which decreases the forming range (that is, the average concentration at the cutting surface) of the high concentration portion 55a in each divided vertical wall portion 22 from a rear end part toward a front end part of the divided vertical wall portion 22 as shown by the arrow 58c regarding the length direction.

In the molded surface fastener 3 of the Embodiment 3, the resin-intrusion-preventing wall portion 20 is provided with the concentration gradient portion 50e having the downward gradient portion, the inward gradient portion, and the length direction gradient portion as described above. That is, a boundary surface between the resin containing the magnetic particles and the resin substantially no containing the magnetic particles is made to be non-parallel to the upper surface of the base portion 11 (preferably non-parallel to either the length direction or the width direction), thereby, the adhesion property between a part containing the magnetic particles and a non-containing part substantially containing no magnetic particles in the molded surface fastener 3 is enhanced. Therefore, cracks, breakage and the like are hardly caused between the part made of only the synthetic resin and the part containing the magnetic particles at the time of manufacturing the molded surface fastener 3, or the like, thereby, it is possible to attain a further improvement of a production efficiency and a yield of the molded surface fastener 3.

In the molded surface fastener 3 of the Embodiment 3, the concentration gradient portion 50e provided on the resin-intrusion-preventing wall portion 20 may include an outward gradient portion which decreases the forming range (the average concentration at the cutting surface) of the high concentration portion 55a toward an outer side regarding the width direction instead of the inward gradient portion.

In each molded surface fastener 1, 1a, 1b, 2, 2a, 3 according to the above-mentioned Embodiments 1 to 3, and the first to the third modification examples, the right and left resin-intrusion-preventing wall portions 20 are formed to have two rows along the length direction which are the first vertical wall row 21a and the second vertical wall row 21b and the connecting wall portion 23 between the first vertical wall row 21a and the second vertical wall row 21b connecting the divided vertical wall portions 22 along the width direction.

However, as long as the right and left resin-intrusion-preventing wall portions in the present invention have at least one vertical wall row disposed along the length direction, the resin-intrusion-preventing wall portion can be formed in another different configuration. Hereinafter, modification examples of the configuration of the resin-intrusion-preventing wall portion will be described with reference to FIGS. 23 to 28, in a case that the concentration gradient portion 50 described in the Embodiment 1 is provided in each of the resin-intrusion-preventing wall portions as an example.

Figure 23:
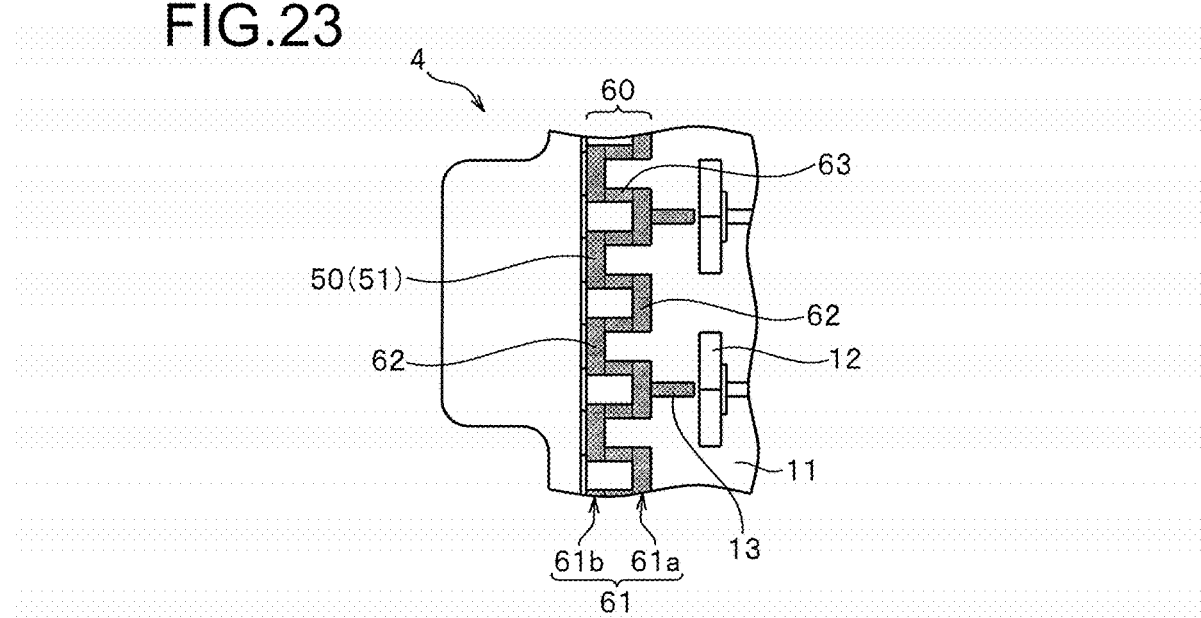
FIG. 23 is a main part plan view illustrating a main part of a molded surface fastener according to a modification example of Embodiments 1-3.
Figure 24:
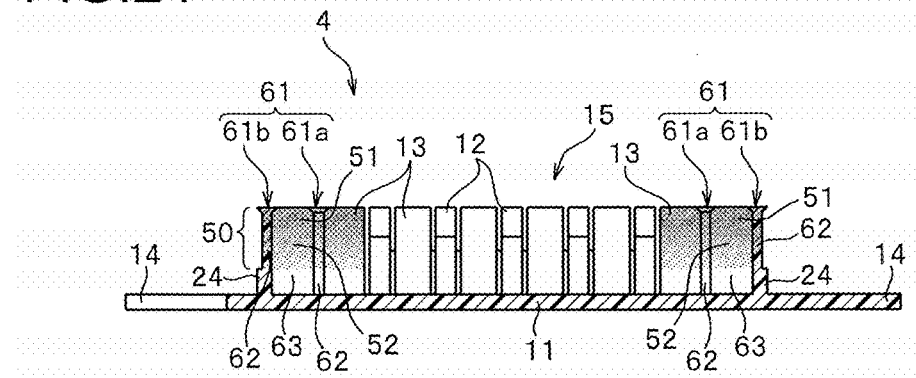
FIG. 24 is a cross sectional view illustrating a cross section of the molded surface fastener orthogonal to a length direction.

For example, as shown in the molded surface fastener 4 according to the fourth modification example in FIG. 23, right and left resin-intrusion-preventing wall portions 60 are formed to have the same shape and size as the resin-intrusion-preventing wall portion 20 in the above-described Embodiment 1.

That is, the resin-intrusion-preventing wall portion 60 of the fourth modification example includes a first vertical wall row 61a on an inner side and a second vertical wall row 61b on an outer side as a vertical wall row 61, and also includes a connecting wall portion 63 connecting divided vertical wall portions 62 in the first and the second vertical wall rows 61a, 61b. In addition, the first vertical wall row 61a, the second vertical wall row 61b, and the connecting wall portion 63 of the fourth modification example have substantially the same shape and dimension as the first vertical wall row 21a, the second vertical wall row 21b, and the connecting wall portion 23 in the above described Embodiment 1.

On the other hand, in the resin-intrusion-preventing wall portion 60 of the fourth modification example, a relative positional relationship of the divided vertical wall portions 62 in the first vertical wall row 61a and the second vertical wall row 61b and the connecting wall portion 63 with respect to the engaging elements 12 and the lateral wall portions 13 is different from the case of the aforementioned Embodiment 1.

That is, in the case of the Embodiment 1 described above, the divided vertical wall portions 22 in the first vertical wall row 21a and the second vertical wall row 21b are disposed such that a position of the engaging element 12 and the lateral wall portion 13 in the length direction corresponds to a position of a gap 25 in the length direction, which is formed between the divided vertical wall portions 22 in the first vertical wall row 21a.

On the contrary, the divided vertical wall portions 62 in the first vertical wall row 61a and the second vertical wall row 61b of the fourth modification example are disposed such that a position of the engaging element 12 and the lateral wall portion 13 in the length direction corresponds to an arrangement position of the divided vertical wall portion 62 in the first vertical wall row 61a in the length direction.

In other words, the position of the divided vertical wall portion 62 in the first vertical wall row 61a in the length direction in the fourth modification example corresponds to the position of the divided vertical wall portion 22 in the second vertical wall row 21b in the length direction in the above mentioned Embodiment 1. The position of the divided vertical wall portion 62 in the second vertical wall row 61b in the length direction in the fourth modification example corresponds to the position of the divided vertical wall portion 22 in the first vertical wall row 21a in the length direction in the aforementioned Embodiment 1.

In this case, a part of the divided vertical wall portion 62 is connected to a part of the lateral wall portion 13. In addition, the lateral wall portion 13 connected to the divided vertical wall portion 62 and the engaging element 12 disposed adjacently to the lateral wall portion 13 are not connected to each other at a lower end part as in the case of the above described Embodiment 1, and stand on the base portion 11 in separate configurations, respectively.

The first vertical wall row 61a, the second vertical wall row 61b, and the connecting wall portion 63 are disposed as in the fourth modification example, thereby the lateral wall portion 13 disposed adjacently to the first vertical wall row 61a and the divided vertical wall portion 62 in the first vertical wall row 61a are directly connected to each other to form the molded surface fastener 4. For this reason, the divided vertical wall portion 62 in the first vertical wall row 61a and the lateral wall portion 13 connected to each other are reinforced, respectively.

Further, since the magnetic particles are contained in the resin-intrusion-preventing wall portion 60, the magnetic particles can be easily contained also in the lateral wall portion 13 adjacent to the first vertical wall row 61a. Furthermore, although the concentration gradient portion 50 is provided in the resin-intrusion-preventing wall portion 60 as in the above mentioned Embodiment 1, it is also possible to form the concentration gradient portion 50 formed on the resin-intrusion-preventing wall portion 20 of the above mentioned Embodiment 1 on the lateral wall portion 13. In the resin-intrusion-preventing wall portion 60 and the lateral wall portion 13 adjacent to the first vertical wall row 61a of the fourth modification example, it is possible to form any of the concentration gradient portions 50a to 50e formed on the resin-intrusion-preventing wall portion 20 of the aforementioned Embodiments 2 and 3 and the first to the third modification examples, instead of the concentration gradient portion 50 of the above-described Embodiment 1.

According to such a molded surface fastener 4 according to the fourth modification example, the large amount of magnetic particles can be contained also at an upper end part of the lateral wall portion 13, and therefore, the amount of magnetic particles contained in the upper end part of the molded surface fastener 4 can be made large. Therefore, the molded surface fastener 4 of the fourth modification example can be attracted and fixed to the fastener holding portion 46a of the molding die 46 in which the magnet 48 is buried with larger attracting force. As a result, since the molded surface fastener 4 can be adhered to the cavity surface 47 of the fastener holding portion 46a more firmly, the foam resin material can be prevented from intruding into the engaging region 15 at the time of foam molding of the cushion body.

Figure 25:
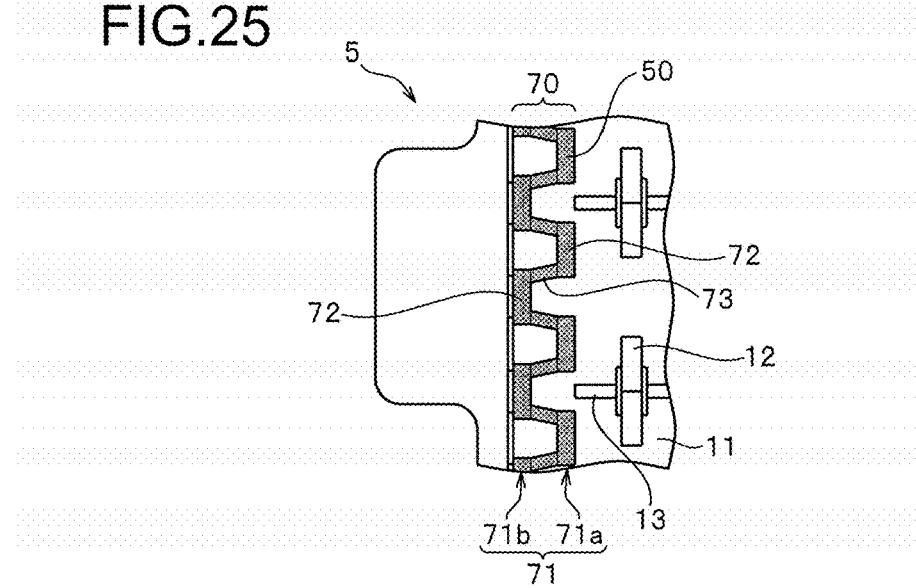
FIG. 25 is a main part plan view illustrating a configuration of a resin-intrusion-preventing wall portion according to a modification example.

Next, a molded surface fastener 5 according to a fifth modification example is shown in FIG. 25. In the fifth modification example, right and left resin-intrusion-preventing wall portions 70 include a first vertical wall row 71a on an inner side and a second vertical wall row 71b in an outer side formed along a length direction as a vertical wall row 71, and a connecting vertical wall portion 73 between the first vertical wall row 71a and the second vertical wall row 71b connecting divided vertical wall portions 72.

In this case, the first vertical wall row 71a and the second vertical wall row 71b are disposed in rows along a length direction, and respectively have a plurality of divided vertical wall portions 72 disposed intermittently at a predetermined attaching pitch. The divided vertical wall portions 72 in the first vertical wall row 71a and the divided vertical wall portions 72 in the second vertical wall row 71b are disposed alternately.

In the fifth modification example, the attaching pitches of the divided vertical wall portions 72 in the first vertical wall row 71a and the second vertical wall row 71b in the length direction are set to be longer than the case of the above mentioned Embodiment 1 such that the divided vertical wall portions 72 in the first vertical wall row 71a and the divided vertical wall portions 72 in the second vertical wall row 71b in the fifth modification example are disposed so as not to be overlapped in a side view. It should be noted that each of the divided vertical wall portions 72 in the first vertical wall row 71a and the second vertical wall row 71b has the same shape and dimension as the divided vertical wall portions 22 in the aforementioned Embodiment 1.

The connecting wall portion 73 in the fifth modification example is disposed in an oblique direction with respect to a right and left direction so as to connect a front end part or a rear end part of the divided vertical wall portion 72 disposed in the first vertical wall row 71a to a rear end part or a front end part of the divided vertical wall portion 72 disposed in the second vertical wall row 71b mutually. In this case, a connecting length of each connecting wall portion 73 which connects obliquely between the divided vertical wall portion 72 in the first vertical wall row 71a and the divided vertical wall portion 72 in the second vertical wall row 71b is set to be larger than a width dimension of each divided vertical wall portion 72 in the first vertical wall row 71a and the second vertical wall row 71b.

In the fifth modification example, the attaching pitch of the divided vertical wall portion 72 in the length direction is set to be longer than the case of the above Embodiment 1 as described above, thereby, the divided vertical wall portion 72 in the first vertical wall row 71a and the divided vertical wall portion 72 in the second vertical wall row 71b are disposed so as not to be overlapped in a side view. However, in the present invention, on the contrary, the attaching pitch of the divided vertical wall portion in the length direction is set to be shorter than the case of the above Embodiment 1 and the like, thereby, it is also possible to secure an area of a part in which the divided vertical wall portion in the first vertical wall row and the divided vertical wall portion in the second vertical wall row overlap with each other in a side view to be larger than the case of the Embodiment 1. In this case, the connecting wall portion is disposed in the oblique direction with respect to the right and left direction so as to connect a front end part or a rear end part of the divided vertical wall portion disposed in the first vertical wall row with a rear end part or a front end part of the divided vertical wall portion disposed in the second vertical wall row mutually.

Figure 26:
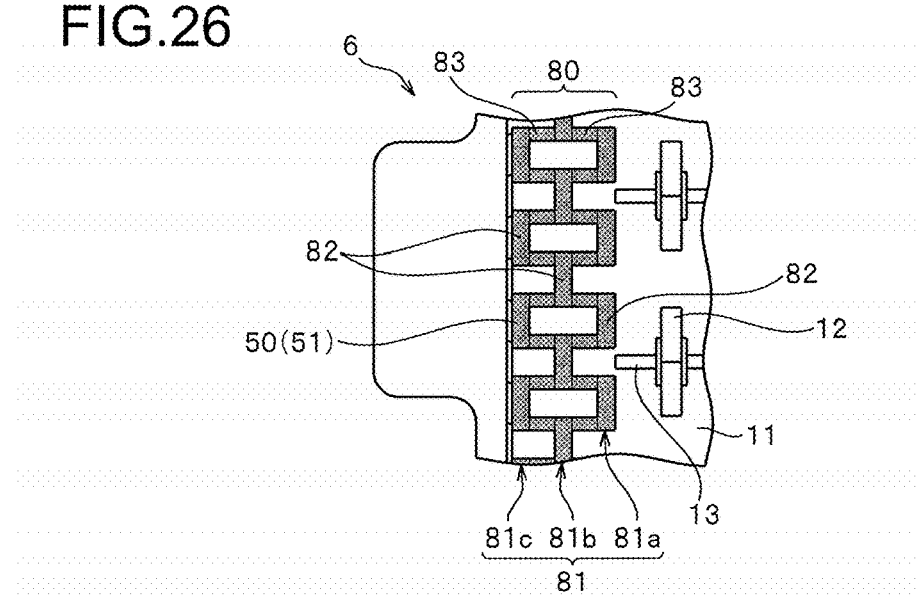
FIG. 26 is a main part plan view illustrating a configuration of a resin-intrusion-preventing wall portion according to another modification example.

Next, a molded surface fastener 6 according to a sixth modification example is shown in FIG. 26. In the sixth modification example, right and left resin-intrusion-preventing wall portions 80 include a first vertical wall row 81a to a third vertical wall row 81c formed along a length direction as a vertical wall row 81, and connecting wall portions 83 connecting divided vertical wall portions 82 between the adjacent first vertical wall row 81a and the second vertical wall row 81b and the divided vertical wall portions 82 between the adjacent second vertical wall row 81b and the third vertical wall row 81c. That is, the resin-intrusion-preventing wall portion 80 according to the sixth modification example is formed to have the number of rows of the vertical wall row 81 to be increased by one as compared with the resin-intrusion-preventing wall portion 20 according to the above mentioned Embodiment 1.

In this case, the first vertical wall row 81a is disposed on an inner side closest to engaging elements 12 in a right and left direction of the resin-intrusion-preventing wall portion 80. The third vertical wall row 81c is disposed on an outer side furthest away from the engaging elements 12. The second vertical wall row 81b is disposed at an intermediate position between the first vertical wall row 81a and the third vertical wall row 81c. The first vertical wall row 81a to the third vertical wall row 81c are disposed in rows along the length direction and include a plurality of divided vertical wall portions 82 intermittently disposed at predetermined attaching pitches. A gap is provided between the two divided vertical wall portions 82 of each vertical wall row 81 adjacent in the length direction.

Furthermore, the divided vertical wall portions 82 in the first vertical wall row 81a and the second vertical wall row 81b adjacent to each other are disposed in an alternate positional relationship as in the case of the aforementioned Embodiment 1. The divided vertical wall portions 82 in the second vertical wall row 81b and the third vertical wall row 81c adjacent to each other are also disposed in the alternate positional relationship. The divided vertical wall portion 82 in the first vertical wall row 81a and the divided vertical wall portion 82 in the third vertical wall row 81c are disposed at corresponding positions in the length direction. That is, the divided vertical wall portion 82 in the first vertical wall row 81a to the third vertical wall row 81c are provided in a staggered arrangement pattern as a whole.

Further, in this case, the divided vertical wall portions 82 in the first vertical wall row 81a and the third vertical wall row 81c and the divided vertical wall portion 82 in the second vertical wall row 81b are formed such that a part of the divided vertical wall portions 82 overlap with each other in a side view from the right and left direction. Each divided vertical wall portion 82 in the first vertical wall row 81a to the third vertical wall row 81c has the same shape and dimension as those of the divided vertical wall portion 22 in the Embodiment 1.

The connecting wall portions 83 in the sixth modification example are disposed along the right and left direction, and connect a front end part or a rear end part of the divided vertical wall portion 82 disposed in the first vertical wall row 81a and the third vertical wall row 81c to a rear end part or a front end part of the divided vertical wall portion 82 disposed in the second vertical wall row 81b mutually. The connecting wall portion 83 in the sixth modification example has the same shape and dimension as the connecting wall portion 23 in the above Embodiment 1. A width dimension of the connecting wall portion 83 is set to be larger than a width dimension of the divided vertical wall portion 82 in the first vertical wall row 81a to the third vertical wall row 81c.

Figure 27:
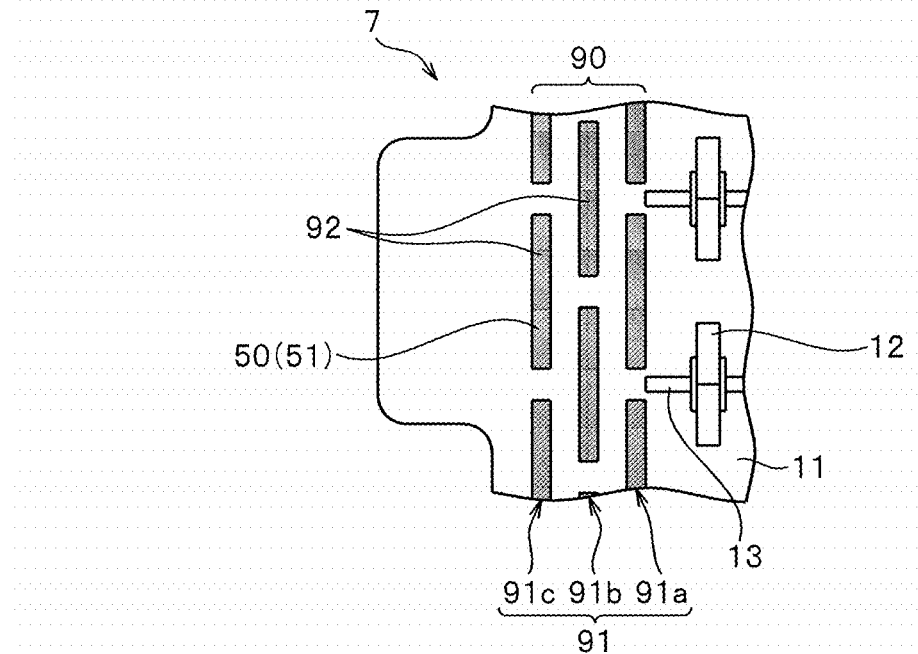
FIG. 27 is a main part plan view illustrating a configuration of a resin-intrusion-preventing wall portion according to still another modification example.

Next, a molded surface fastener 7 according to a seventh modification example is shown in FIG. 27. In the seventh modification example, while right and left resin-intrusion-preventing wall portions 90 have a first vertical wall row 91a to a third vertical wall row 91c formed along a length direction as a vertical wall row 91, a connecting wall portion for connecting the divided vertical wall portions 92 between the vertical wall rows 91 adjacent to each other is not provided.

In this case, the first vertical wall row 91a is disposed on an inner side closest to engaging elements 12 in the right and left direction of the resin-intrusion-preventing wall portion 90. The third vertical wall row 91c is disposed on an outer side furthest away from the engaging elements 12. The second vertical wall row 91b is disposed at an intermediate position between the first vertical wall row 91a and the third vertical wall row 91c. The first vertical wall row 91a to the third vertical wall row 91c are disposed in rows along the length direction and respectively include a plurality of divided vertical wall portions 92 intermittently disposed at predetermined attaching pitches. A gap is provided between the two divided vertical wall portions 92 of each vertical wall row 91 adjacent in the length direction.

Furthermore, the divided vertical wall portions 92 in the first vertical wall row 91a and the second vertical wall row 91b adjacent to each other are disposed in an alternate positional relationship. The divided vertical wall portions 92 in the second vertical wall row 91b and the third vertical wall row 91c adjacent to each other are also disposed in the alternate positional relationship. The divided vertical wall portion 92 in the first vertical wall row 91a and the divided vertical wall portion 92 in the third vertical wall row 91c are disposed at corresponding positions in the length direction. That is, the divided vertical wall portions 92 in the first vertical wall row 91a to the third vertical wall row 91c are provided in a staggered arrangement pattern as a whole.

Further, in this case, the divided vertical wall portions 92 in the first vertical wall row 91a and the third vertical wall row 91c and the divided vertical wall portion 92 in the second vertical wall row 91b are formed such that a part of the divided vertical wall portions overlap with each other in a side view from the right and left direction. Particularly, each divided vertical wall portion 92 in the first vertical wall row 91a to the third vertical wall row 91c is formed to have a longer dimension in the front and rear direction than the divided vertical wall portion 22 of the above Embodiment 1, therefore, an area in which the divided vertical wall portions 92 overlap with each other between the adjacent vertical wall rows 91 is secured to be larger.

In the molded surface fastener 7 of the seventh modification example in this manner, the resin-intrusion-preventing wall portion has three vertical wall rows 91, and the divided vertical wall portions 92 having a large length dimension in the three vertical wall rows 91 are provided in a staggered arrangement pattern. Also in the resin-intrusion-preventing wall portion 90 of the seventh modification example, when foam molding of the cushion body is conducted by attaching the molded surface fastener 7 to the fastener holding portion 46a of the molding die 46 (see FIG. 12), it is possible to prevent the foam resin material of the cushion body from intruding into the engaging region 15 over the right and left resin-intrusion-preventing wall portions.

That is, a connecting wall portion is not disposed on the resin-intrusion-preventing wall portion 90 of the seventh modification example. Although the foam resin material winds and intrudes into gaps between the divided vertical wall portions 92 in the three vertical wall rows 91 when foam molding of the cushion body, the intrusion pathway is narrow and winding. Therefore, the foam resin material is cooled and cured before it reaches the engaging region of the molded surface fastener 7, and it is possible to prevent the foam resin material from intruding into the engaging region over the resin-intrusion-preventing wall portion 90.

Although the vertical wall row 91 of the resin-intrusion-preventing wall portion 90 of the seventh modification example is formed in three rows, in the present invention, the vertical wall row 91 of the resin-intrusion-preventing wall portion 90 may be formed in two rows, or it may be formed in four or more rows. Furthermore, in the present invention, the divided vertical wall portions 92 in the first vertical wall row 91a and the third vertical wall row 91c and the divided vertical wall portion 92 in the second vertical wall row 91b may be connected via a connecting portion having a smaller height dimension than the divided vertical wall portions 92.

Figure 28:
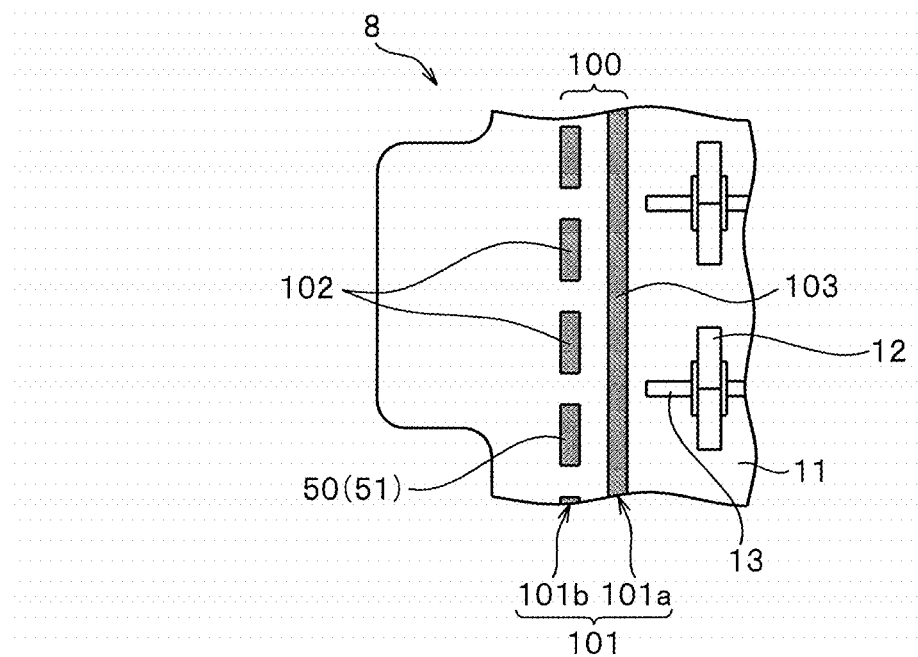
FIG. 28 is a main part plan view illustrating a configuration of a resin-intrusion-preventing wall portion according to still another modification example.
Figure 29:
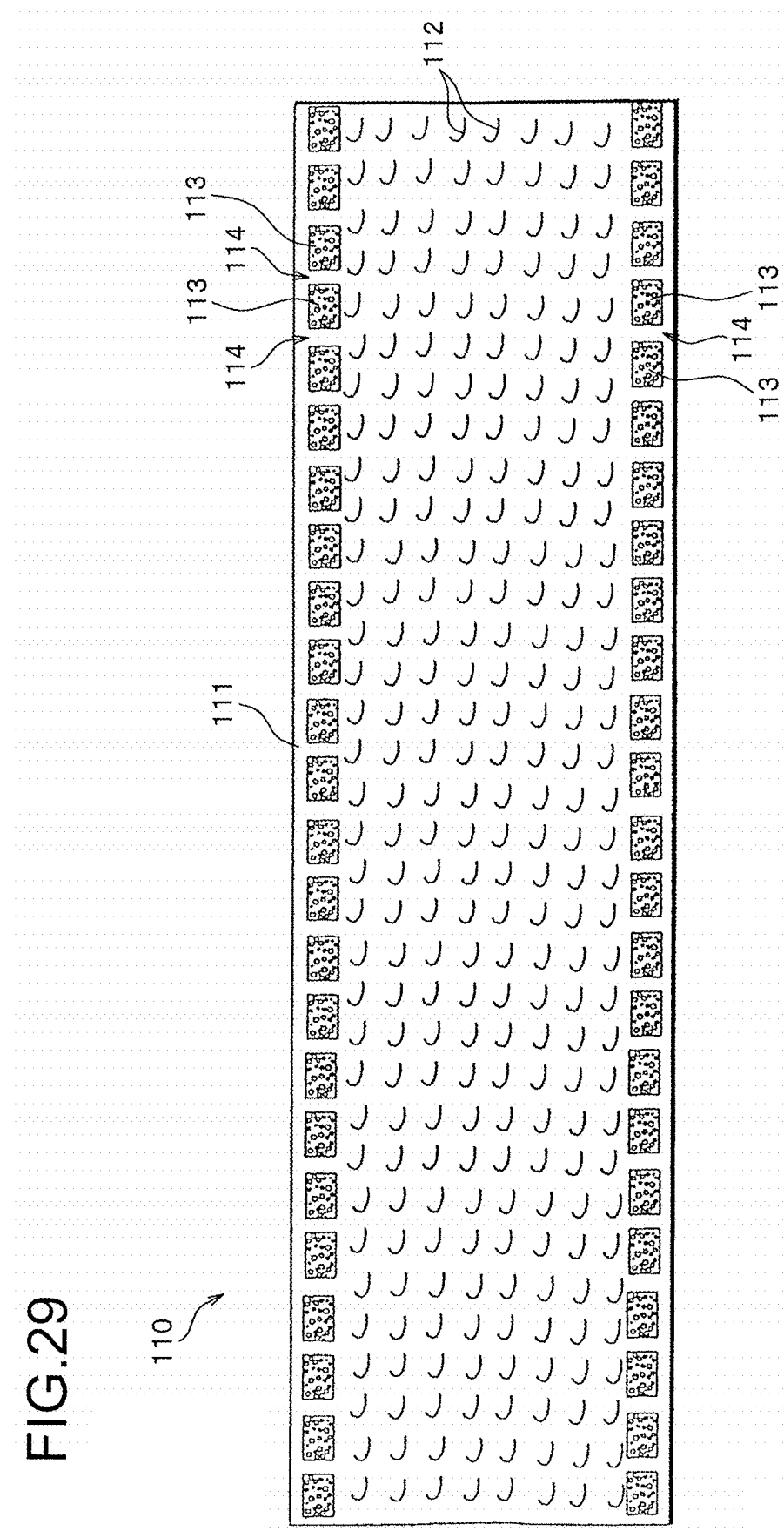
FIG. 29 is a plan view illustrating a conventional molded surface fastener.

Next, a molded surface fastener 8 according to the eighth modification example is shown in FIG. 28. In the eighth modification example, right and left resin-intrusion-preventing wall portions 100 includes a first vertical wall row 101a in an inner side and a second vertical wall row 101b in an outer side formed along a length direction as a vertical wall row 101. It should be noted that a connecting wall portion for connecting between the first vertical wall row 101a and the second vertical wall row 101b is not provided in the resin-intrusion-preventing wall portion 100 of the eighth modification example.

The first vertical wall row 101b on the inner side in the eighth modification example is continuously disposed along the length direction without any gaps, and is formed as a single continuous vertical wall portion 103 with a certain height dimension standing on the base portion 11. The second vertical wall row 101b on the outer side in the eighth modification example is disposed in a row along the length direction and is formed of a plurality of divided vertical wall portions 102 disposed intermittently at a predetermined attaching pitch.

Figure 12:
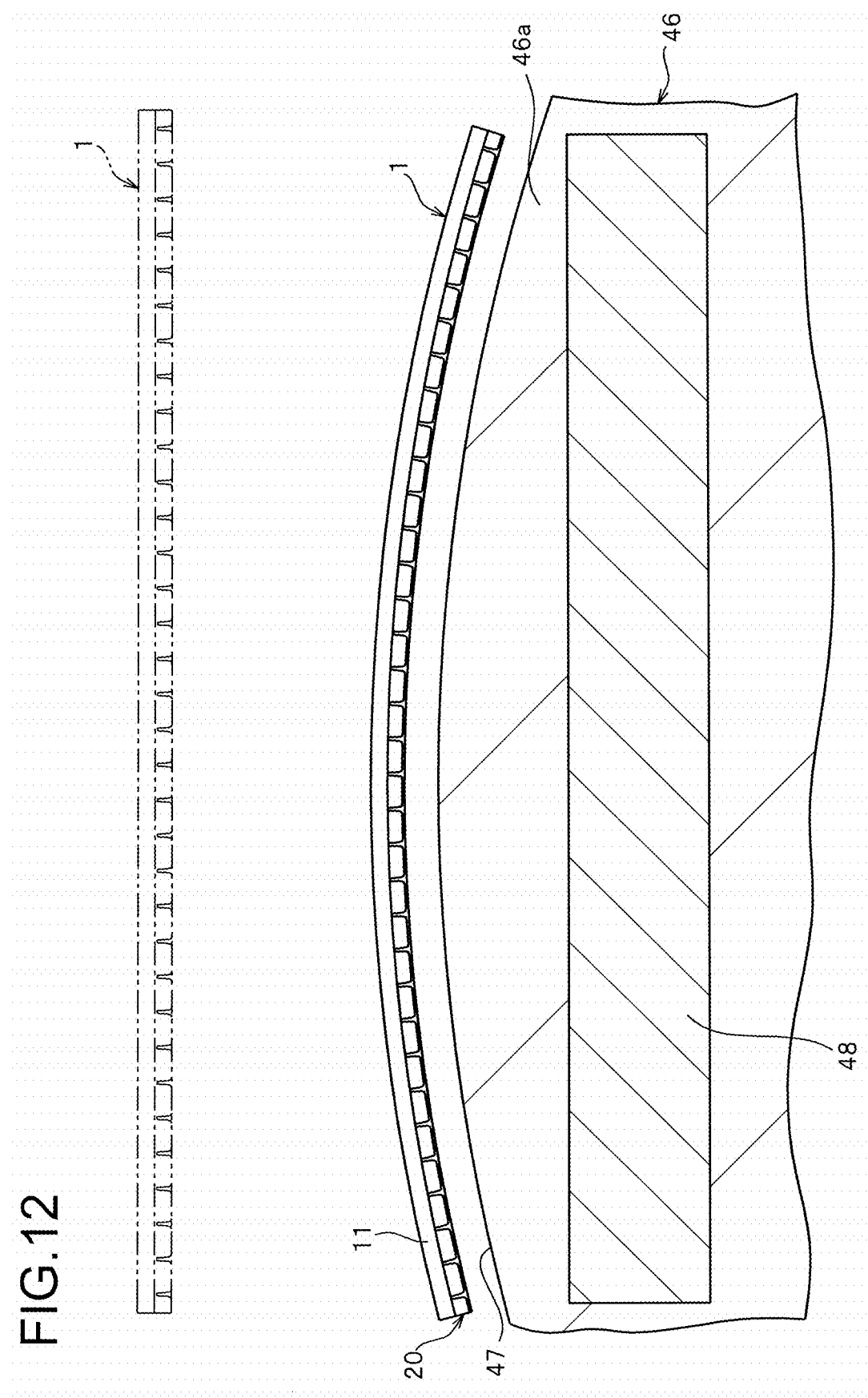
FIG. 12 is an explanatory view explaining a state that a molded surface fastener is adhered to a curved fastener attaching surface of a molding die for molding a cushion body.

Since the molded surface fastener 8 of the eighth modification example includes the aforementioned resin-intrusion-preventing wall portion 100, it is possible to effectively prevent the foam resin material of the cushion body from intruding into the engaging region over the right and left resin-intrusion-preventing wall portions 100 when attaching the molded surface fastener 8 to the fastener holding portion 46a of the molding die 46 to conduct foam molding the cushion body (see FIG. 12).

Also in each of the molded surface fasteners 4, 5, 6, 7, 8 according to the fourth to eighth modification examples as described above, the concentration gradient portion 50 formed on the resin-intrusion-preventing wall portion 20 of the above Embodiment 1 is formed on the right and left resin-intrusion-preventing wall portions 60, 70, 80, 90, 100 in the same manner. Further, in the resin-intrusion-preventing wall portions 60, 70, 80, 90, 100 of each of the molded surface fasteners 4, 5, 6, 7, 8, it is also possible to form any of the concentration gradient portions 50a to 50e formed on the resin-intrusion-preventing wall portions 20 of the above Embodiments 2 and 3 as well as the first to the third modification examples, instead of the concentration gradient portion 50 of the above-described Embodiment 1.

Since the resin-intrusion-preventing wall portions 60, 70, 80, 90, 100 of each modification example include the concentration gradient portion 50 (or any one of the concentration gradient portions 50a to 50e) as above, the adhesion property between the part containing the magnetic particles and the non-containing part substantially containing no magnetic particles can be enhanced. Therefore, cracks, breakage or the like hardly occurs between the part made of only synthetic resin and the part containing the magnetic particles at the time of manufacturing the molded surface fasteners 4, 5, 6, 7, 8, thereby, it is possible to improve the production efficiency and the yield of the molded surface fasteners 4, 5, 6, 7, 8 and to obtain various effects as described above.

REFERENCE SIGNS LIST 1, 1a, 1b Molded surface fastener
2, 2a Molded surface fastener 3, 4, 5 Molded surface fastener
6, 7, 8 Molded surface fastener
10 Primary molded body
11 Base portion
11a Preventing wall supporting portion
12 Engaging element (Male engaging element)
13 Lateral wall portion
14 Fin piece portion
15 Engaging region
20 Resin-intrusion-preventing wall portion
21 Vertical wall row
21a First vertical wall row
21b Second vertical wall row
22 Divided vertical wall portion (Vertical wall portion)
22a Pillar portion
22b Top end portion
23 Connecting wall portion
23a High concentration connecting wall portion
23b Low concentration connecting wall portion
24 Reinforcing portion
25 Gap
26 Overlapped part of divided vertical wall portions
30 Primary resin-intrusion-preventing wall portion
31 Primary vertical wall row
31a Primary first vertical wall row
31b Primary second vertical wall row
32 Primary divided vertical wall portion
40 Manufacturing apparatus
41 Molding apparatus
42 Die wheel
43 Extrusion nozzle
43a First flow pass
43b Second flow pass
43c Extrusion surface
43d First extrusion port
43e Second extrusion port
44 Pickup roller
45 Hear press apparatus
45a Upper side press roller (Calender roller)
45b Lower side press roller (Calender roller)
46 Molding die
46a Fastener holding portion
47 Cavity surface (Fastener attaching surface)
48 Magnet
49 Cushion body (Foam body)
50 Concentration gradient portion
50a-50e Concentration gradient portion
51 High concentration portion
52 Downward gradient portion (Concentration changing portion)
53 Width direction gradient portion
54 Concentration changing portion
55,55a High concentration portion
56 Concentration changing portion
56a,56b Arrow
56c Arrow
57 Concentration changing portion
57a,57b Arrow
58a,58b Arrow
58c Arrow
60 Resin-intrusion-preventing wall portion
61 Vertical wall row
61a First vertical wall row
61b Second vertical wall row
62 Divided vertical wall portion
63 Connecting wall portion
70 Resin-intrusion-preventing wall portion
71 Vertical wall row
71a First vertical wall row
71b Second vertical wall row
72 Divided vertical wall portion
73 Connecting wall portion
80 Resin-intrusion-preventing wall portion
81 Vertical wall row
81a First vertical wall row
81b Second vertical wall row
81c Third vertical wall row
82 Divided vertical wall portion
83 Connecting wall portion
90 Resin-intrusion-preventing wall portion
91 Vertical wall row
91a First vertical wall row
91b Second vertical wall row
91c Third vertical wall row
92 Divided vertical wall row
100 Resin-intrusion-preventing wall portion
101 Vertical wall row
101a First vertical wall row
101b Second vertical wall row
102 Divided vertical wall portion
103 Continuous vertical wall portion
W1 Width dimension of connecting wall portion
W2 Width dimension of first vertical wall row
W3 Width dimension of second vertical wall row
W4 Width dimension of entire resin-intrusion-preventing wall portion

The invention claimed is:

1. A synthetic resin molded surface fastener, to be integrated to a surface of a cushion body at a time of foam molding of the cushion body, the molded surface fastener comprising a flat plate-shaped base portion provided with an upper surface and a lower surface, right and left resin-intrusion-preventing wall portions standing on the upper surface of the base portion along a length direction, and a plurality of hook shaped engaging elements disposed between the right and left resin-intrusion-preventing wall portions and containing magnetic particles in the right and left resin-intrusion-preventing wall portions, wherein,
at least a part of a region formed of the resin-intrusion-preventing wall portions and the base portion has a concentration gradient portion in which a concentration of the magnetic particles decreases toward at least one direction.

2. The molded surface fastener according to claim 1, wherein the concentration gradient portion has a downward gradient portion in which the concentration of the magnetic particles decreases as it extends downward.

3. The molded surface fastener according to claim 2, wherein the downward gradient portion is disposed across a region of 1/10 or more of a height dimension of the resin-intrusion-preventing wall portions from the base portion.

4. The molded surface fastener according to claim 1, wherein the concentration gradient portion has a high concentration portion in which the concentration of the magnetic particles is highest on an upper end part including an upper surface of the right and left resin-intrusion-preventing wall portions.

5. The molded surface fastener according claim 1, wherein the concentration gradient portion has an inward gradient portion in which the concentration of the magnetic particles decreases from an outside apart from the engaging elements toward an inside close to the engaging elements along a right and left direction.

6. The molded surface fastener according to claim 1, wherein the concentration gradient portion has an outward gradient portion in which the concentration of the magnetic particles decreases from an inside close to the engaging elements toward an outside apart from the engaging elements along a right and left direction.

7. The molded surface fastener according to claim 1, wherein the right and left resin-intrusion-preventing wall portions have at least one vertical wall row formed along the length direction respectively, and
the vertical wall row has a plurality of divided vertical wall portions disposed along the length direction at a predetermined pitch intermittently and provided with a certain height dimension.

8. The molded surface fastener according to claim 7, wherein the concentration gradient portion of the divided vertical wall portions have a length direction gradient portion in which the concentration of the magnetic particles decreases along a front and rear direction.

9. The molded surface fastener according to claim 7, wherein the resin-intrusion-preventing wall portions have a plurality of the vertical wall rows formed of the divided vertical wall portions,
the divided vertical wall portions are arranged in a staggered manner in a plurality of the vertical wall rows, the divided vertical wall portions in each of the vertical wall rows is connected to an adjacent two of the divided vertical wall portions in the other vertical wall row via connecting wall portions, and
the divided vertical wall portions and the connecting wall portions are continuously disposed in a series with a certain height dimension.

10. The molded surface fastener according to claim 9, wherein the vertical wall rows of the resin-intrusion-preventing wall portions have a first vertical wall row disposed on an inner side in a right and left direction and a second vertical wall row disposed on an outer side in the right and left direction,
the divided vertical wall portions in the first vertical wall row and the divided vertical wall portions in the second vertical wall row are disposed to be partially overlapped with each other in a side view from the right and left direction, and
the connecting wall portions are disposed along a width direction.

11. The molded surface fastener according to claim 9, wherein a connecting length of the connecting wall portion for connecting between the divided vertical wall portions is set to be larger than a dimension of the divided vertical wall portions in a right and left direction.

* * * * *

UNITED STATES PATENT AND TRADEMARK OFFICE
CERTIFICATE OF CORRECTION

PATENT NO. : 11,051,590 B2  
APPLICATION NO. : 16/074250  
DATED : July 6, 2021  
INVENTOR(S) : Hiromasa Abe et al.

Page 1 of 1

It is certified that error appears in the above-identified patent and that said Letters Patent is hereby corrected as shown below:

In the Specification

In Column 16, Line 13, delete "(See" and insert -- (see --, therefor.

In Column 17, Line 7, delete "the a" and insert -- the --, therefor.

In Column 17, Line 56, delete "aside" and insert -- a side --, therefor.

In Column 29, Line 51, delete "13" and insert -- 13. --, therefor.

In Column 37, Line 5, delete "(See" and insert -- (see --, therefor.

In Column 47, Line 53, delete "55,55a" and insert -- 55, 55a --, therefor.

In Column 47, Line 55, delete "56a,56b" and insert -- 56a, 56b --, therefor.

In Column 47, Line 58, delete "57a,57b" and insert -- 57a, 57b --, therefor.

In Column 47, Line 59, delete "58a,58b" and insert -- 58a, 58b --, therefor.

In the Claims

In Column 48, Line 62, in Claim 5, after "according" insert -- to --.

In Column 50, Line 11, in Claim 10, delete "a right" and insert -- the right --, therefor.

In Column 50, Line 12, in Claim 10, delete "the right" and insert -- a right --, therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*